(12) United States Patent
Wood

(10) Patent No.: US 8,151,660 B2
(45) Date of Patent: Apr. 10, 2012

(54) THREE AXES ROTATIONAL MOTION-POSITIONING APPARATUS

(75) Inventor: Barry Lynn Wood, Newnan, GA (US)

(73) Assignees: RPY Motion, Inc., Newnan, GA (US); Barry Lynn Wood, Newnan, GA (US)

( * ) Notice: Subject to any disclaimer, the term of this patent is extended or adjusted under 35 U.S.C. 154(b) by 1411 days.

(21) Appl. No.: 11/710,659

(22) Filed: Feb. 23, 2007

(65) Prior Publication Data
US 2008/0202273 A1    Aug. 28, 2008

(51) Int. Cl.
*F16H 25/08* (2006.01)
(52) U.S. Cl. .......................................................... 74/55
(58) Field of Classification Search ............... 74/479.01, 74/16, 490.07, 490.08, 490.13; 248/278.1, 248/179.1, 183.4, 186.2, 282.1, 550; 269/66; 108/22, 94
See application file for complete search history.

(56) References Cited

U.S. PATENT DOCUMENTS

| | | |
|---|---|---|
| 1,820,436 A | 8/1931 | Carlson |
| 2,524,238 A | 10/1950 | Soule |
| 2,686,095 A | 8/1954 | Carlson |
| 2,944,858 A | 7/1960 | Engelsted |
| 3,215,391 A | 11/1965 | Storm |
| 3,288,421 A | 11/1966 | Peterson |
| 3,295,224 A | 1/1967 | Cappel |
| 3,374,977 A | 3/1968 | Moy |
| 3,577,659 A | 5/1971 | Kail |
| 3,658,286 A | 4/1972 | Terai |
| 3,693,979 A * | 9/1972 | Koett ............................ 473/279 |
| 4,343,610 A | 8/1982 | Chou |
| 4,360,182 A | 11/1982 | Titus |
| 4,370,813 A | 2/1983 | Burniski |
| 4,374,497 A | 2/1983 | Harmand |
| 4,575,039 A * | 3/1986 | Persson et al. ................. 248/550 |
| 4,753,596 A | 6/1988 | Hart |
| 4,779,796 A * | 10/1988 | Lai ............................... 473/279 |
| 4,819,002 A * | 4/1989 | Reboullet ...................... 343/765 |
| 4,887,967 A | 12/1989 | Letovsky |
| 5,018,973 A | 5/1991 | Alet et al. |

(Continued)

FOREIGN PATENT DOCUMENTS
EP    155922 A1 *   9/1985
(Continued)

OTHER PUBLICATIONS

U.S. Appl. No. 11/586,788, filed Oct. 26, 2006, Wood.

(Continued)

*Primary Examiner* — Justin Krause
*Assistant Examiner* — Matthew R Vaerewyck

(57) ABSTRACT

A rotational motion-positioning apparatus capable of generating rotational movement about three orthogonal rotational axes. A first axial cam and second axial cam are supported by a rotational joint base. A rotational joint is attached between the rotational joint base and a work load support. The work load support has at least one first axial cam follower tracking the first axial cam rotation, thus rotating the work load support about the rotational joint first rotational axis. The work load support has at least one second axial cam follower tracking the second axial cam rotation, thus rotating the work load support about the rotational joint second rotational axis. The rotational joint base is supported by and rotatable about a housing, thus rotating the work load support about the third rotational axis. Three rotational drive unit are attached to the housing to rotate the first axial cam, second axial cam and rotational joint base.

34 Claims, 27 Drawing Sheets

U.S. PATENT DOCUMENTS

| | | | |
|---|---|---|---|
| 5,031,547 A * | 7/1991 | Hirose | 108/140 |
| 5,340,111 A | 8/1994 | Froelich | |
| 5,358,251 A | 10/1994 | Ashton | |
| 5,366,375 A | 11/1994 | Sarnicola | |
| 5,431,406 A * | 7/1995 | Ishii | 248/396 |
| 5,518,245 A * | 5/1996 | Nelson | 473/279 |
| 5,549,522 A | 8/1996 | Chang | |
| 5,639,160 A | 6/1997 | Kishimoto | |
| 5,752,834 A | 5/1998 | Ling | |
| 6,077,078 A | 6/2000 | Alet | |
| 6,095,926 A | 8/2000 | Hettema | |
| 6,161,809 A * | 12/2000 | Mahy et al. | 248/396 |
| 6,162,058 A | 12/2000 | Yang | |
| 6,182,582 B1 * | 2/2001 | Bailey et al. | 108/94 |
| 6,196,081 B1 | 3/2001 | Yau | |
| 6,283,757 B1 | 9/2001 | Meghnot | |
| 6,402,625 B2 | 6/2002 | Armstrong | |
| 6,445,960 B1 | 9/2002 | Borta | |
| 6,581,437 B2 | 6/2003 | Chrystall | |
| 6,634,885 B2 | 10/2003 | Hodgetts | |
| 6,681,703 B2 * | 1/2004 | Wells et al. | 108/20 |
| 6,733,293 B2 | 5/2004 | Baker | |
| 6,840,127 B2 | 1/2005 | Moran | |
| 7,094,157 B2 | 8/2006 | Fromyer | |
| 7,520,483 B2 * | 4/2009 | Rand et al. | 248/346.11 |
| 7,758,444 B2 * | 7/2010 | Crossley | 473/279 |
| 2005/0277092 A1 | 12/2005 | Hwang | |

FOREIGN PATENT DOCUMENTS

| | | |
|---|---|---|
| GB | 753096 | 7/1956 |
| JP | 11-009846 | 1/1999 |
| JP | 11-319327 | 11/1999 |
| JP | 2003-236254 | 8/2003 |

OTHER PUBLICATIONS

Robert L. Norton P.E., Cam Design and Manufacturing Handbook, 2002, pp. 1-8, ISBN: 0-8311-3122-5, Industrial Press Inc., New York, NY, USA.

* cited by examiner

THREE AXES ROTATIONAL MOTION-POSITIONING APPARATUS

CROSS-REFERENCE TO RELATED APPLICATIONS

The present application is related to pending application Ser. No. 11/586,788 filed on Oct. 26, 2006, titled Rotational Motion-Positioning Apparatus by Barry Wood. Pending application Ser. No. 11/586,788 which is not admitted to be prior art with respect to the present invention by its mention.

FEDERALLY SPONSORED RESEARCH

Not Applicable

BACKGROUND OF THE INVENTION

This invention relates to a three rotational axes motion and positioning apparatus. More specifically, a rotational motion and rotational positioning apparatus controlled by a computer or other external device.

Rotational motion generating apparatuses are important components of virtual reality training and entertainment simulators. Rotational motion enhances the sensory stimuli of acceleration for a more realistic experience during the simulator session. Typical motion platforms capable of generating rotational motion are large complex systems requiring coordination of multiple interdependent actuators to generate a single axis or multiple axes of rotational motion.

Rotational positioning is found in such applications as robotic manipulators, machine tool work piece positioning, antenna positioning, and golf training platforms. Typical positioning platforms capable of positioning about multiple rotational axes use hydraulic, pneumatic or complex mechanical actuators to move the platform. Because of the heat, noise and fluid vaporization associated with hydraulics and pneumatics, their usage environment is restrictive. Complex mechanical actuators are expensive and require frequent maintenance to function properly.

For the foregoing reasons, there is a need for an apparatus capable of generating rotational movement about three rotational axis using three independent drive sources and where the apparatus is self-contained. The rotational motion and positioning apparatus also needs to be adaptable, reliable, and have a competitive life-cycle cost.

SUMMARY OF THE INVENTION

Accordingly, the present invention is directed to a motion-positioning apparatus capable of generating rotational movement about three rotational axes of a three orthogonal axes system. Rotational movement of the three rotational axes or any combination of the three axes may be independent or simultaneous. The motion-positioning apparatus is a self-contained motion-positioning apparatus using a single drive source for each of the three rotational axes.

The motion-positioning apparatus having features of the present invention comprises a housing, a rotational joint base, a work load support which may be the work load itself, a rotational joint, a first axial cam, at least one first axial cam follower, a second axial cam, at least one second axial cam follower, a first rotational axis drive unit, a second rotational axis drive unit, and a third rotational axis drive unit. The housing having a housing cylindrical centering surface and a housing load support surface. The rotational joint base having at least two rotational joint base cylindrical centering surfaces and at least two rotational joint base load support surfaces. One of the rotational joint base cylindrical centering surfaces concentrically aligned with the housing cylindrical centering surface such that the rotational joint base is rotatable about the third rotational axis of the rotational motion-positioning apparatus. One of the rotational joint base load support surfaces axially aligned with the housing load support surface such that the work load force is transferred from the rotational joint base to the housing. The rotational joint having at least two degrees of rotational freedom is attached between the rotational joint base and the work load support such that the work load support is rotatable about the first rotational axis and the second rotational axis. The third rotational axis drive unit mounted to the housing, with means for coupling rotational energy from the third rotational axis drive unit to the rotational joint base. The means for coupling rotational energy from the third rotational axis drive unit to the rotational joint base selected from parallel shaft drive sets, 90 degree intersecting drive sets, or 90 degree non-intersecting drive sets.

The first axial cam having at least two first axial cam cylindrical centering surfaces, at least two first axial cam load support surfaces, and a first axial cam surface. The first axial cam surface is circular and has a varying axial displacement. One of the first axial cam cylindrical centering surfaces concentrically aligned with one of the rotational joint base cylindrical centering surfaces such that the first axial cam is rotatable. One of the first axial cam load support surfaces axially aligned with one of the rotational joint base load support surfaces such that the work load force from the first axial cam is transferred to the rotational joint base. The first axial cam follower attached to the work load support and contacts the first axial cam surface such that the work load support is rotated about the first rotational axis of the rotational joint when the first axial cam is rotated. The first rotational axis drive unit mounted to the housing, with means for coupling rotational energy from the first rotational axis drive unit to the first axial cam. The means for coupling rotational energy from the first rotational axis drive unit to the first axial cam selected from parallel shaft drive sets, 90 degree intersecting drive sets, or 90 degree non-intersecting drive sets.

The second axial cam having a second axial cam cylindrical centering surface, a second axial cam load support surface, and a second axial cam surface. The second axial cam surface is circular and has a varying axial displacement. The second axial cam cylindrical centering surface concentrically aligned with one of the first axial cam cylindrical centering surfaces such that the second axial cam is rotatable. The second axial cam load support surface axially aligned with one of the first axial cam load support surfaces such that the work load force from the second axial cam is transferred to the first axial cam. The second axial cam follower attached to the work load support and contacts the second axial cam surface such that the work load support is rotated about the second rotational axis of the rotational joint when the second axial cam is rotated. The second rotational axis drive unit mounted to the housing, with means for coupling rotational energy from the second rotational axis drive unit to the second axial cam. The means for coupling rotational energy from the second rotational axis drive unit to the second axial cam selected from parallel shaft drive sets, 90 degree intersecting drive sets, or 90 degree non-intersecting drive sets.

Since the motion-positioning apparatus is self-contained, requires only three drive sources, and each of the three drive source are stationary to the housing, the motion-positioning apparatus is easily adaptive to motion generation and positioning applications. By using a single-drive source for each of the three rotational axes and the drive sources being stationary to the housing, the mechanical complexity of the motion-positioning apparatus is minimized, thus resulting in lower life-cycle cost and increased reliability.

DESCRIPTION OF THE DRAWINGS

These and other features, aspects, and advantages of the present invention will become better understood with regard to the following description, appended claims, and accompanying drawings where:

DESCRIPTION OF INVENTION

Definitions

Figure 1:
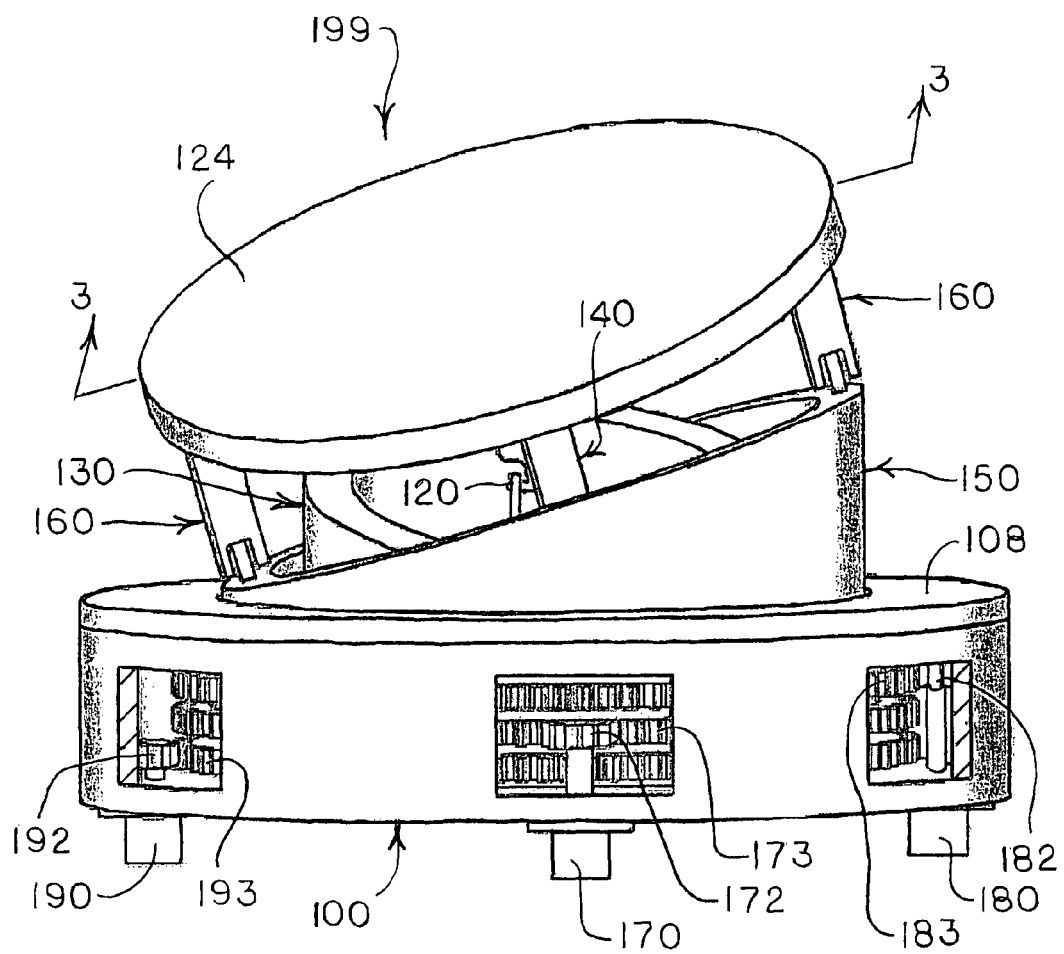
FIG. 1-2 are perspective views of the motion-positioning apparatus.
Figure 2:
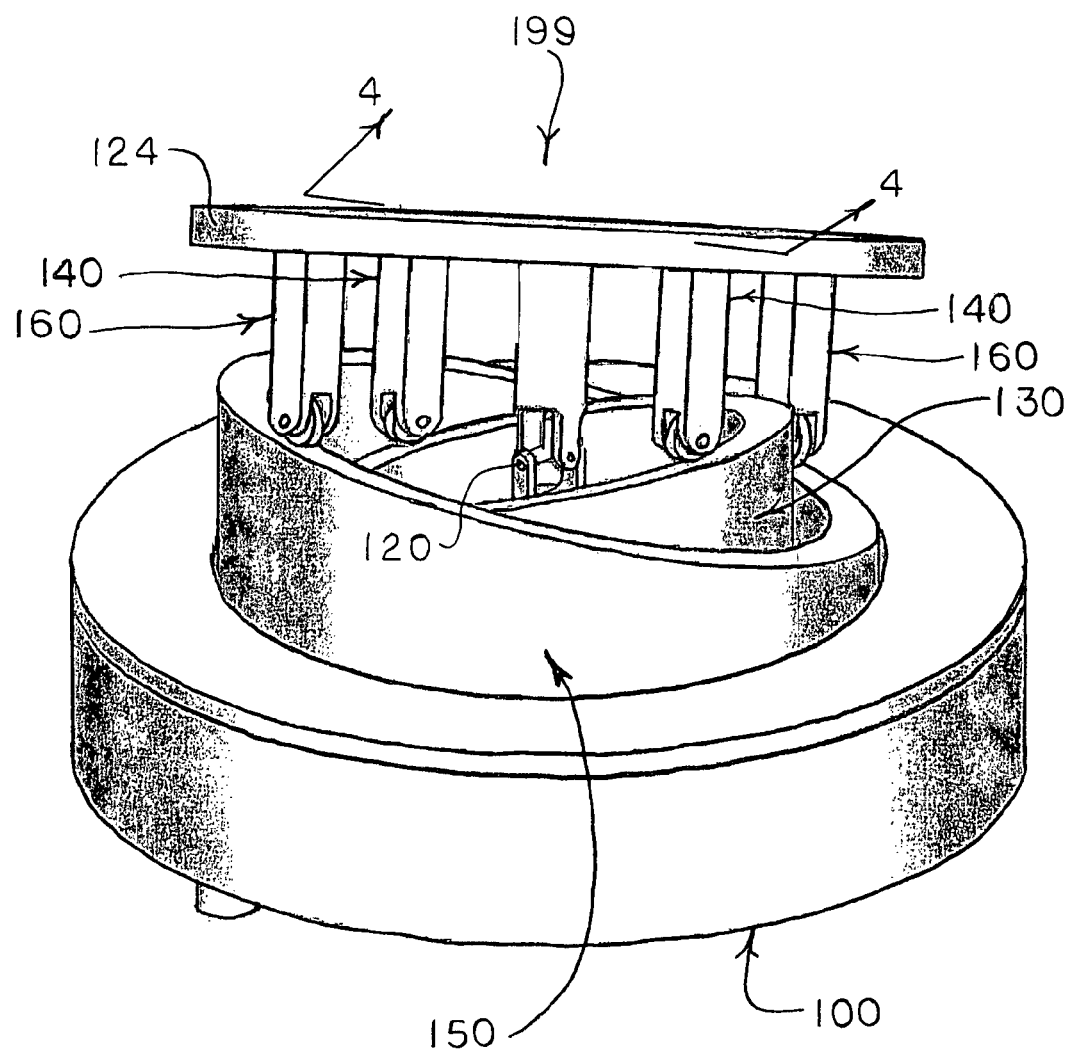

Parallel Shaft Drive Set: Rotational energy coupling components comprising: a drive component, a driven component, and zero or more intermediate components. The parallel shaft drive set providing means for coupling or transmitting rotational energy from a drive source capable of generating rotational energy to a rotatable component capable of being rotated, where the means for coupling or transmitting rotational energy being the drive component, any existing intermediate components and the driven component. The centerline of the drive source output being parallel to the centerline of the rotatable component, thus the centerline of the drive component, the driven component and any existing intermediate components being parallel. Typical examples of parallel shaft drive sets comprising: external spur gear sets, internal spur gear sets, helical gear sets (single, double conventional, double staggered, herringbone), sprocket and chain sets, timing pulley belt sets and pulley belt sets.

90 Degree Intersecting Drive Set: Rotational energy coupling components comprising: a drive component and a driven component. The 90 degree intersecting drive set providing means for coupling or transmitting rotational energy from a drive source capable of generating rotational energy to a rotatable component capable of being rotated, where the means for coupling or transmitting rotational energy being the drive component and the driven component. The centerline of the drive source output being typically perpendicular to and intersecting the centerline of the rotatable component, thus the centerline of the drive component being perpendicular to and intersecting the centerline of the driven component. The centerline of the drive component need not always be perpendicular to the centerline of the driven component, for the centerline of the drive component can be an angle less than or greater than 90 degrees to the centerline of the driven component. Typical examples of 90 degree intersecting drive sets comprising: straight bevel gear sets, spiral bevel gear sets, and zerol bevel gear sets.

90 Degree Non-Intersecting Drive Set: Rotational energy coupling components comprising: a drive component and a driven component. The 90 degree non-intersecting drive set providing means for coupling or transmitting rotational energy from a drive source capable of generating rotational energy to a rotatable component capable of being rotated, where the means for coupling or transmitting rotational energy being the drive component and the driven component. The centerline of the drive source output being typically perpendicular to and non-intersecting of the centerline of the rotatable component, thus the centerline of the drive component being perpendicular to and non-intersecting of the centerline of the driven component. The centerline of the drive component need not always be perpendicular to the centerline of the driven component, for the centerline of the drive component can be an angle less than or greater than 90 degrees to the centerline of the driven component. Typical examples of 90 degree non-intersecting drive sets comprising: worm gear sets, cross helical gear sets and hypoid gear sets.

Overhung Mount: Support means for a drive component of a drive set. The drive component is supported by a bearing or bearings on only one axial end of the drive component.

Straddle Mount: Support means for a drive component of a drive set. The drive component is supported by bearing at two axial opposite ends of the drive component.

Form-Closed Axial Cam-Follower Arrangement: Combination of one or more axial cam surfaces and one or more axial cam followers such that the geometry of the axial cam surface or the arrangement of the axial cam followers to the axial cam surface require no external force to maintain contact between the axial cam follower and the axial cam surface.

Three Rotational Axes of a Three Orthogonal Axes System: Three rotational axes of a three orthogonal axes system typically are the roll, pitch, and yaw rotational axes. The first rotational axis, second rotational axis, and third rotational axis being any combination of the three: roll rotational axis, pitch rotational axis, and yaw rotational axis.

Overview

The present invention is directed to a motion-positioning apparatus capable of generating rotational movement of a work load about a first rotational axis, a second rotational axis, and a third rotational axis of a three orthogonal axes system. With reference to the drawings, and particularly FIG. 1-FIG. 4, a motion-positioning apparatus 199 comprising: a housing 100, a rotational joint base 110, a work load support 124, a rotational joint 120 having two rotational axes being the first rotational axis and the second rotational axis of the three orthogonal axes system, a first axial cam 130, a first axial cam follower 140, a second axial cam 150, a second axial cam follower 160, a first rotational axis drive unit 170, a second rotational axis drive unit 180, and a third rotational axis drive unit 190. The rotational joint base 110 is supported by and resides in the housing 100. The rotational joint 120 is attached between the rotational joint base 110 and the work load support 124. The first axial cam 130 is rotatable and is supported by the rotational joint base 110. The first axial cam follower 140 is attached to the work load support 124 and contacts the first axial cam 130. The first rotational axis drive unit 170 is mounted to the housing 100, with means for coupling rotational energy from the first rotational axis drive unit 170 to the first axial cam 130. Rotation of the first axial cam 130 by the first rotational axis drive unit 170 rotates the work load support 124 about the first rotational axis of the rotational joint 120.

The second axial cam 150 is rotatable and supported by the first axial cam 130. The second axial cam follower 160 is attached to the work load support 124 and contacts the second axial cam 150. The second rotational axis drive unit 180 is mounted to the housing 100, with means for coupling rotational energy from the second rotational axis drive unit 180 to the second axial cam 150. Rotation of the second axial cam 150 by the second rotational axis drive unit 180 rotates the work load support 124 about the second rotational axis of the rotational joint 120.

The third rotational axis drive unit 190 is mounted to the housing 100, with means for coupling rotational energy from the third rotational axis drive unit 190 to the rotational joint base 110. Rotation of the rotational joint base 110 by the third rotational axis drive unit 190 rotates the work load support 124 about the third rotational axis of the three orthogonal axes system. Rotation of the work load support 124 about the third rotational axis also rotates the first axial cam follower 140 and second axial cam follower 160 with the rotational joint base 110. To maintain the first rotational axis and the second rotational axis angular positions when the rotational joint base is rotated about the third rotational axis requires that the first axial cam 130 and the second axial cam 150 be rotated by the same angular displacement as the rotational joint base 110, thus feeding forward the rotational joint base 110 angular displacement to the first axial cam 130 and the second axial cam 150.

Detailed Description—Preferred Embodiment: FIG. 1-FIG. 4

FIG. 1-4 shows the housing 100 as a rigid enclosure having a housing cavity 103 and an open end. A housing cylindrical contour 106 shaped as a cylinder extends from the surface of the housing cavity 103 opposite the open end of the housing 100 to provide a housing cylindrical centering surface and a housing load support surface. A housing-rotational joint base centering surface 101 is the housing cylindrical centering surface provided by the radial cylindrical surface of the housing cylindrical contour 106. A housing-rotational joint base load support surface 102 is the housing load support surface provided by the axial end surface of the housing cylindrical contour 106.

FIG. 1-4 further depicts the rotational joint base 110 as a rigid cylindrical shaped member having a closed end bore. The rotational joint base 110 two rotational joint base cylindrical centering surfaces are: a rotational joint base-housing centering surface 112 and a rotational joint base-first axial cam centering surface 114. The rotational joint base-housing centering surface 112 is the cylindrical bore surface of the rotational joint base 110. The rotational joint base-first axial cam centering surface 114 is the outer cylindrical surface of the rotational joint base 110, where the rotational joint base-first axial cam centering surface 114 is concentric to the rotational joint base-housing centering surface 112. The rotational joint base 110 two rotational joint base load support surfaces are: a rotational joint base-housing load support surface 113 and a rotational joint base-first axial cam load support surface 115. The rotational joint base-housing load support surface 113 is the closed end bore axial end surface of the rotational joint base 110. The rotational joint base-first axial cam load support surface 115 is the outer axial surface of the rotational joint base 110 adjacent the rotational joint base-first axial cam centering surface 114. The rotational joint base 110 resides in the housing 100 such that the rotational joint base-housing centering surface 112 is aligned concentrically with the housing-rotational joint base centering surface 101, such that the rotational joint base 110 is rotatable about the housing 100. The rotational joint base-housing load support surface 113 is aligned axially with the housing-rotational joint base load support surface 102 such that the work load force from the rotational joint base 110 is transferred to the housing 100.

FIG. 1-4 further depicts the work load support 124 as a planar surface substantially rigid to support the work load. The rotational joint 120 is shown as having two degrees of rotational freedom about the first rotational axis and the second rotational axis. The rotational joint 120 is attached between the rotational joint base 110 and the work load support 124. The side of the rotational joint 120 attached to the rotational joint base 110 is stationary and aligned concentrically with the rotational joint base-housing centering surface 112. The side of the rotational joint 120 attached to the work load support 124 is rotatable, thus the work load support 124 is rotatable about the first rotational axis and the second rotational axis of the rotational joint 120.

FIG. 1-4 further depicts the first axial cam 130 as a rigid cylindrical shaped member having a hollow center to provide clearance about the rotational joint 120. Also, the first axial cam 130 has a flange with a bore larger than the hollow center of the first axial cam 130. The first axial cam 130 further comprises: a first axial cam surface 132 which is the axial end surface opposite the flange of the first axial cam 130, two first axial cam cylindrical centering surfaces, and two first axial cam load support surfaces. The first axial cam cylindrical centering surfaces are: a first axial cam-rotational joint base centering surface 133 which is the flange cylindrical larger bore surface of the first axial cam 130 and a first axial cam-second axial cam centering surface 135 which is the flange outer cylindrical surface of the first axial cam 130. The first axial cam load support surfaces are: a first axial cam-rotational joint base load support surface 134 which is the axial surface between the larger bore and hollow center of the first axial cam 130 and a first axial cam-second axial cam load support surface 136 which is the flange outer axial surface of the first axial cam 130 closest to the first axial cam surface 132. The first axial cam 130 is supported by the rotational joint base 110 such that the first axial cam-rotational joint base centering surface 133 is aligned concentrically with the rotational joint base-first axial cam centering surface 114. The first axial cam-rotational joint base load support surface 134 is axially aligned with the rotational joint base load support surface 115 such that the work load force from the first axial cam 130 is transferred to the rotational joint base-first axial cam load support surface 115 of the rotational joint base 110.

FIG. 1-4 further depicts two first axial cam followers 140. Each first axial cam follower further comprising: a first axial cam follower link 141 rigidly attached to the work load support 124, and a first axial cam follower rolling element 142. Each of the first axial cam follower links 141 extend from the work load support 124 towards the first axial cam surface 132. The first axial cam follower rolling elements 142 are attached to each first axial cam follower link 141 at the end opposite the work load support 124 such that each first axial cam follower rolling element 142 contacts the first axial cam surface 132.

FIG. 1-4 further depicts the first axial cam surface 132 as the axial end surface of the first axial cam 130, where the first axial cam surface 132 is circular, and of varying displacement along the axial axis of the first axial cam 130. At any two points 180 degrees apart on the first axial cam surface 132, the magnitude of the rise displacement is equal to the magnitude of the fall displacement as measured from the axial center of the total displacement of the first axial cam 130. Each of the first axial cam followers 140 are aligned perpendicular to the first rotational axis of the rotational joint 120 and the first axial cam followers 140 contact the first axial cam surface 132 at points 180 degrees apart. The first axial cam 130 and the first axial cam followers 140 form a form-closed axial cam-followers arrangement where both first axial cam followers 140 remain in contact with the first axial cam surface 132 independent of the first axial cam 130 rotational angular position. The first rotational axis of the rotational joint 120 is aligned axially center of the total displacement of the first axial cam surface 132.

FIG. 1-4 further depicts the second axial cam 150 as a rigid cylindrical shaped member having a through bore to provide clearance about the first axial cam 130. The bore of the second axial cam 150 has a larger diameter at one end of the second axial cam 150. The second axial cam 150 further comprises: a second axial cam surface 152 which is the axial end surface opposite the larger bore of the first axial cam 130, a second axial cam cylindrical centering surface, and a second axial cam load support surface. The second axial cam cylindrical centering surface is: a second axial cam-first axial cam centering surface 153 which is the cylindrical larger bore surface of the second axial cam 150. The second axial cam load support surface is: a second axial cam-first axial cam load support surface 154 which is the axial surface between the larger and the small diameter bore of the second axial cam 150. The second axial cam 150 is supported by the first axial cam 130 such that the second axial cam-first axial cam centering surface 153 is aligned concentrically with the first axial cam-second axial cam centering surface 135. The second axial cam-first axial cam load support surface 154 is axially aligned with the first axial cam-second axial cam load support surface 136 such that the work load force is transferred from the second axial cam 150 to the first axial cam-second axial cam load support surface 136 of the first axial cam 130.

FIG. 1-4 further depicts two second axial cam followers 160. Each second axial cam follower further comprising: a second axial cam follower link 161 rigidly attached to the work load support 124 and a second axial cam follower rolling element 162. Each of the second axial cam follower links 161 extend from the work load support 124 towards the second axial cam surface 152. The second axial cam follower rolling elements 162 are attached to each second axial cam follower link 161 at the end opposite the work load support 124 such that each second axial cam follower rolling element 162 contacts the second axial cam surface 152.

FIG. 1-4 further depicts the second axial cam surface 152 as the axial end surface of the second axial cam 150, where the second axial cam surface 152 is circular and of varying displacement along the axial axis of the second axial cam 150. At any two points 180 degrees apart on the second axial cam surface 152, the magnitude of the rise displacement is equal to the magnitude of the fall displacement as measured from the axial center of the total displacement of the second axial cam 150. Each of the second axial cam followers 160 are aligned perpendicular to the second rotational axis of the rotational joint 120 and the second axial cam followers 160 contact the second axial cam surface 152 at points 180 degrees apart. The second axial cam 150 and the second axial cam followers 160 form a form-closed axial cam-followers arrangement where both second axial cam followers 160 remain in contact with the second axial cam surface 152 independent of the second axial cam 150 rotational angular position. The second rotational axis of the rotational joint 120 is aligned axially center of the total displacement of the second axial cam surface 152.

FIG. 1-4 further depicts the first rotational axis drive unit 170 as mounted to the outside surface of the housing 100. The first rotational axis drive unit 170 has an output shaft extending inside the housing cavity 103 parallel to the centerline of the first axial cam 130. The means for coupling rotational energy from the first rotational axis drive unit 170 to the first axial cam 130 is a first rotational axis drive set. The first rotational axis drive set comprises a first rotational axis drive component 172 and a first axial cam driven component 173. In FIG. 1-4 the first rotational axis drive set is a parallel shaft drive set where the first rotational axis drive component 172 mounting is support by the first rotational axis drive unit 170 output. The first rotational axis drive component 172 is shown as an external spur gear attached to the output shaft of the first rotational axis drive unit 170. The first axial cam driven component 173 is shown as an external spur gear attached to the end of the first axial cam 130 opposite the first axial cam surface 132. The first rotational axis drive component 172 meshes with the first axial cam driven component 173, whereby coupling rotational energy from the first rotational axis drive unit 170 to the first axial cam 130. The first rotational axis drive unit 170 is a rotatory drive unit such as an electric motor, pneumatic motor, or hydraulic motor. The electric motor is the preferred first rotational axis drive unit 170.

FIG. 1-4 further depicts the second rotational axis drive unit 180 as mounted to the outside surface of the housing 100. The second rotational axis drive unit 180 has an output shaft extending inside the housing cavity 103 parallel to the centerline of the second axial cam 150. The means for coupling rotational energy from the second rotational axis drive unit 180 to the second axial cam 150 is a second rotational axis drive set. The second rotational axis drive set comprises a second rotational axis drive component 182 and a second axial cam driven component 183. In FIG. 1-4 the second rotational axis drive set is a parallel shaft drive set where the second rotational axis drive component 182 mounting is support by the second rotational axis drive unit 180 output. The second rotational axis drive component 182 is shown as an external spur gear attached to the output shaft of the second rotational axis drive unit 180. The second axial cam driven component 183 is shown as an external spur gear attached to the end of the second axial cam 150 opposite the second axial cam surface 152. The second rotational axis drive component 182 meshes with the second axial cam driven component 183, whereby coupling rotational energy from the second rotational axis drive unit 180 to the second axial cam 150. The second rotational axis drive unit 180 is a rotatory drive unit such as an electric motor, pneumatic motor, or hydraulic motor. The electric motor is the preferred second rotational axis drive unit 180.

FIG. 1-4 further depicts the third rotational axis drive unit 190 as mounted to the outside surface of the housing 100. The third rotational axis drive unit 190 has an output shaft extending inside the housing cavity 103 parallel to the centerline of the rotational joint base 110. The means for coupling rotational energy from the third rotational axis drive unit 190 to the rotational joint base 110 is a third rotational axis drive set. The third rotational axis drive set comprises a third rotational axis drive component 192 and a rotational joint base driven component 193. In FIG. 1-4 the third rotational axis drive set is a parallel shaft drive set where the third rotational axis drive component 192 mounting is support by the third rotational axis drive unit 190 output. The third rotational axis drive component 192 is shown as an external spur gear attached to the output shaft of the third rotational axis drive unit 190. The rotational joint base driven component 193 is shown as an external spur gear attached to the outer radial cylindrical surface of the rotational joint base 110 adjacent to the open end of the bore of the rotational joint base 110. The third rotational axis drive component 192 meshes with the rotational joint base driven component 193, whereby coupling rotational energy from the third rotational axis drive unit 190 to the rotational joint base 110. The third rotational axis drive unit 190 is a rotatory drive unit such as an electric motor, pneumatic motor, or hydraulic motor. The electric motor is the preferred third rotational axis drive unit 190.

FIG. 1-4 further depicts an optional feature comprising: a housing cap 108, a housing thrust bearing 109, and a second axial cam shoulder 156. The second axial cam shoulder 156 is an axial surface about the outer cylindrical surface of the second axial cam 150. The housing cap 108 is attached to the housing 100 and encircles the second axial cam shoulder 156. The housing thrust bearing 109 resides between the housing cap 108 and the second axial cam shoulder 156. The housing thrust bearing 109 is either a rolling element bearing or a sliding bearing.

FIG. 1-4 further depicts optional thrust bearings comprising: a first rotational axis thrust bearing 118, a second rotational axis thrust bearing 138, and/or a third rotational axis thrust bearing 104. The first rotational axis thrust bearing 118 resides between the rotational joint base-first axial cam load support surface 115 and the first axial cam-rotational joint base load support surface 134. The second rotational axis thrust bearing 138 resides between the first axial cam-second axial cam load support surface 136 and the second axial cam-first axial cam load support surface 154. The third rotational axis thrust bearing 104 resides between the housing-rotational joint base load support surface 102 and the rotational joint base-housing load support surface 113. The first rotational axis thrust bearing 118, second rotational axis thrust bearing 138, and/or third rotational axis thrust bearing 104 are either a rolling element bearing and/or a sliding bearing.

FIG. 1-4 further depicts optional radial bearings comprising: a first rotational axis radial bearing 119, a second rotational axis radial bearing 139, and/or a third rotational axis radial bearing 105. The first rotational axis radial bearing 119 resides between the rotational joint base-first axial cam centering surface 114 and the first axial cam-rotational joint base centering surface 133. The second rotational axis radial bearing 139 resides between the first axial cam-second axial cam centering surface 135 and the second axial cam-first axial cam centering surface 153. The third rotational axis radial bearing 105 resides between the housing-rotational joint base centering surface 101 and the rotational joint base-housing centering surface 112. The first rotational axis radial bearing 119, second rotational axis radial bearing 139, and/or third rotational axis radial bearing 105 are either a rolling element bearing and/or a sliding bearing.

Operation—Preferred Embodiment: FIG. 1-FIG. 4

The manner of using the motion-positioning apparatus 199 for generating rotational movement of the work load simultaneously or individually about any combination of the first rotational axis, the second rotational axis, and/or third rotational axis of the three orthogonal axes system comprises the steps of:

a) Supporting the work load about the rotational joint 120 which has two-degrees of rotational freedom, where the axes of rotation of the rotational joint 120 are the first rotational axis and the second rotational axis.

b) Generating rotational energy by rotating the output of the first rotational axis drive unit 170.

c) Coupling the rotational energy from the first rotational axis drive unit 170 to the first axial cam 130 through the first rotational axis drive set by the engagement of the first rotational axis drive component 172 with the first axial cam driven component 173.

d) Producing displacement about the axial axis of the first axial cam surface 132 by rotating the first axial cam 130, where the first axial cam surface 132 is circular and of varying axial displacement.

e) Displacing the first axial cam followers 140 which contact the first axial cam surface 132 in a form-closed axial cam-follower arrangement. The first axial cam followers 140 are aligned perpendicular to the first rotational axis of the rotational joint 120.

f) Transmitting through the first axial cam followers 140 to the work load the displacement of the first axial cam surface 132.

g) Transforming the displacement of the first axial cam surface 132 into a work load torque about the first rotational axis of the rotational joint 120, whereby the work load is rotated about the first rotational axis of the rotational joint 120.

h) Generating rotational energy by rotating the output of the second rotational axis drive unit 180.

i) Coupling the rotational energy from the second rotational axis drive unit 180 to the second axial cam 150 through the second rotational axis drive set by the engagement of the second rotational axis drive component 182 with the second axial cam driven component 183.

j) Producing displacement about the axial axis of the second axial cam surface 152 by rotating the second axial cam 150, where the second axial cam surface 152 is circular and of varying axial displacement.

k) Displacing the second axial cam followers 160 which contact the second axial cam surface 152 in a form-closed axial cam-follower arrangement. The second axial cam followers 160 are aligned perpendicular to the second rotational axis of the rotational joint 120.

l) Transmitting through the second axial cam followers 160 to the work load the displacement of the second axial cam surface 152.

m) Transforming the displacement of the second axial cam surface 152 into a work load torque about the second rotational axis of the rotational joint 120, whereby the work load is rotated about the second rotational axis of the rotational joint 120.
n) Generating rotational energy by rotating the output of the third rotational axis drive unit 190.
o) Coupling the rotational energy from the third rotational axis drive unit 190 to the rotational joint base 110 through the third rotational axis drive set by the engagement of the third rotational axis drive component 192 with the rotational joint base driven component 193.
p) Rotating the rotational joint base 110, the rotational joint 120, the work load, the first axial cam followers 140, and the second axial cam followers 160 about the third rotational axis of the motion-positioning apparatus 199.
q) Communicating the angular displacement of the rotational joint base 110 by feeding-forward the angular displacement, angular velocity, and/or angular acceleration of the rotational joint base 110 to the first axial cam 130 and the second axial cam 150.
r) Compensating by rotating the first axial cam 130 and the second axial cam 150 by an angular displacement equal to the angular displacement of the rotational joint base 110 about the third rotational axis. Whereby, the axial displacement of the first axial cam followers 140 and the axial displacement of the second axial cam followers 160 are unchanged, thus the work load angular displacement about the first rotational axis and the second rotational axis remains unchanged by the angular displacement about the third rotational axis of the rotational joint base 110.

Figure 4:
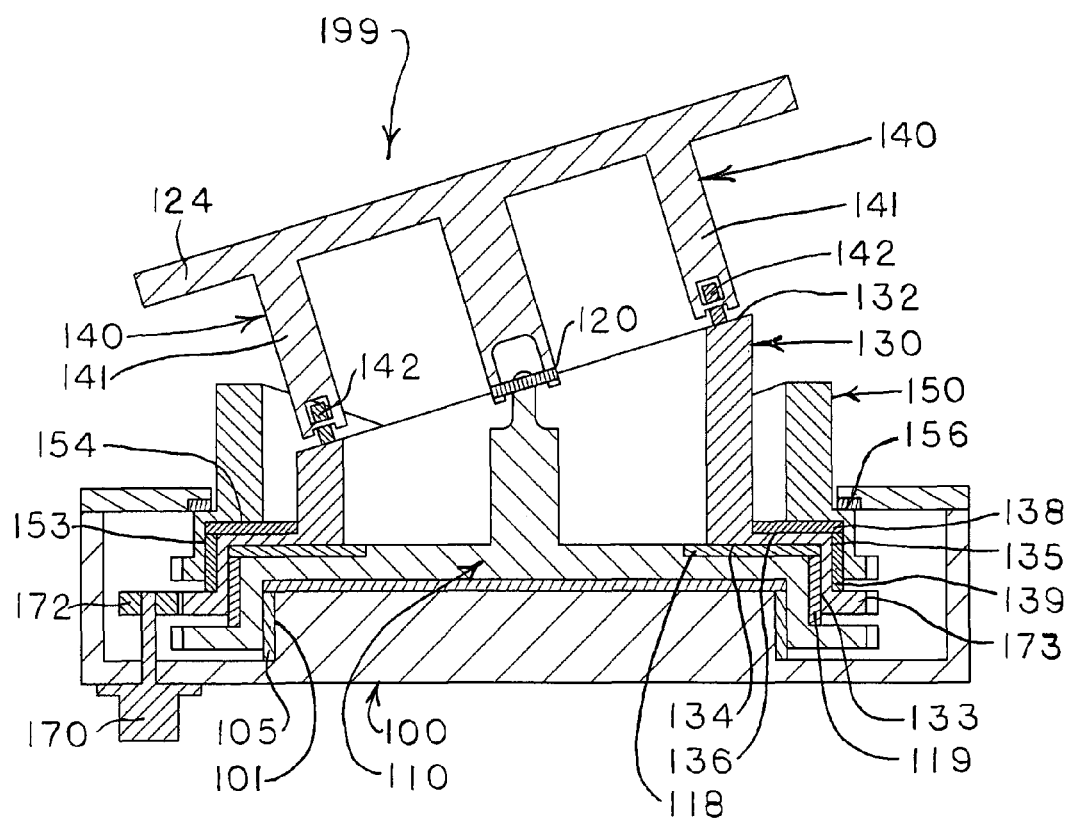

The relationship between the rotational direction of the first rotational axis drive unit 170 output and the rotation direction of the work load support 124 about the first rotational axis of the rotational joint 120 is dependent on the first axial cam 130 phasing to the first rotational axis of the rotational joint 120. When the first axial cam 130 rise displacement peak and fall displacement peak are aligned with the first axial followers 140 as shown in FIG. 4, either clockwise rotation or counter-clockwise rotation of the first rotational axis drive unit 170 output transforms into clockwise rotation of the work load support 124 about the first rotational axis of the rotational joint 120. Phasing the first axial cam 130 such that the rise displacement peak of the first axial cam surface 132 is rotated counter-clockwise greater than 0 degrees and less than 180 degrees from that shown in FIG. 4 results in clockwise rotation of the work load support 124 about the first rotational axis of the rotational joint 120 when the first rotational axis drive unit 170 output is rotated clockwise and counter-clockwise rotation of the work load support 124 about the first rotational axis of the rotational joint 120 when the first rotational axis drive unit 170 output is rotated counter-clockwise. Phasing the first axial cam 130 such that the rise displacement peak of the first axial cam surface 132 is rotated 180 degrees from that shown in FIG. 4 results in counter-clockwise rotation of the work load support about the first rotational axis of the rotational joint 120 for either clockwise or counter-clockwise rotation of the first rotational axis drive unit 170 output. Phasing the first axial cam 130 such that the rise displacement peak of the first axial cam surface 132 is rotated clockwise greater than 0 degrees and less than 180 degrees from that shown in FIG. 4 results in counter-clockwise rotation of the work load support 124 about the first rotational axis of the rotational joint 120 when the first rotational axis drive unit 170 output is rotated clockwise and clockwise rotation of the work load support 124 about the first rotational axis of the rotational joint 120 when the first rotational axis drive unit 170 output is rotated counter-clockwise.

Figure 3:
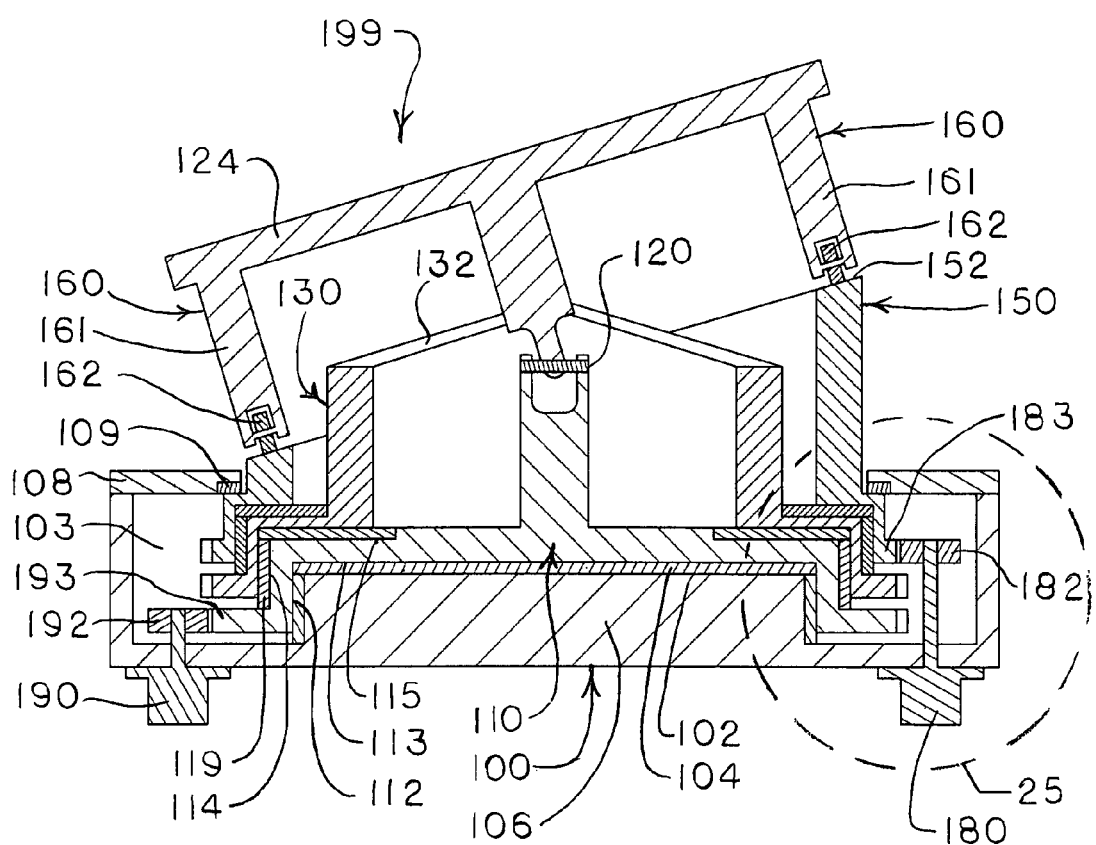
FIG. 3-4 are cross-sectional views of the motion-positioning apparatus at line 3-3 of FIG. 1 and line 4-4 of FIG. 2.

The relationship between the rotational direction of the second rotational axis drive unit 180 output and the rotation direction of the work load support 124 about the second rotational axis of the rotational joint 120 is dependent on the second axial cam 150 phasing to the second rotational axis of the rotational joint 120. When the second axial cam 150 rise displacement peak and fall displacement peak are aligned with the second axial followers 160 as shown in FIG. 3, either clockwise rotation or counter-clockwise rotation of the second rotational axis drive unit 180 output transforms into clockwise rotation of the work load support 124 about the second rotational axis of the rotational joint 120. Phasing the second axial cam 150 such that the rise displacement peak of the second axial cam surface 152 is rotated counter-clockwise greater than 0 degrees and less than 180 degrees from that shown in FIG. 3 results in clockwise rotation of the work load support 124 about the second rotational axis of the rotational joint 120 when the second rotational axis drive unit 180 output is rotated clockwise and counter-clockwise rotation of the work load support 124 about the second rotational axis of the rotational joint 120 when the second rotational axis drive unit 180 output is rotated counter-clockwise. Phasing the second axial cam 150 such that the rise displacement peak of the second axial cam surface 152 is rotated 180 degrees from that shown in FIG. 3 results in counter-clockwise rotation of the work load support about the second rotational axis of the rotational joint 120 for either clockwise or counter-clockwise rotation of the second rotational axis drive unit 180 output. Phasing the second axial cam 150 such that the rise displacement peak of the second axial cam surface 152 is rotated clockwise greater than 0 degrees and less than 180 degrees from that shown in FIG. 3 results in counter-clockwise rotation of the work load support 124 about the second rotational axis of the rotational joint 120 when the second rotational axis drive unit 180 output is rotated clockwise and clockwise rotation of the work load support 124 about the second rotational axis of the rotational joint 120 when the second rotational axis drive unit 180 output is rotated counter-clockwise.

As shown in FIG. 1-4, the rotational joint base 110, rotational joint 120, work load support 124, the first axial cam followers 140, and the second axial cam followers 160 are rotated clockwise about the third rotational axis of the motion-positioning apparatus 199 when the third rotational axis drive unit 190 output is rotated counter-clockwise. Likewise, the rotational joint base 110, rotational joint 120, work load support 124, the first axial cam followers 140, and the second axial cam followers 160 are rotated counter-clockwise about the third rotational axis of the motion-positioning apparatus 199 when the third rotational axis drive unit 190 output is rotated clockwise. To maintain angular position of the work load about the first rotational axis and second rotational axis when the rotational joint base 110 is rotated about the third rotational axis, requires that the first axial cam 130 and second axial cam 150 be rotated by an angular displacement equal to the angular displacement to the rotational joint base 110. This is achieved by feeding-forward the angular displacement, angular velocity, and/or angular acceleration of the rotational joint base 110 to the first axial cam 130 and the second axial cam 150.

Figure 5:
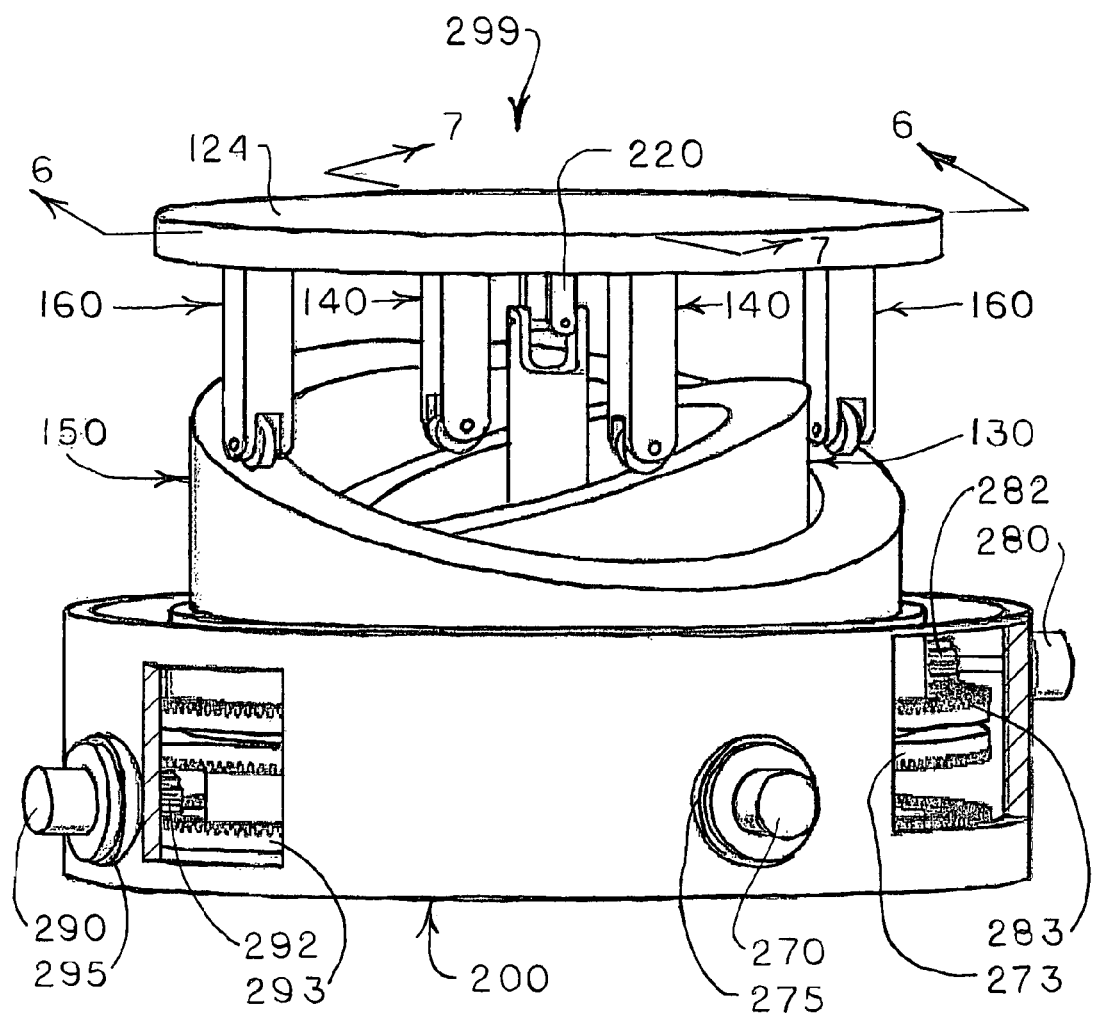
FIG. 5 is a perspective view of an alternate embodiment of the motion-positioning apparatus of FIG. 1-4 showing the means for coupling rotational energy as a 90 degree intersecting drive set.
Figure 6:
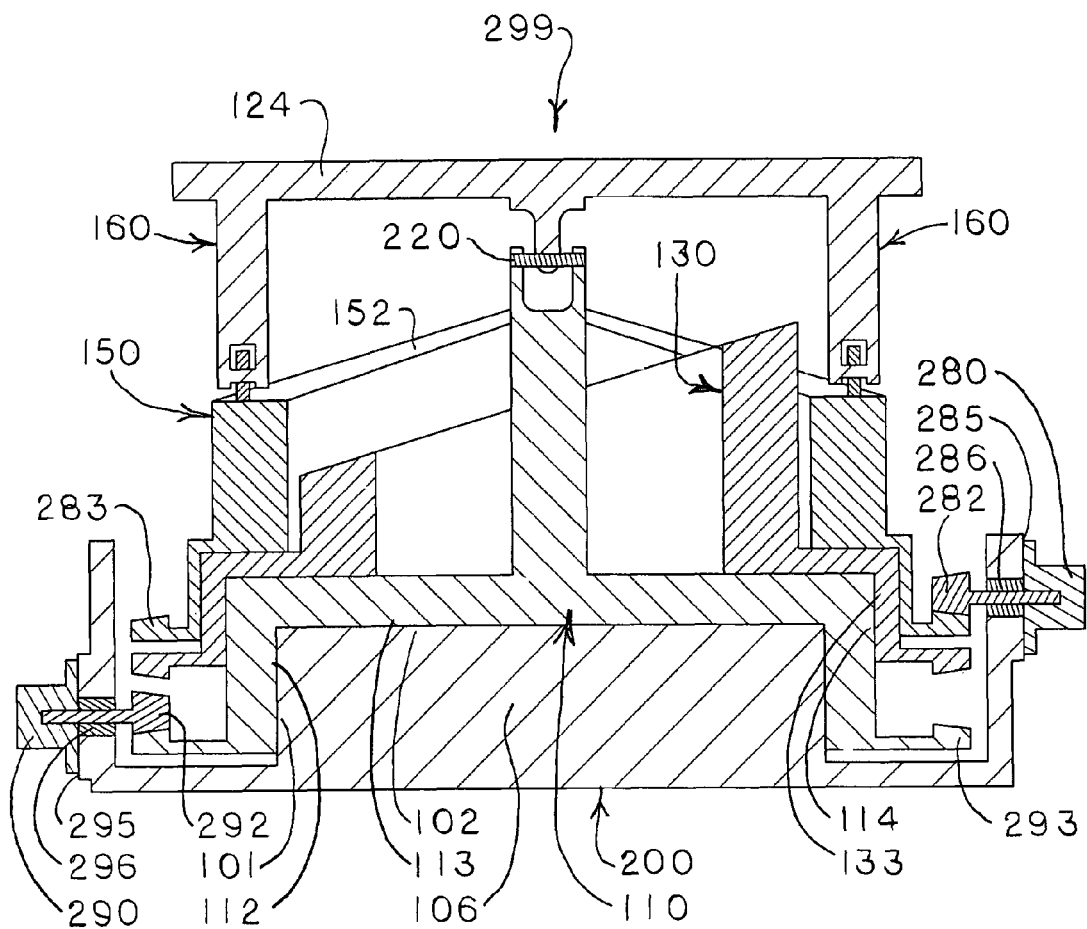
FIG. 6-7 are cross-sectional views of the motion-positioning apparatus at line 6-6 and line 7-7 of FIG. 5.
Figure 7:
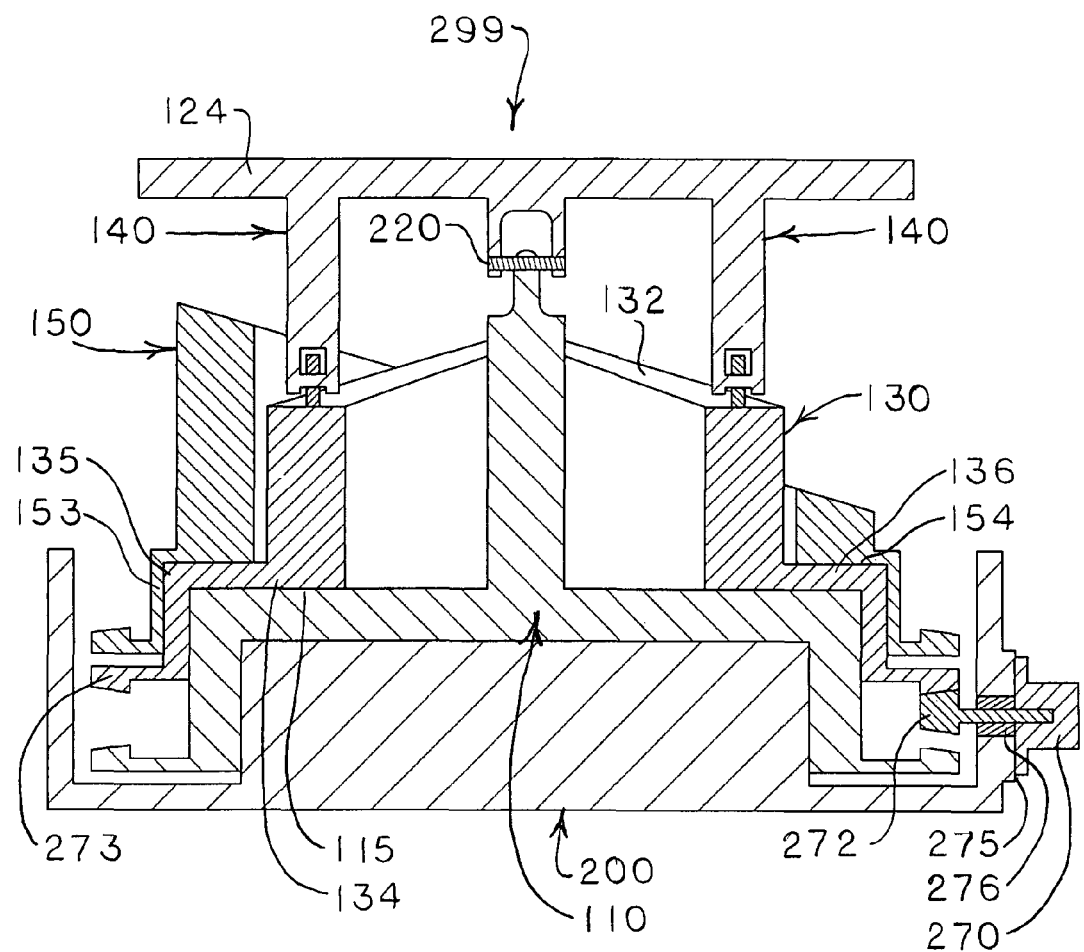

Detailed Description—Alternate Embodiment: FIG. 5-FIG. 7

FIG. 5-7 shows an alternate embodiment of the motion-positioning apparatus 299 where the first rotational axis drive set, the second rotational axis drive set, and the third rotational axis drive set are different from that shown in FIG. 1-4.

FIG. 5-7 depicts the housing 200 further comprising: a first rotational axis drive unit mounting surface 275, a second rotational axis drive unit mounting surface 285, and a third rotational axis drive unit mounting surface 295. The first rotational axis drive unit mounting surface 275, the second rotational axis drive unit mounting surface 285, and the third rotational axis drive unit mounting surface 295 are the axial end surfaces of bosses protruding from the outer radial surface of the housing 200.

FIG. 5-7 further depicts the first rotational axis drive unit 270 as mounted to the first rotational axis drive unit mounting surface 275. The first rotational axis drive set providing the means for coupling rotational energy from the first rotational axis drive unit 270 to the first axial cam 130. The first rotational axis drive set comprises: the first rotational axis drive component 272 and the first axial cam driven component 273. In FIG. 5-7 the first rotational axis drive set is a 90 degree intersecting drive set where the first rotational axis drive component 272 is overhung mounted with support by the housing 200. The first rotational axis drive component 272 is shown as a bevel pinion gear which is supported by a first rotational axis overhung bearing 276 in an overhung mounting configuration. The first rotational axis overhung bearing 276 is supported by the housing 200, where the first rotational axis overhung bearing 276 is capable of supporting both axial forces and radial forces. The axial axis of the first rotational axis drive component 272 is aligned perpendicular to and intersects the axial axis of the first axial cam 130. The shaft of the first rotational axis drive component 272 is coupled to the output of the first rotational axis drive unit 270. The first axial cam driven component 273 is shown as a bevel gear attached to the end of the first axial cam 130 opposite the first axial cam surface 132. The first rotational axis drive component 272 meshes with the first axial cam driven component 273, whereby coupling rotational energy from the first rotational axis drive unit 270 to the first axial cam 130.

FIG. 5-7 further depicts the second rotational axis drive unit 280 as mounted to the second rotational axis drive unit mounting surface 285. The second rotational axis drive set providing the means for coupling rotational energy from the second rotational axis drive unit 280 to the second axial cam 150. The second rotational axis drive set comprises: the second rotational axis drive component 282 and the second axial cam driven component 283. In FIG. 5-7 the second rotational axis drive set is a 90 degree intersecting drive set where the second rotational axis drive component 282 is overhung mounted with support by the housing 200. The second rotational axis drive component 282 is shown as a bevel pinion gear which is supported by a second rotational axis overhung bearing 286 in an overhung mounting configuration. The second rotational axis overhung bearing 286 is supported by the housing 200, where the second rotational axis overhung bearing 286 is capable of supporting both axial forces and radial forces. The axial axis of the second rotational axis drive component 282 is aligned perpendicular to and intersects the axial axis of the second axial cam 150. The shaft of the second rotational axis drive component 282 is coupled to the output of the second rotational axis drive unit 280. The second axial cam driven component 283 is shown as a bevel gear attached to the end of the second axial cam 150 opposite the second axial cam surface 152. The second rotational axis drive component 282 meshes with the second axial cam driven component 283, whereby coupling rotational energy from the second rotational axis drive unit 280 to the second axial cam 150.

FIG. 5-7 further depicts a third rotational axis drive unit 290 as mounted to the third rotational axis drive unit mounting surface 295. The third rotational axis drive set providing the means for coupling rotational energy from the third rotational axis drive unit 290 to the rotational joint base 110. The third rotational axis drive set comprises: the third rotational axis drive component 292 and the rotational joint base driven component 293. In FIG. 5-7 the third rotational axis drive set is a 90 degree intersecting drive set where the third rotational axis drive component 292 is overhung mounted with support by the housing 200. The third rotational axis drive component 292 is shown as a bevel pinion gear which is supported by a third rotational axis overhung bearing 296 in an overhung mounting configuration. The third rotational axis overhung bearing 296 is supported by the housing 200, where the third rotational axis overhung bearing 296 is capable of supporting both axial forces and radial forces. The axial axis of the third rotational axis drive component 292 is aligned perpendicular to and intersects the axial axis of the rotational joint base 110. The shaft of the third rotational axis drive component 292 is coupled to the output of the third rotational axis drive unit 290. The rotational joint base driven component 293 is shown as a bevel gear attached to the outer cylindrical surface of the rotational joint base 110. The third rotational axis drive component 292 meshes with the rotational joint base driven component 293, whereby coupling rotational energy from the third rotational axis drive unit 290 to the rotational joint base 110.

FIG. 5-7 further depicts the rotational joint 220 as a two degree of rotational freedom joint. The rotational joint 220 is attached to the work load support such that the rotatable side of the rotational joint 220 is of minimum length.

FIG. 5-7 further depicts the motion-positioning apparatus 299 without the optional radial bearings and without the optional thrust bearings as shown in FIG. 1-4. The motion-positioning apparatus 299 in FIG. 5-7 is also depicted without the optional housing cap as shown in FIG. 1-4.

Figure 8:
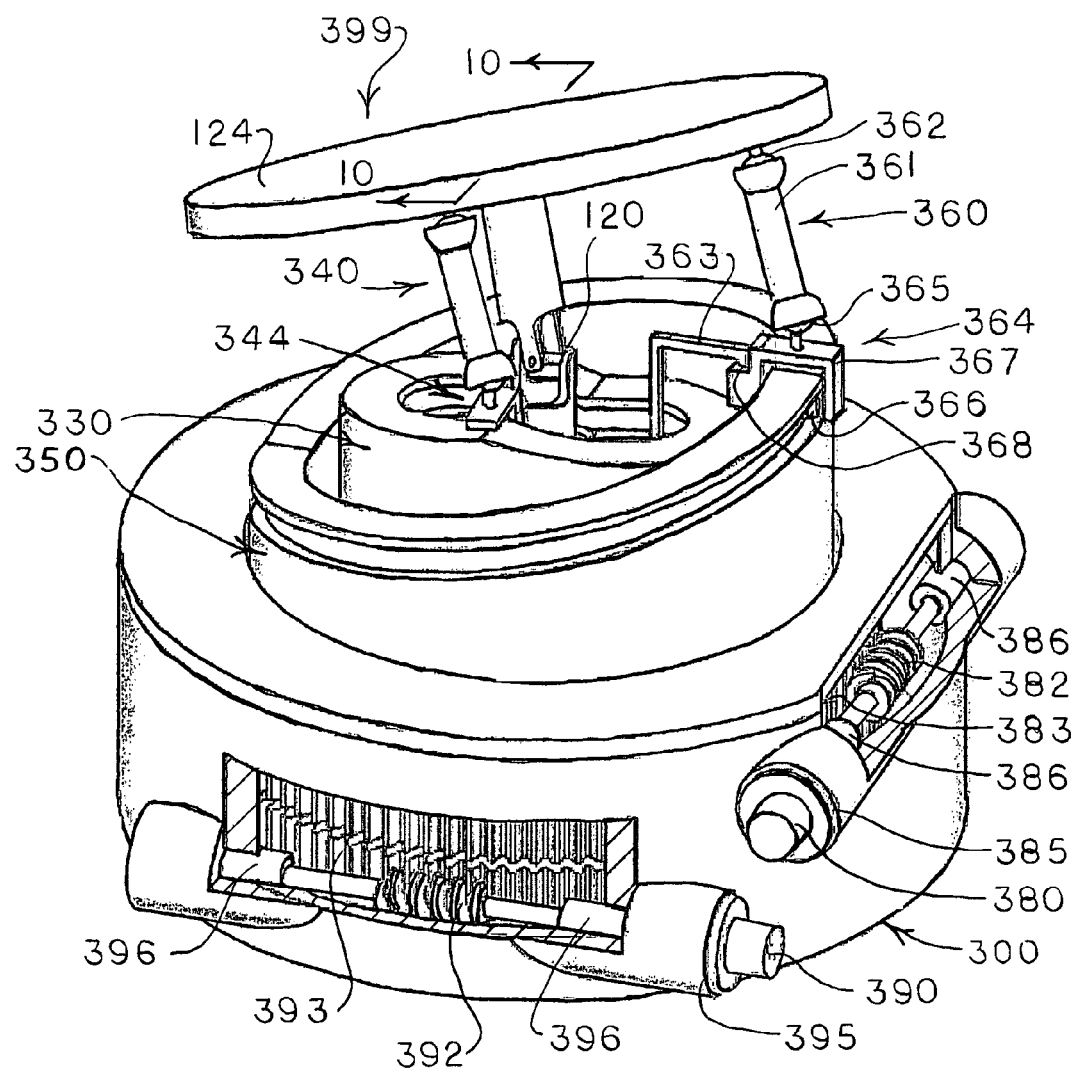
FIG. 8-9 are perspective views of an alternate embodiment of the motion-positioning apparatus of FIG. 1-4 showing an alternate axial cam-follower configuration and the means for coupling rotational energy as a 90 degree non-intersecting drive set.
Figure 9:
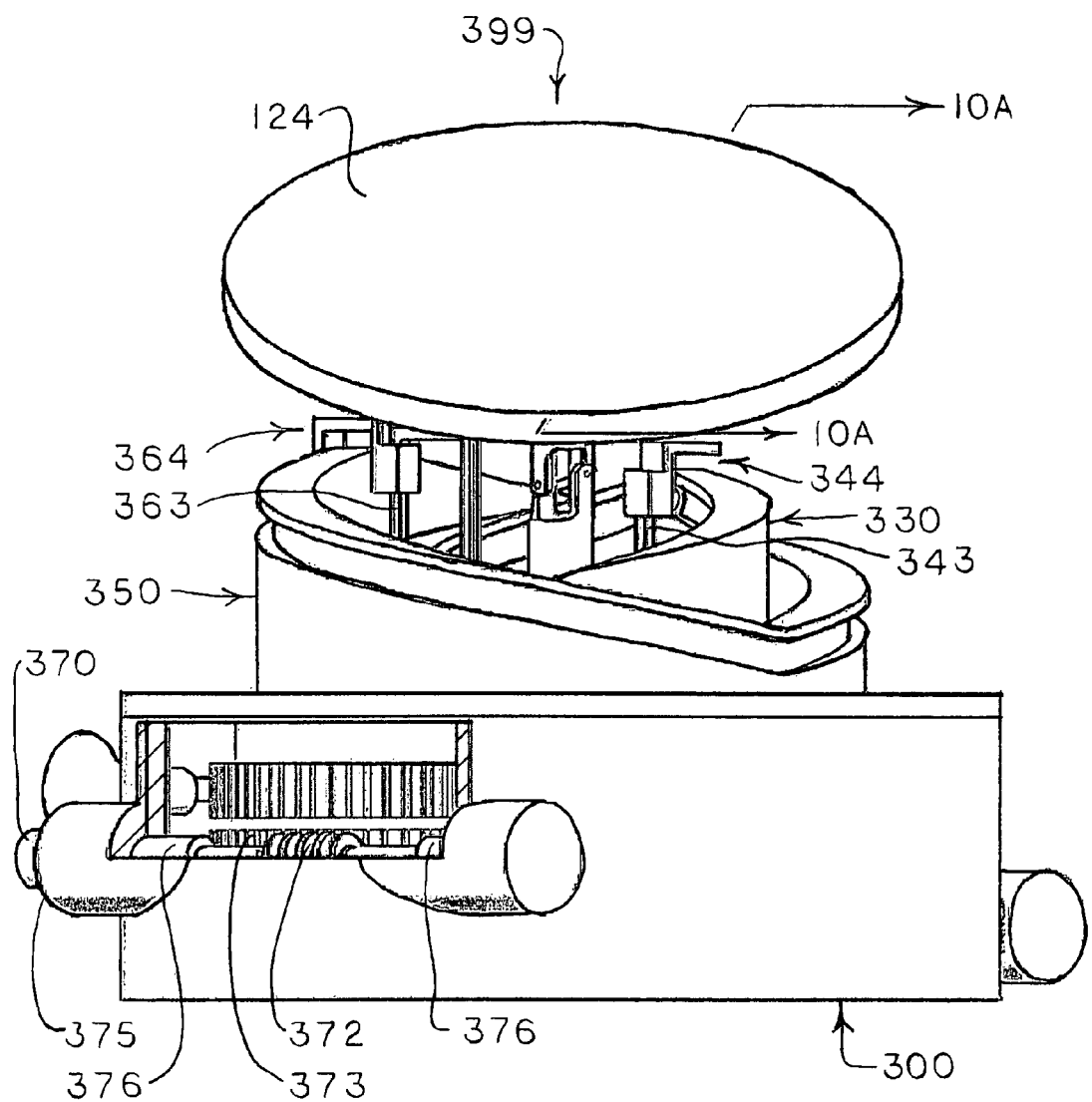
Figure 10:
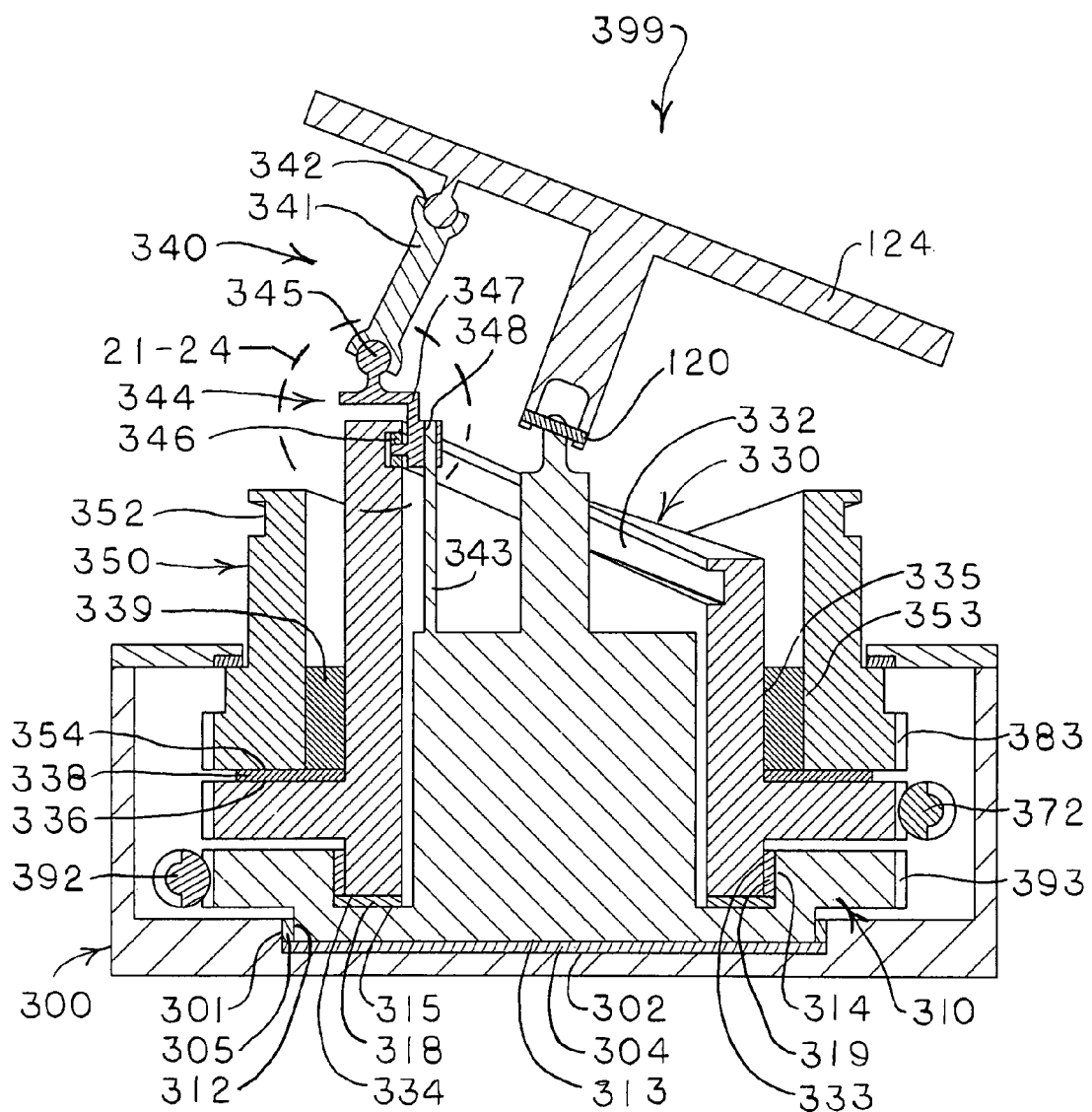
FIG. 10 is a cross-sectional view of the motion-positioning apparatus at line 10-10 of FIG. 8.

Detailed Description—Alternate Embodiment: FIG. 8-FIG. 10

FIG. 8-10 shows an alternate embodiment of the motion-positioning apparatus 399 from that shown in FIG. 1-4. In FIG. 8-10 the housing cylindrical contour of the housing 300 is a closed end bore instead of a cylinder as shown for the housing 100 in FIG. 1-4. In FIG. 8-10 the housing cylindrical centering surface is the housing-rotational joint base centering surface 301 which is the closed end bore cylindrical surface of the housing 300. The housing load support surface is the housing-rotational joint base load support surface 302 which is the closed end bore axial end surface of the housing 300.

In FIG. 8-10 the closed end bore of the rotational joint base 310 is associated with the mating surfaces of the first axial cam 330 instead of the housing 100 as in FIG. 1-4. In FIG. 8-10 the closed end bore is located on the side of the rotational joint base 310 which is opposite the housing 300. The rotational joint base-first axial cam centering surface 314 is the closed end bore cylindrical surface of the rotational joint base 310. The rotational joint base-first axial cam load support surface 315 is the closed end bore axial end surface of the rotational joint base 310. The rotational joint base-housing centering surface 312 is the cylindrical surface opposite the closed end bore of the rotational joint base 310. The rotational joint base-housing centering surface 312 is aligned concentrically with the housing-rotational joint base centering surface 301. The rotational joint base-housing load support surface 313 is the axial end surface of the rotational joint base 310. The rotational joint base-housing load support surface 313 is axially aligned with the housing-rotational joint base load support surface 302 such that the work load force of the rotational joint base 310 is transferred to the housing-rotational joint base load support surface 302 of the housing 300. The rotational joint base 310 has a cylinder shaped surface protruding from the center of the closed end bore. The stationary side to the rotational joint 120 is mounted center of the rotational joint base 310 and the rotatable side of the rotational joint 120 is attached to the work load support 124 such that the work load support is rotatable about the first rotational axis and second rotational axis of the rotational joint 120.

The first axial cam cylindrical centering surfaces and the first axial cam load support surfaces of the first axial cam 330 along with the first axial cam surface 332 are reconfigured in FIG. 8-10 from that shown for the first axial cam 130 in FIG. 1-4. In FIG. 8-10, the cylindrical shaped first axial cam 330 has a flange axially located between the first axial cam surface 332 and the end opposite the first axial cam surface 332. The first axial cam-second axial cam centering surface 335 is the outer cylindrical surface of the first axial cam 330 between the first axial cam surface 332 and the flange of the first axial cam 330. The first axial cam-second axial cam load support surface 336 is the flange axial surface of the first axial cam 330 adjacent the first axial cam-second axial cam centering surface 335. The first axial cam-rotational joint base centering surface 333 is the outer cylindrical surface of the first axial cam 330 between the flange and the end of the first axial cam 330 opposite the first axial cam surface 332. The first axial cam-rotational joint base load support surface 334 is the axial end surface of the first axial cam 330 opposite the first axial cam surface 332. The first axial cam-rotational joint base centering surface 333 is aligned concentrically with the rotational joint base-first axial cam centering surface 314. The first axial cam-rotational joint base load support surface 334 is axially aligned with the rotational joint base-first axial cam load support surface 315 such that the work load force from the first axial cam 330 is transferred to the rotational joint base-first axial cam load support surface 315 of the rotational joint base 310. The first axial cam surface 332 is shown as a groove about the hollow center of the first axial cam 330.

FIG. 8-10 depicts a single first axial cam follower 340. The first axial cam follower 340 comprises: a first axial cam follower connecting link 341, a first axial cam follower rotational joint 342, a first axial cam tracker 344, and means for guiding along a path parallel to the axial axis of the first axial cam 330, the first axial cam tracker 344 through the range of the displacement of the first axial cam surface 332. The first axial cam tracker 344 further comprises: a first axial cam tracker frame 347, a first axial cam tracker rolling element 346, and a first axial cam tracker rotational joint 345. The first axial cam tracker rolling element 346 tracks in the groove of the first axial cam surface 332. The first axial cam tracker rolling element 346 is supported by the first axial cam tracker frame 347 which is L-shaped and resides adjacent the groove of the first axial cam surface 332. The means for guiding along a path parallel to the axial axis of the first axial cam 330, the first axial cam tracker 344 through the range of the displacement of the first axial cam surface 332 comprises: a first axial cam tracker guide 343, and a first axial cam tracker guided surface 348. The first axial cam tracker guide 343 is at least one rod extending from the rotational joint base 310 axially along the hollow center surface of the first axial cam 330 and perpendicular to the first rotational axis of the rotational joint 120. The first axial cam tracker guided surface 348 is at least one surface extending axially through the first axial cam tracker frame 347. The first axial cam tracker guided surface 348 engages the first axial cam tracker guide 343 such that the first axial cam tracker 344 will transverse axially along the first axial cam tracker guide 343 through the range of the displacement of the first axial cam surface 332 when the first axial cam 330 is rotated. The first axial cam tracker guide 343 and first axial cam tracker guided surface 348 has zero or more axially planar surfaces to prevent the first axial cam tracker 344 from rotating about the first axial cam tracker guide 343. The first axial cam tracker guided surface 348 selected from the group consisting of sliding surfaces or rolling elements. The first axial cam tracker rotational joint 345 is attached to the first axial cam frame 347 and extends axially from the first axial cam 330. The first axial cam follower rotational joint 342 is attached to the work load support 124 perpendicular to the first rotational axis of the rotational joint 120. The first axial cam follower connecting link 341 is connected between the first axial cam follower rotational joint 342 and the first axial cam tracker rotational joint 345. In FIG. 8-10 the first axial cam follower rotational joint 342 and first axial cam tracker rotational joint 345 are shown as ball and socket joints. The first axial cam follower 340 forms a form-closed axial cam-followers arrangement with the first axial cam surface 332, thus the magnitude of the rise displacement need not equal the magnitude of the fall displacement at points 180 degrees apart on the first axial cam surface 332.

The second axial cam cylindrical centering surface and the second axial cam load support surface of the second axial cam 350 along with the second axial cam surface 352 are reconfigured in FIG. 8-10 from that shown for the second axial cam 150 in FIG. 1-4. In FIG. 8-10, the cylindrical shaped second axial cam 350 has a bore. The second axial cam-first axial cam centering surface 353 is the bore surface adjacent the end of the second axial cam 350 opposite the second axial cam surface 352. The second axial cam-first axial cam load support surface 354 is the axial end surface of the second axial cam 350 opposite the second axial cam surface 352. The second axial cam-first axial cam centering surface 353 is aligned concentrically with the first axial cam-second axial cam centering surface 335. The second axial cam-first axial cam load support surface 354 is axially aligned with the first axial cam-second axial cam load support surface 336 such that the work load force from the second axial cam 350 is transferred to the first axial cam-second axial cam load support surface 336 of the first axial cam 330. The second axial cam surface 352 is shown as a groove about the outer cylindrical surface of the second axial cam 350.

FIG. 8-10 depicts a single second axial cam follower 360. The second axial cam follower 360 comprises: a second axial cam follower connecting link 361, a second axial cam follower rotational joint 362, a second axial cam tracker 364, and means for guiding along a path parallel to the axial axis of the second axial cam 350, the second axial cam tracker 364 through the range of the displacement of the second axial cam surface 352. The second axial cam tracker 364 further comprises: a second axial cam tracker frame 367, a second axial cam tracker rolling element 366, and a second axial cam tracker rotational joint 365. The second axial cam tracker rolling element 366 tracks in the groove of the second axial cam surface 352. The second axial cam tracker rolling element 366 is supported by the second axial cam tracker frame 367 which is U-shaped and resides adjacent the groove of the second axial cam surface 352. The means for guiding along a path parallel to the axial axis of the second axial cam 350, the second axial cam tracker 364 through the range of the displacement of the second axial cam surface 352 comprises: a second axial cam tracker guide 363, and a second axial cam tracker guided surface 368. The second axial cam tracker guide 363 is at least one rod extending from the rotational joint base 310 while clearing the peak of the first axial cam 330 to extend between the first axial cam 330 and the second axial cam 350. The second axial cam tracker guide 363 is aligned perpendicular to the second rotational axis of the rotational joint 120. The second axial cam tracker guided surface 368 is at least one surface extending axially through the second axial cam tracker frame 367. The second axial cam tracker guided surface 368 engages the second axial cam tracker guide 363 such that the second axial cam tracker 364 will transverse axially along the second axial cam tracker guide 363 through the range of the displacement of the second axial cam surface 352 when the second axial cam 350 is rotated. The second axial cam tracker guide 363 and second axial cam tracker guided surface 368 has zero or more axially planar surfaces to prevent the second axial cam tracker 364 from rotating about the second axial cam tracker guide 363. The second axial cam tracker guided surface 368 selected from the group consisting of sliding surfaces or rolling elements. The second axial cam tracker rotational joint 365 is attached to the second axial cam tracker frame 367 and extends axially from the second axial cam 350. The second axial cam follower rotational joint 362 is attached to the work load support 124 perpendicular to the second rotational axis of the rotational joint 120. The second axial cam follower connecting link 361 is connected between the second axial cam follower rotational joint 362 and the second axial cam tracker rotational joint 365. In FIG. 8-10 the second axial cam follower rotational joint 362 and second axial cam tracker rotational joint 365 are shown as ball and socket joints. The second axial cam follower 360 forms a form-closed axial cam-followers arrangement with the second axial cam surface 352, thus the magnitude of the rise displacement need not equal the magnitude of the fall displacement at points 180 degrees apart on the second axial cam surface 352.

FIG. 8-10 depicts the housing 300 as further comprising: a first rotational axis drive unit mounting surface 375, a second rotational axis drive unit mounting surface 385, and a third rotational axis drive unit mounting surface 395. The first rotational axis drive unit mounting surface 375, the second rotational axis drive unit mounting surface 385, and the third rotational axis drive unit mounting surface 395 are the axial end surface of bosses tangent to the outer radial surface of the housing 300 where the centerline of the bosses are aligned perpendicular to and non-intersecting of the centerline of the housing-rotational joint base centering surface 301.

FIG. 8-10 further depicts the first rotational axis drive unit 370 as mounted to the first rotational axis drive unit mounting surface 375. The first rotational axis drive set providing the means for coupling rotational energy from the first rotational axis drive unit 370 to the first axial cam 330. The first rotational axis drive set comprises: the first rotational axis drive component 372 and the first axial cam driven component 373. In FIG. 8-10 the first rotational axis drive set is a 90 degree non-intersecting drive set where the first rotational axis drive component 372 is straddle mounted with support by the housing 300. The first rotational axis drive component 372 is shown as a worm which is supported by two first rotational axis' straddle bearings 376 in a straddle mounting configuration, where the first rotational axis straddle bearings 376 are located on both shaft sides of the first rotational axis drive component 372. The first rotational axis straddle bearings 376 are supported by the housing 300, where the first rotational axis straddle bearings 376 are capable of supporting both axial forces and radial forces. The axial axis of the first rotational axis drive component 372 is aligned perpendicular to and non-intersecting of the axial axis of the first axial cam 330. The shaft of the first rotational axis drive component 372 is coupled to the output of the first rotational axis drive unit 370. The first axial cam driven component 373 is a worm gear attached to the end of the first axial cam 330 opposite the first axial cam surface 332. The first rotational axis drive component 372 meshes with the first axial cam driven component 373, whereby coupling rotational energy from the first rotational axis drive unit 370 to the first axial cam 330.

FIG. 8-10 further depicts the second rotational axis drive unit 380 as mounted to the second rotational axis drive unit mounting surface 385. The second rotational axis drive set providing the means for coupling rotational energy from the second rotational axis drive unit 380 to the second axial cam 350. The second rotational axis drive set comprises: the second rotational axis drive component 382 and the second axial cam driven component 383. In FIG. 8-10 the second rotational axis drive set is a 90 degree non-intersecting drive set where the second rotational axis drive component 382 is straddle mounted with support by the housing 300. The second rotational axis drive component 382 is shown as a worm which is supported by two second rotational axis straddle bearings 386 in a straddle mounting configuration, where the second rotational axis straddle bearings 386 are located on both shaft sides of the second rotational axis drive component 382. The second rotational axis straddle bearings 386 are supported by the housing 300, where the second rotational axis straddle bearings 386 are capable of supporting both axial forces and radial forces. The axial axis of the second rotational axis drive component 382 is aligned perpendicular to and non-intersecting of the axial axis of the second axial cam 350. The shaft of the second rotational axis drive component 382 is coupled to the output of the second rotational axis drive unit 380. The second axial cam driven component 383 is shown as a worm gear attached to the end of the second axial cam 350 opposite the second axial cam surface 352. The second rotational axis drive component 382 meshes with the second axial cam driven component 383, whereby coupling rotational energy from the second rotational axis drive unit 380 to the second axial cam 350.

FIG. 8-10 further depicts the third rotational axis drive unit 390 as mounted to the third rotational axis drive unit mounting surface 395. The third rotational axis drive set providing the means for coupling rotational energy from the third rotational axis drive unit 390 to the rotational joint base 310. The third rotational axis drive set comprises: the third rotational axis drive component 392 and the rotational joint base driven component 393. In FIG. 8-10 the third rotational axis drive set is a 90 degree non-intersecting drive set where the third rotational axis drive component 392 is straddle mounted with support by the housing 300. The third rotational axis drive component 392 is shown as a worm which is supported by two third rotational axis straddle bearings 396 in a straddle mounting configuration, where the third rotational axis straddle bearings 396 are located on both shaft sides of the third rotational axis drive component 392. The third rotational axis straddle bearings 396 are supported by the housing 300, where the third rotational axis straddle bearings 396 are capable of supporting both axial forces and radial forces. The axial axis of the third rotational axis drive component 392 is aligned perpendicular to and non-intersecting of the axial axis of the rotational joint base 310. The shaft of the third rotational axis drive component 392 is coupled to the output of the third rotational axis drive unit 390. The rotational joint base driven component 393 is shown as a worm gear attached to the rotational joint base 310. The third rotational axis drive component 392 meshes with the rotational joint base driven component 393, whereby coupling rotational energy from the third rotational axis drive unit 390 to the rotational joint base 310.

FIG. 8-10 further depicts the use of optional thrust bearings. The first rotational axis thrust bearing 318 resides between the rotational joint base-first axial cam load support surface 315 and the first axial cam-rotational joint base load support surface 334. The second rotational axis thrust bearing 338 resides between the first axial cam-second axial cam load support surface 336 and the second axial cam-first axial cam load support surface 354. The third rotational axis thrust bearing 304 resides between the housing-rotational joint base load support surface 302 and the rotational joint base-housing load support surface 313. The first rotational axis thrust bearing 318, the second rotational axis thrust bearing 338, and/or the third rotational axis thrust bearing 304 are either a rolling element bearing and/or a sliding bearing.

FIG. 8-10 further depicts the use of optional radial bearings. The first rotational axis radial bearing 319 resides between the rotational joint base-first axial cam centering surface 314 and the first axial cam-rotational joint base centering surface 333. The second rotational axis radial bearing 339 resides between the first axial cam-second axial cam centering surface 335 and the second axial cam-first axial cam centering surface 353. The third rotational axis radial bearing 305 resides between the housing-rotational joint base centering surface 301 and the rotational joint base-housing load support surface 312. The first rotational axis radial bearing 319, the second rotational axis radial bearing 339, and/or the third rotational axis radial bearing 305 are either a rolling element bearing and/or a sliding bearing.

Figure 10A:
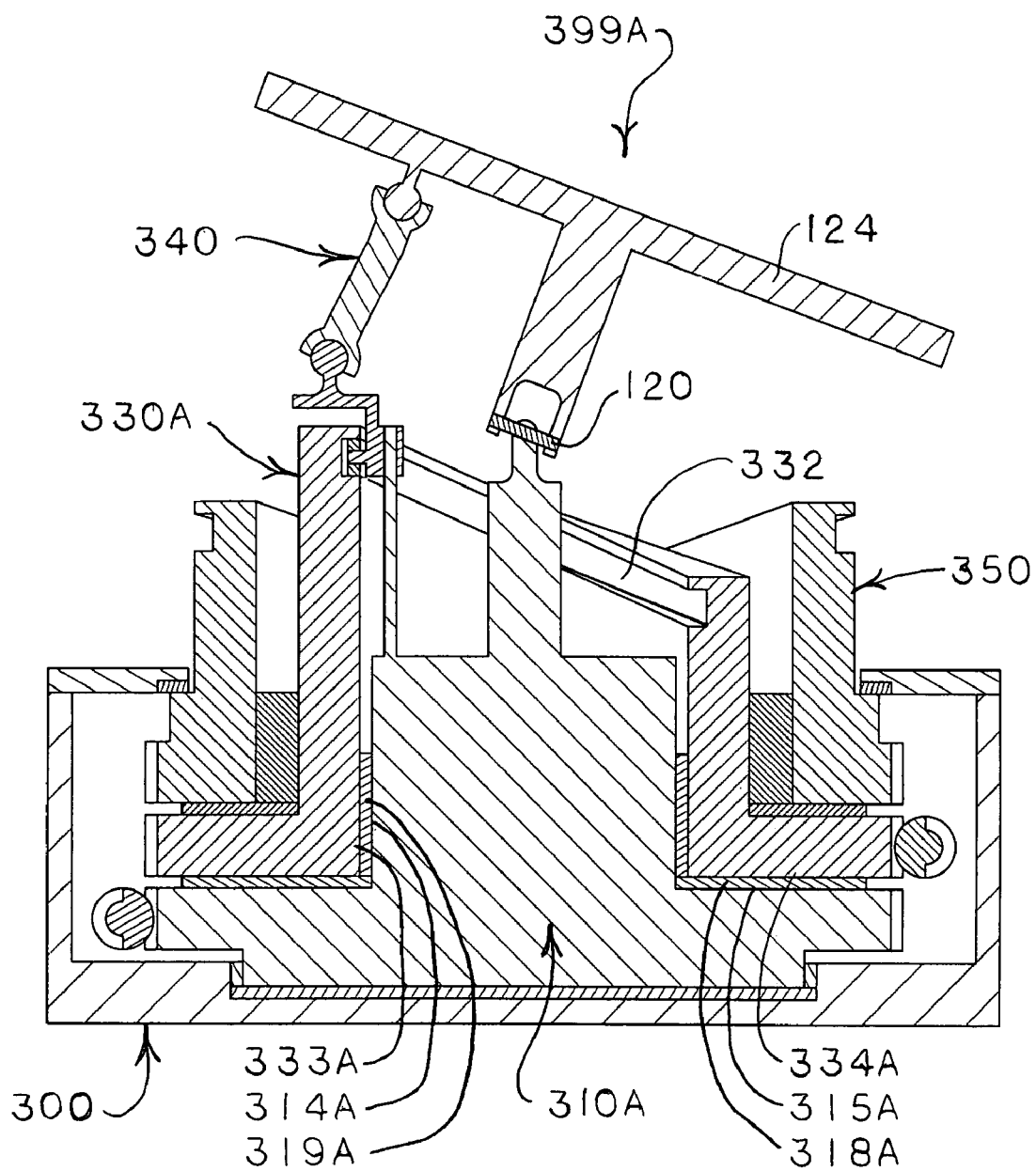
FIG. 10A is a cross-sectional of the motion-positioning apparatus at line 10A-10A of FIG. 9 showing an alternate cylindrical centering surface and load support surface configuration of that shown in FIG. 10.

Detailed Description—Alternate Embodiment: FIG. 10A

FIG. 10A shows an alternate embodiment of a motion-positioning apparatus 399A from that shown in FIG. 8-10 for the motion-positioning apparatus 399. In FIG. 10A the rotational joint base 310A does not have a closed end bore like that shown in FIG. 8-10 for the rotational joint base 310. In FIG. 10A the rotational joint base-first axial cam centering surface 314A is the outer cylindrical surface of the cylinder shaped surface extending from the center of the rotational joint base 310A, on which the rotational joint 120 is attached. The rotational base joint-first axial cam load support surface 315A is the axial surface of the rotational joint base 310A adjacent to the rotational joint base-first axial cam centering surface 314A. The first axial cam-rotational joint base centering surface 333A is the bore surface of the first axial cam 330A. The first axial cam-rotational joint base load support surface 334A is the axial end surface of the first axial cam 330A opposite the first axial cam surface 332. The first axial cam-rotational joint base centering surface 333A is aligned concentrically with the rotational joint base-first axial cam centering surface 314A. The first axial cam-rotational joint base load support surface 334A is axially aligned with the rotational joint base-first axial cam load support surface 315A such that the work load force is transferred from the first axial cam 330A to the rotational joint base-first axial cam load support surface 315A of the rotational joint base 310A. The optional first rotational axis thrust bearing 318A resides between the rotational joint base-first axial cam load support surface 315A and the first axial cam-rotational joint base load support surface 334A. The optional first rotational axis radial bearing 319A resides between the rotational joint base-first axial cam load centering surface 314A and the first axial cam-rotational joint base centering support surface 333A. The first rotational axis thrust bearing 318A and the first rotational axis radial bearing 319A are rolling element bearings and/or sliding bearings.

Figure 11:
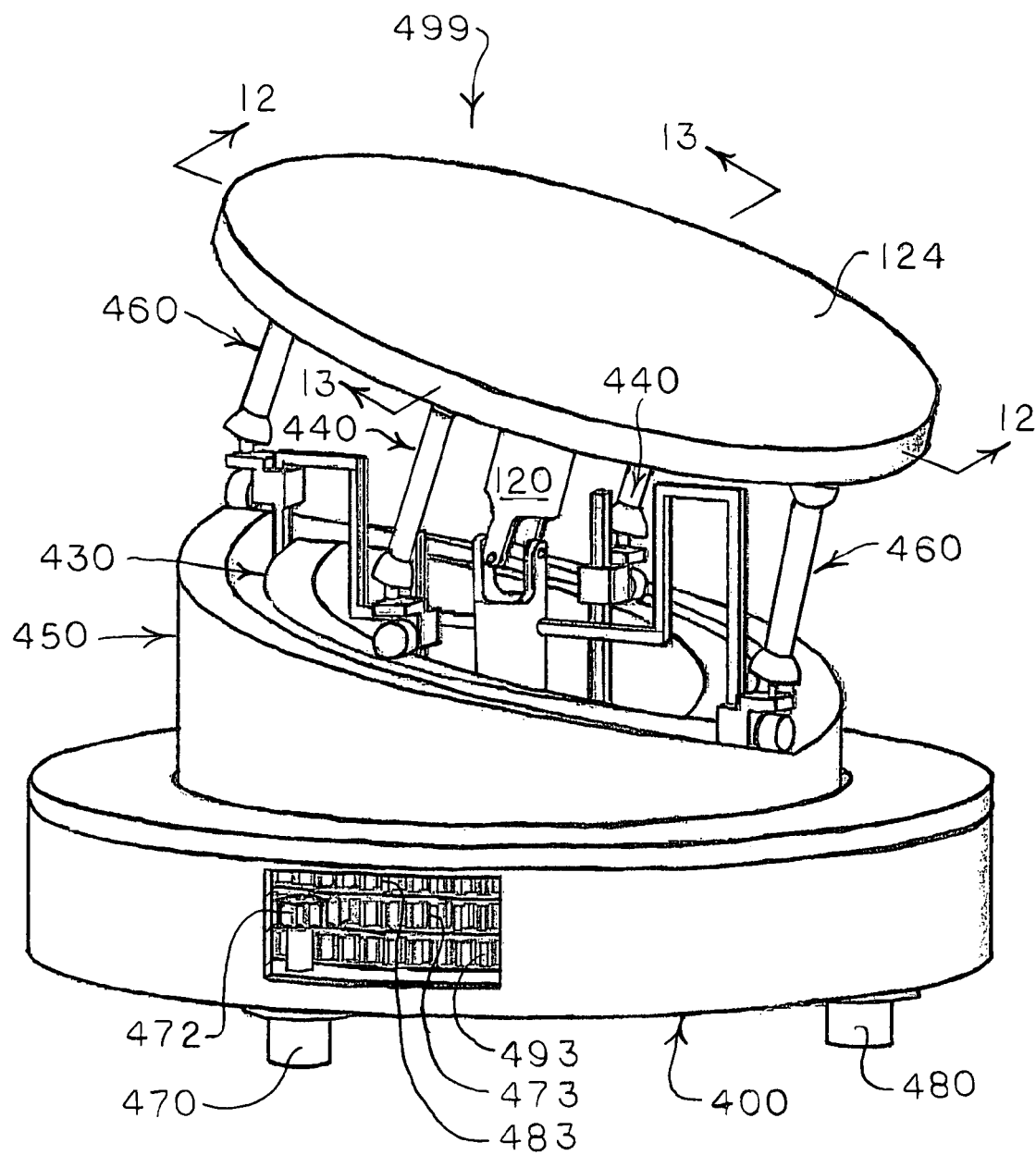
FIG. 11 is a perspective view of an alternate embodiment of the motion-positioning apparatus of FIG. 1-4 showing alternate load support surfaces and alternate axial cam-follower configuration.
Figure 12:
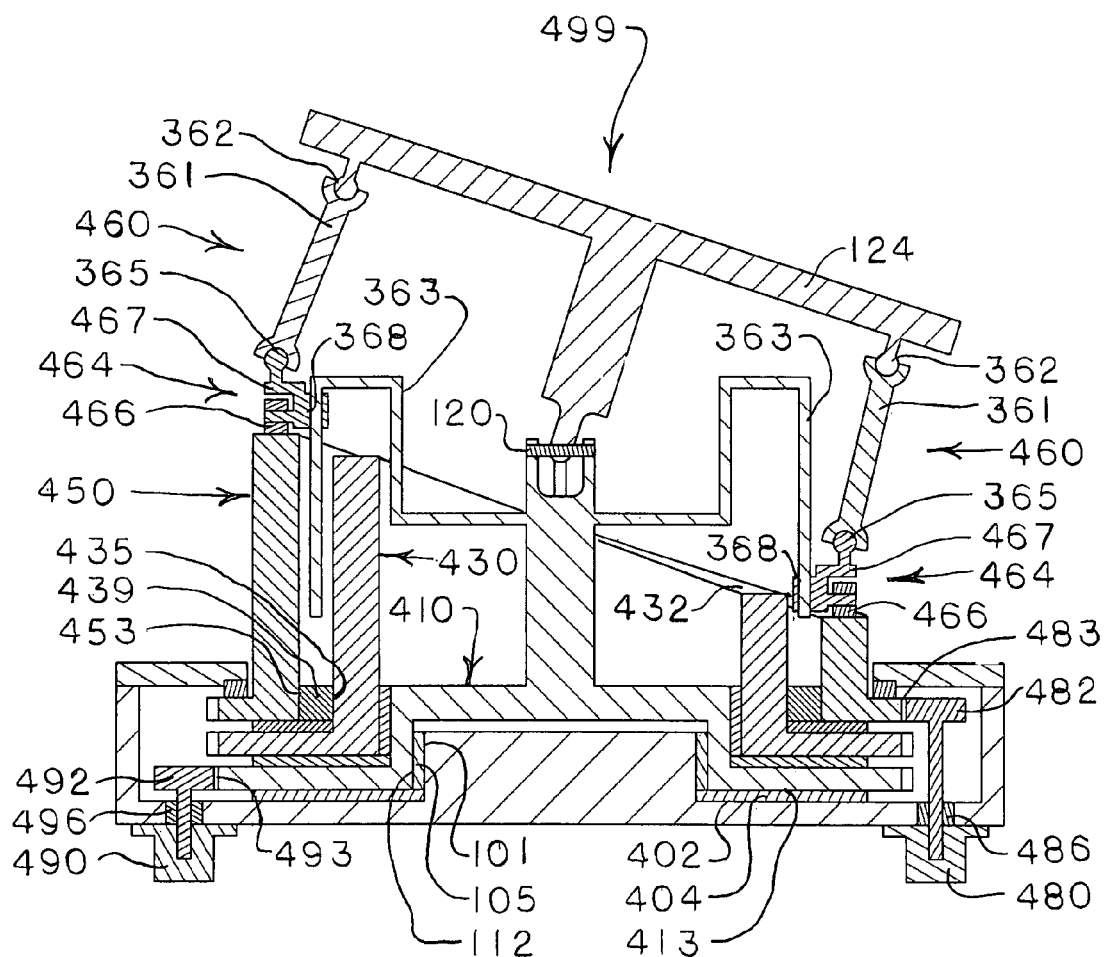
FIG. 12-13 are cross-sectional views of the motion-positioning apparatus at line 12-12 and line 13-13 of FIG. 11.
Figure 13:
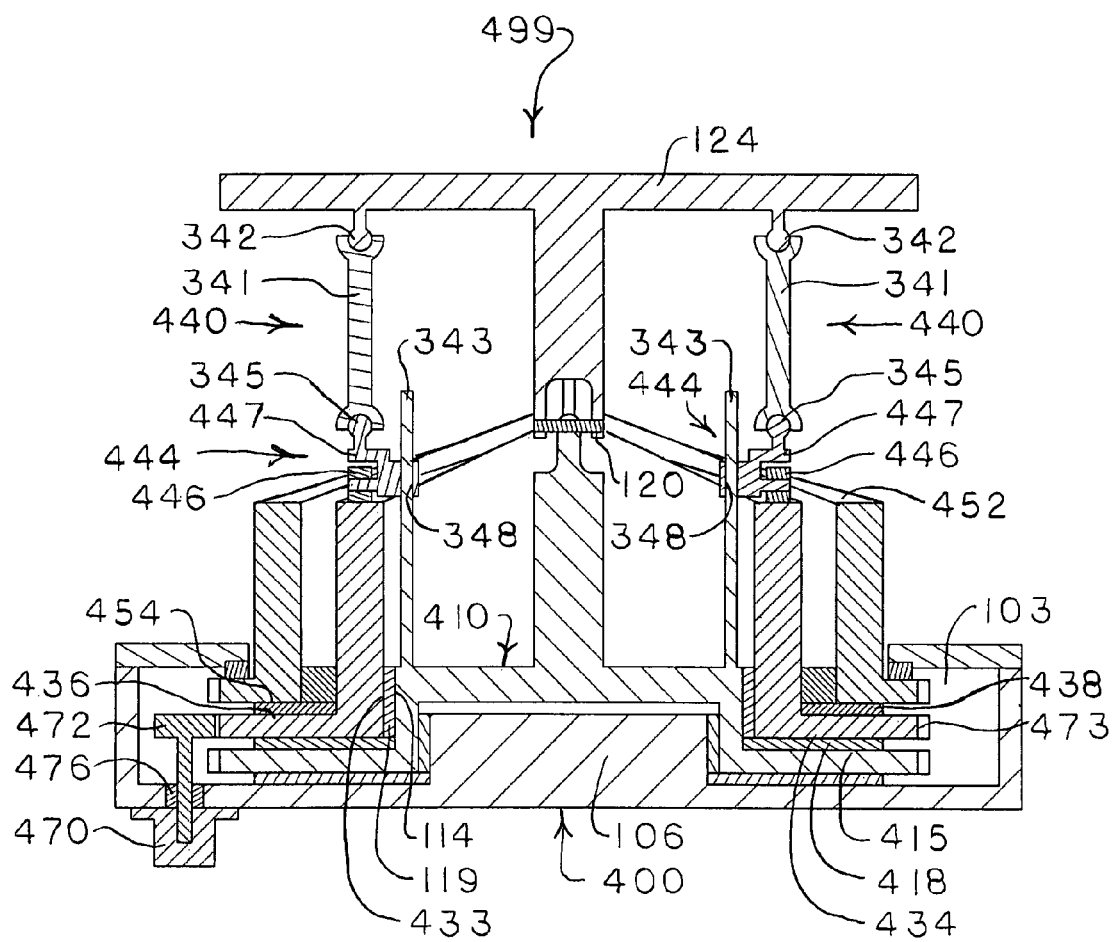

Detailed Description—Alternate Embodiment: FIG. 11-FIG. 13

FIG. 11-13 shows an alternate embodiment of a motion-positioning apparatus 499 from that shown in FIG. 1-4. In FIG. 11-13 the housing-rotational joint base load support surface 402 is the housing cavity 103 surface adjacent to the housing cylindrical contour 106 of the housing 400. The rotational joint base 410 has a flange extending radially from the end of the rotational joint base 410 opposite the rotational joint 120. The rotational joint base-housing load support surface 413 is the flange axial surface of the rotational joint base 410 opposite the rotational joint 120. The rotational joint base-first axial cam load support surface 415 is the flange axial surface adjacent to the rotational joint base-first axial cam centering surface 114. The rotational joint base 410 resides in the housing cavity 103 such that the rotational joint base-housing centering surface 112 is concentrically aligned with the housing-rotational joint base centering surface 101. The rotational joint base-housing load support surface 413 is aligned axially with the housing-rotational joint base load support surface 402 such the work load force is transferred from the rotational joint base 410 to the housing 400.

In FIG. 11-13 the first axial cam surface 432 is the axial end surface of the first axial cam 430. The first axial cam 430 has a flange extending radially from the axial end of the first axial cam 430 opposite the first axial cam surface 432. The first axial cam-rotational joint base centering surface 433 is the flange end bore surface of the first axial cam 430. The first axial cam-second axial cam centering surface 435 is the outer cylindrical surface of the first axial cam 430. The first axial cam-rotational joint base load support surface 434 is the axial end surface of the first axial cam 430 opposite the first axial cam surface 432. The first axial cam-second axial cam load support surface 436 is the flange axial surface adjacent to the first axial cam-second axial cam centering surface 435. The first axial cam-rotational joint base centering surface 433 is concentrically aligned with the rotational joint base-first axial cam centering surface 114. The first axial cam-rotational joint base load support surface 434 is axially aligned with the rotational joint base-first axial cam load support surface 415 such that the work load force is transferred from the first axial cam 430 to the rotational joint base-first axial cam load support surface 415 of the rotational joint base 410.

FIG. 11-13 depicts two first axial cam followers 440. Each first axial cam follower 440 comprises: the first axial cam follower connecting link 341, the first axial cam follower rotational joint 342, the first axial cam tracker 444, and the means for guiding along a path parallel to the axial axis of the first axial cam 430, the first axial cam tracker 444 through the range of the displacement of the first axial cam surface 432. Each first axial cam tracker 444 further comprises: the first axial cam tracker frame 447, the first axial cam tracker rolling element 446, and the first axial cam tracker rotational joint 345. Each of the first axial cam tracker rolling elements 446 contact the first axial cam surface 432 at coordinates 180 degrees apart and perpendicular to the first rotational axis of the rotational joint 120. The first axial cam tracker rolling elements 446 are supported by the first axial cam tracker frames 447 which resides adjacent to the first axial cam surface 432. For each first axial cam tracker 444, the means for guiding along a path parallel to the axial axis of the first axial cam 430, the first axial cam tracker 444 through the range of the displacement of the first axial cam surface 432 comprises: the first axial cam tracker guide 343, and the first axial cam tracker guided surface 348. Each of the first axial cam tracker guides 343 comprising at least one rod extending from the rotational joint base 410 axially along the hollow center surface of the first axial cam 430 and perpendicular to the first rotational axis of the rotational joint 120. Each of the first axial cam tracker guided surfaces 348 comprising at least one surface extending axially through the first axial cam tracker frame 447. Each of the first axial cam tracker guided surfaces 348 engage the first axial cam tracker guides 343 such that each first axial cam tracker 444 will transverse axially along the first axial cam tracker guide 343 through the range of the displacement of the first axial cam surface 432 when the first axial cam 430 is rotated. Each of the first axial cam tracker guides 343 and the first axial cam tracker guided surfaces 348 have zero or more axially planar surfaces to prevent the first axial cam trackers 444 from rotating about the first axial cam tracker guides 343. Each of the first axial cam tracker guided surfaces 348 are either sliding surfaces or rolling elements. Each of the first axial cam tracker rotational joints 345 are attached to the first axial cam frames 447 and extends axially from the first axial cam 430. Each of the first axial cam follower rotational joints 342 are attached to the work load support 124 with a spacing of 180 degrees apart and aligned perpendicular to the first rotational axis of the rotational joint 120. Each of the first axial cam follower connecting links 341 are connected between one of the first axial cam follower rotational joints 342 and the corresponding first axial cam tracker rotational joint 345. The magnitude of the rise displacement and the magnitude of the fall displacement are equal at coordinates 180 degrees apart on the first axial cam surface 432. The first axial cam surface 432 is perpendicular to the axial axis of the first axial cam 430 at all points around the circumference of the first axial cam surface 432. Both of the first axial cam tracker rolling elements 446 maintain contact with the first axial cam surface 432 for any first axial cam 430 rotational position, thus the first axial cam followers 440 form a form-closed axial cam-followers arrangement with the first axial cam surface 432.

In FIG. 11-13 the second axial cam surface 452 is the axial end surface of the second axial cam 450. The second axial cam-first axial cam centering surface 453 is the bore of the second axial cam 450 opposite the second axial cam surface 452. The second axial cam-first axial cam load support surface 454 is the axial end surface of the second axial cam 450 opposite the second axial cam surface 452. The second axial cam-first axial cam centering surface 453 is concentrically aligned with the first axial cam-second axial cam centering surface 435. The second axial cam-first axial cam load support surface 454 is axially aligned with the first axial cam-second axial cam load support surface 436 such that the work load force is transferred from the second axial cam 450 to the first axial cam-second axial cam load support surface 436 of the first axial cam 430.

FIG. 11-13 depicts two second axial cam followers 460. Each second axial cam follower 460 comprises: the second axial cam follower connecting link 361, the second axial cam follower rotational joint 362, the second axial cam tracker 464, and the means for guiding along a path parallel to the axial axis of the second axial cam 450, the second axial cam tracker 464 through the range of the displacement of the second axial cam surface 452. Each second axial cam tracker 464 further comprises: the second axial cam tracker frame 467, the second axial cam tracker rolling element 466, and the second axial cam tracker rotational joint 365. Each of the second axial cam tracker rolling elements 466 contact the second axial cam surface 452 at coordinates 180 degrees apart and perpendicular to the second rotational axis of the rotational joint 120. The second axial cam tracker rolling elements 466 are supported by the second axial cam tracker frames 467 which reside adjacent to the second axial cam surface 452. For each second axial cam tracker 464, the means for guiding along a path parallel to the axial axis of the second axial cam 450, the second axial cam tracker 464 through the range of the displacement of the second axial cam surface 452 comprises: the second axial cam tracker guide 363, and the second axial cam tracker guided surface 368. Each second axial cam tracker guide 363 comprising at least one rod extending from the rotational joint base 410 while clearing the peak of the first axial cam 430 to extend between the first axial cam 430 and the second axial cam 450. The second axial cam tracker guides 363 are spaced 180 degrees apart and aligned perpendicular to the second rotational axis of the rotational joint 120. Each of the second axial cam tracker guided surfaces 368 comprising at least one surface extending axially through the second axial cam tracker frame 467. Each of the second axial cam tracker guided surfaces 368 engage the second axial cam tracker guides 363 such that each of the second axial cam trackers 464 will transverse axially along the second axial cam tracker guides 363 through the range of the displacement of the second axial cam surface 452 when the second axial cam 450 is rotated. Each of the second axial cam tracker guides 363 and the second axial cam tracker guided surfaces 368 have zero or more axially planar surfaces to prevent the second axial cam trackers 464 from rotating about the second axial cam tracker guides 363. The second axial cam tracker guided surfaces 368 are either sliding surfaces or rolling elements. Each of the second axial cam tracker rotational joints 365 are attached to the second axial cam frames 467 and extends axially from the second axial cam 450. Each of the second axial cam follower rotational joints 362 are attached to the work load support 124 with a spacing of 180 degrees apart and aligned perpendicular to the second rotational axis of the rotational joint 120. Each of the second axial cam follower connecting links 361 are connected between one of the second axial cam follower rotational joints 362 and the corresponding second axial cam tracker rotational joint 365. The magnitude of the rise displacement and the magnitude of the fall displacement are equal at coordinates 180 degrees apart on the second axial cam surface 452. The second axial cam surface 452 is perpendicular to the axial axis of the second axial cam 450 at all points around the circumference of the second axial cam surface 452. Both of the second axial cam tracker rolling elements 466 maintain contact with the second axial cam surface 452 for any second axial cam 450 rotational position, thus the second axial cam followers 460 form a form-closed axial cam-followers arrangement with the second axial cam surface 452.

The means for coupling rotational energy from the first rotational axis drive unit 470 to the first axial cam 430 in FIG. 11-13 is similar to the first rotational axis drive set as shown in FIG. 1-4. In FIG. 11-13 the first rotational axis drive set is a parallel shaft drive set using an overhung mounting configuration. A first rotational axis overhung bearing 476 is supported by the housing 400, where the first rotational axis overhung bearing 476 is capable of supporting both axial forces and radial forces. The axial axis of the first rotational axis drive component 472 and the first rotational axis overhung bearing 476 are aligned parallel to the axial axis of the first axial cam 430. The output of the first rotational axis drive unit 470 is coupled to the shaft of the first rotational axis drive component 472 extending through the first rotational axis overhung bearing 476. The first axial cam driven component 473 is attached to the flange of the first axial cam 430. The first rotational axis drive component 472 meshes with the first axial cam driven component 473, whereby coupling rotational energy from the first rotational axis drive unit 470 to the first axial cam 430.

The means for coupling rotational energy from the second rotational axis drive unit 480 to the second axial cam 450 in FIG. 11-13 is similar to the second rotational axis drive set as shown in FIG. 1-4. In FIG. 11-13 the second rotational axis drive set is a parallel shaft drive set using an overhung mounting configuration. A second rotational axis overhung bearing 486 is supported by the housing 400, where the second rotational axis overhung bearing 486 is capable of supporting both axial forces and radial forces. The axial axis of the second rotational axis drive component 482 and the second rotational axis overhung bearing 486 are aligned parallel to the axial axis of the second axial cam 450. The output of the second rotational axis drive unit 480 is coupled to the shaft of the second rotational axis drive component 482 extending through the second rotational axis overhung bearing 486. The second axial cam driven component 483 is attached to the outer radial surface of the second axial cam 450. The second rotational axis drive component 482 meshes with the second axial cam driven component 483, whereby coupling rotational energy from the second rotational axis drive unit 480 to the second axial cam 450.

The means for coupling rotational energy from the third rotational axis drive unit 490 to the rotational joint base 410 in FIG. 11-13 is similar to the third rotational axis drive set as shown in FIG. 1-4. In FIG. 11-13 the third rotational axis drive set is a parallel shaft drive set using an overhung mounting configuration. A third rotational axis overhung bearing 496 is supported by the housing 400, where the third rotational axis overhung bearing 496 is capable of supporting both axial forces and radial forces. The axial axis of the third rotational axis drive component 492 and the third rotational axis overhung bearing 496 are aligned parallel to the axial axis of the rotational joint base 410. The output of the third rotational axis drive unit 490 is coupled to the shaft of the third rotational axis drive component 492 extending through the third rotational axis overhung bearing 496. The rotational joint base driven component 493 is attached to the flange of the rotational joint base 410. The third rotational axis drive component 492 meshes with the rotational joint base driven component 493, whereby coupling rotational energy from the third rotational axis drive unit 490 to the rotational joint base 410.

FIG. 11-13 further depicts the optional thrust bearings. The first rotational axis thrust bearing 418 resides between the rotational joint base-first axial cam load support surface 415 and the first axial cam-rotational joint base load support surface 434. The second rotational axis thrust bearing 438 resides between the first axial cam-second axial cam load support surface 436 and the second axial cam-first axial cam load support surface 454. The third rotational axis thrust bearing 404 resides between the housing-rotational joint base load support surface 402 and the rotational joint base-housing load support surface 413. The first rotational axis thrust bearing 418, second rotational axis thrust bearing 438, and/or third rotational axis thrust bearing 404 are either a rolling element bearing and/or a sliding bearing.

FIG. 11-13 further depicts the optional radial bearings. The first rotational axis radial bearing 119 resides between the rotational joint base-first axial cam centering surface 114 and the first axial cam-rotational joint base centering surface 433. The second rotational axis radial bearing 439 resides between the first axial cam-second axial cam centering surface 435 and the second axial cam-first axial cam centering surface 453. The first rotational axis radial bearing 119 and/or second rotational axis radial bearing 439 are either a rolling element bearing and/or a sliding bearing.

Figure 14:
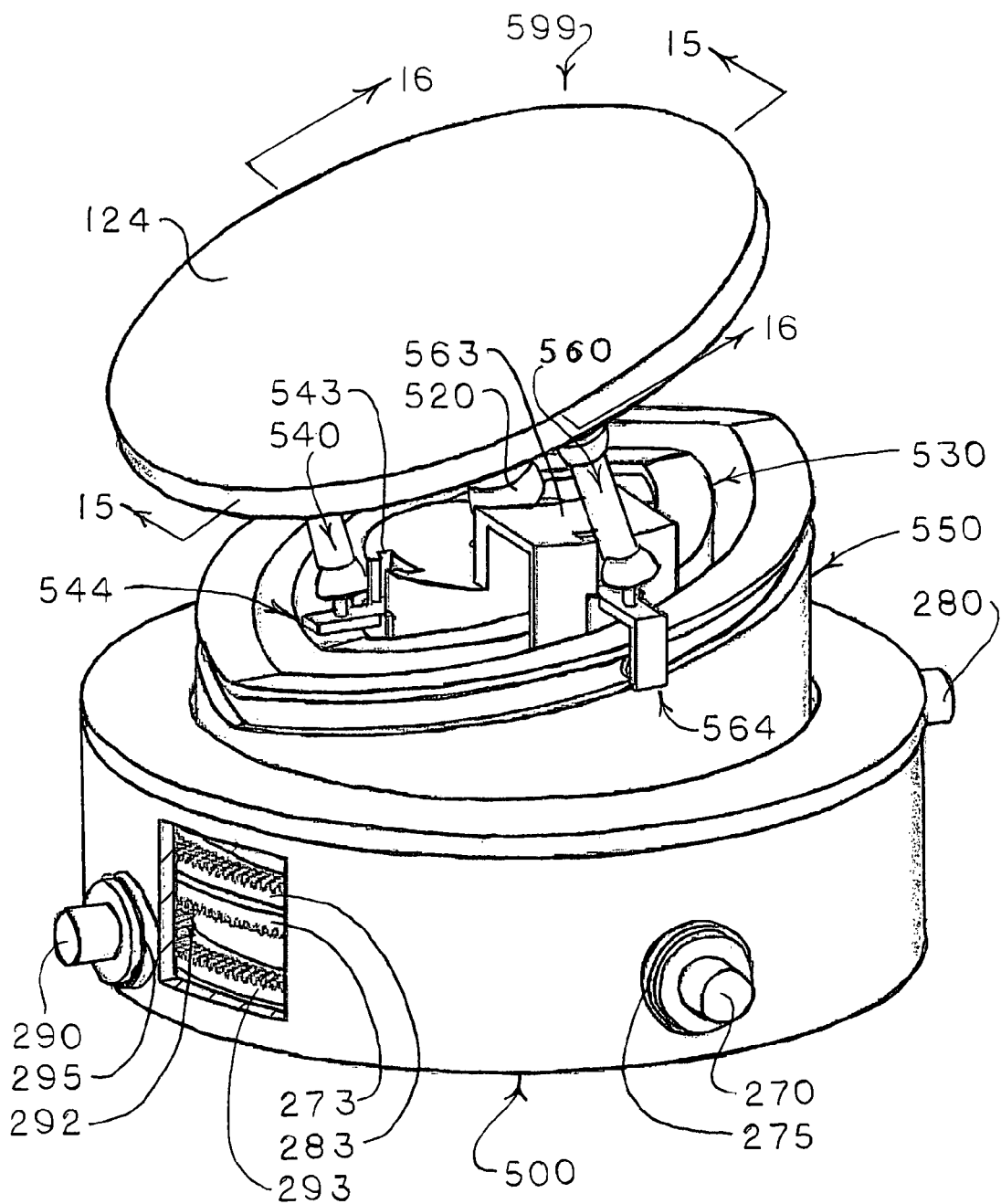
FIG. 14 is a perspective view of an alternate embodiment of the motion-positioning apparatus of FIG. 5-7 showing alternate load support surfaces and alternate axial cam-follower configuration.
Figure 15:
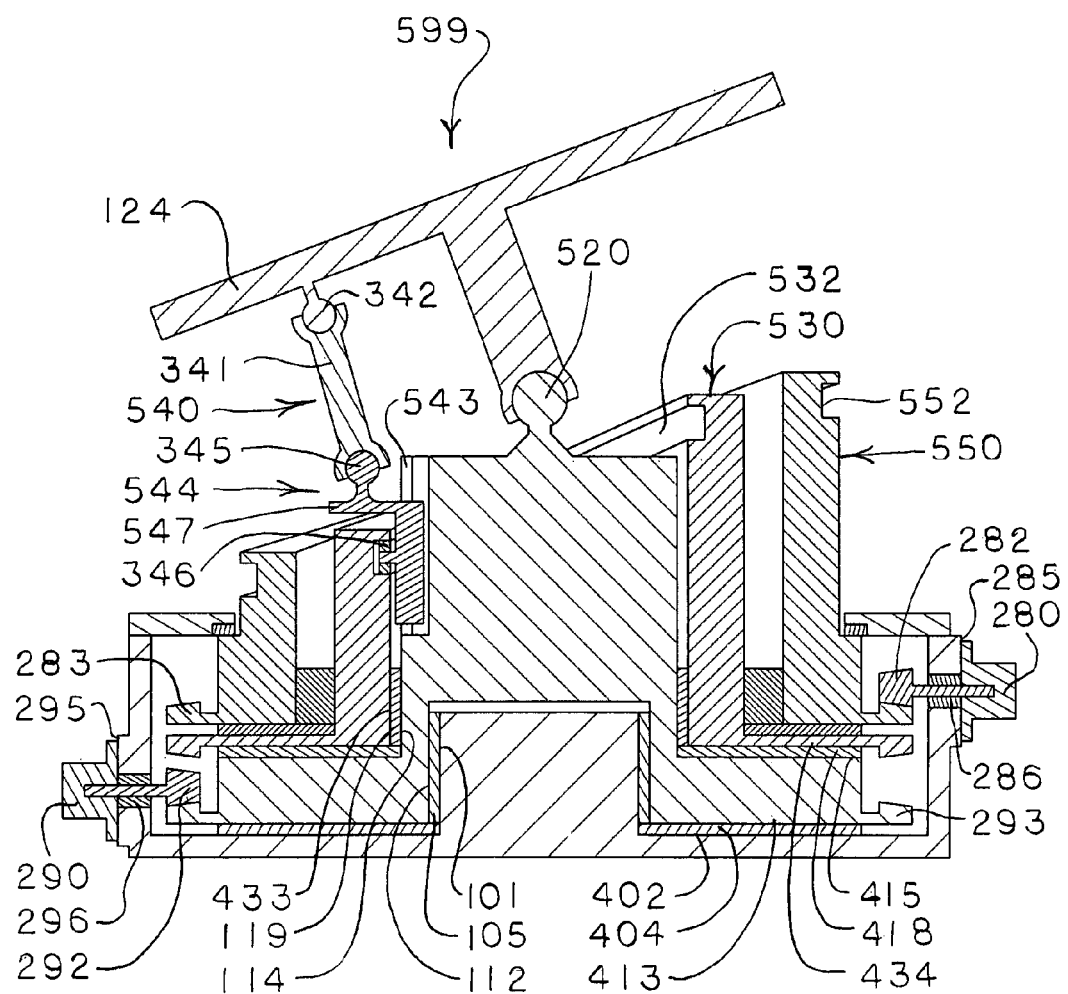
FIG. 15-16 are cross-sectional views of the motion-positioning apparatus at line 15-15 and line 16-16 of FIG. 14.
Figure 16:
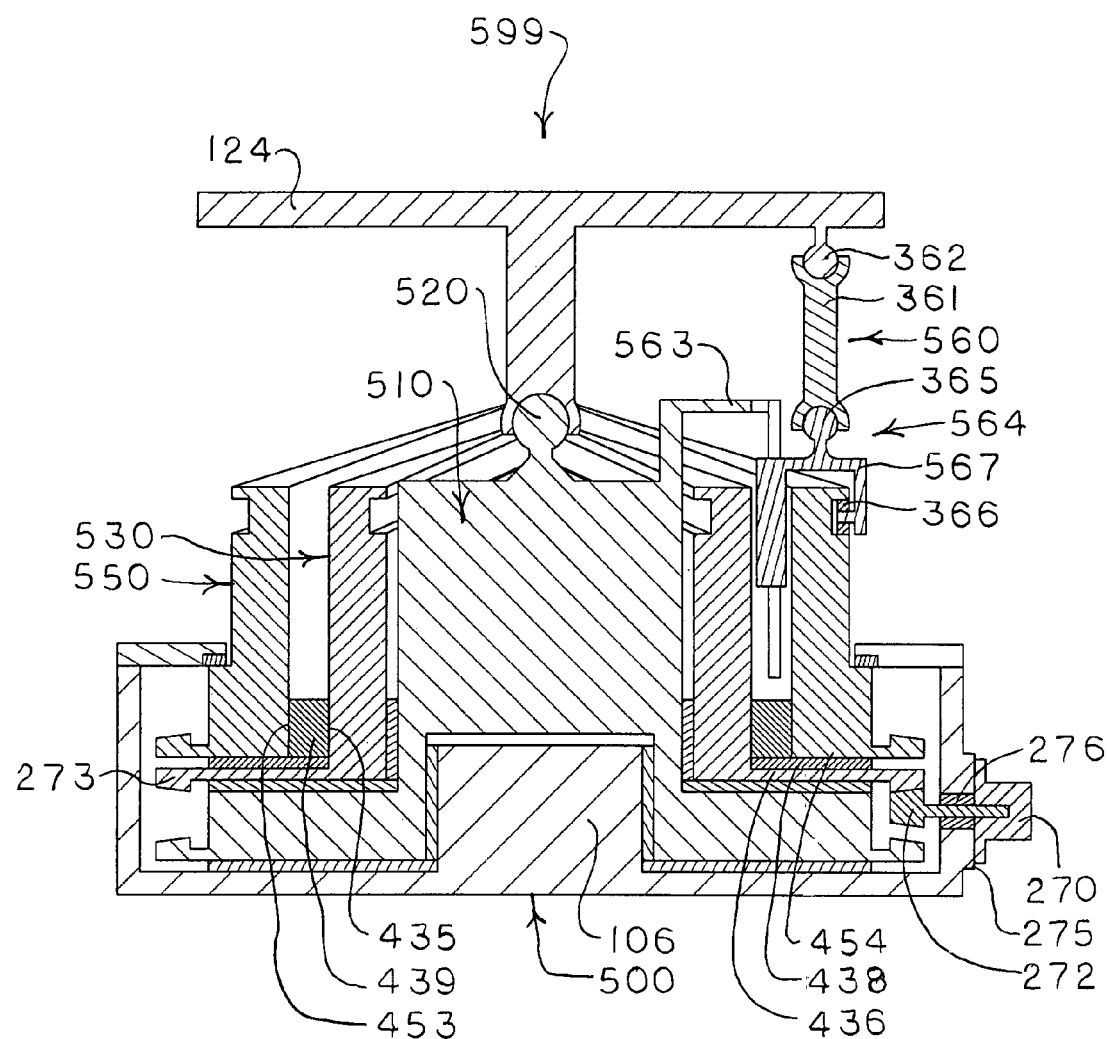
Figure 17:
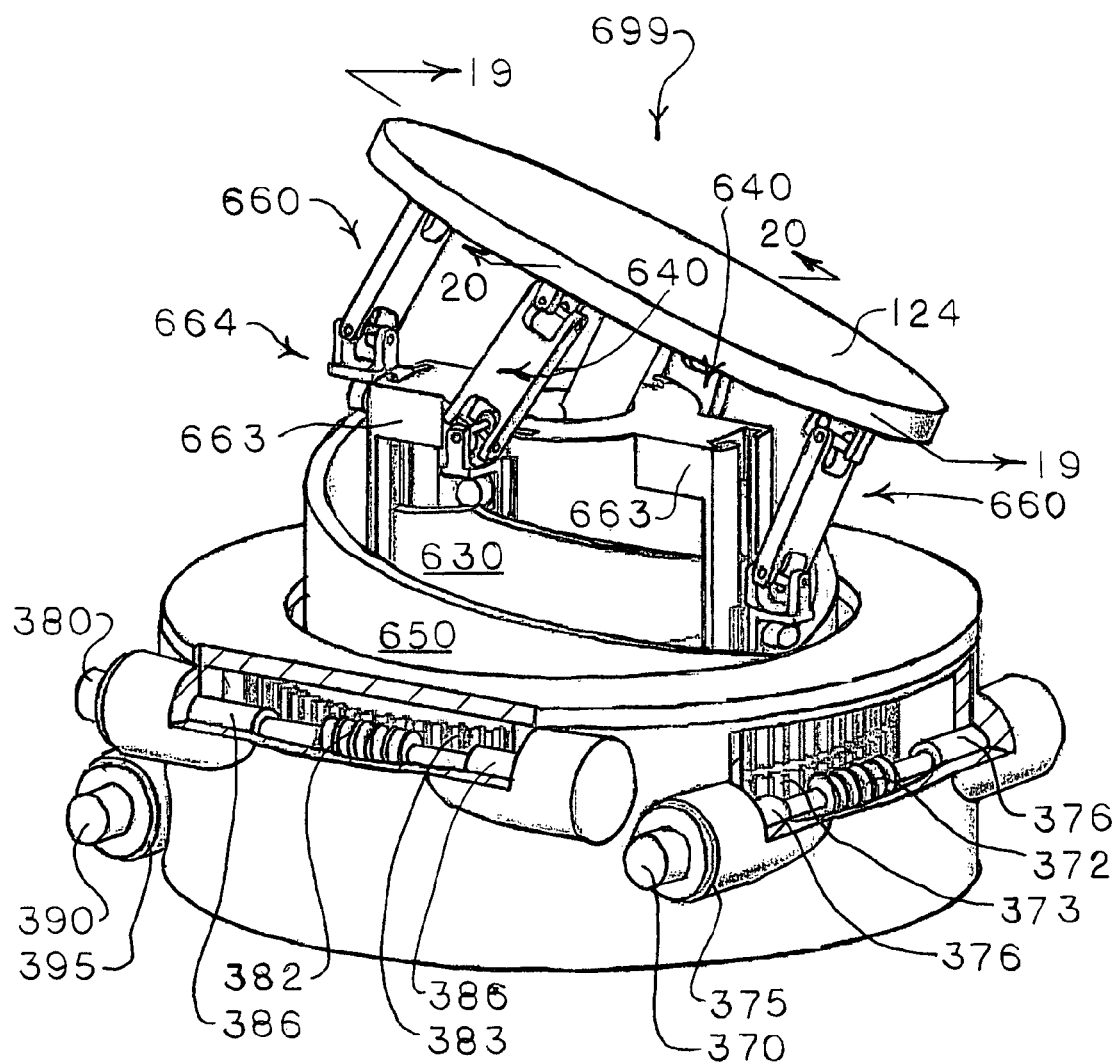
FIG. 17-18 are perspective views of an alternate embodiment of the motion-positioning apparatus of FIG. 8-10 showing alternate load support surfaces and alternate axial cam-follower configuration.
Figure 18:
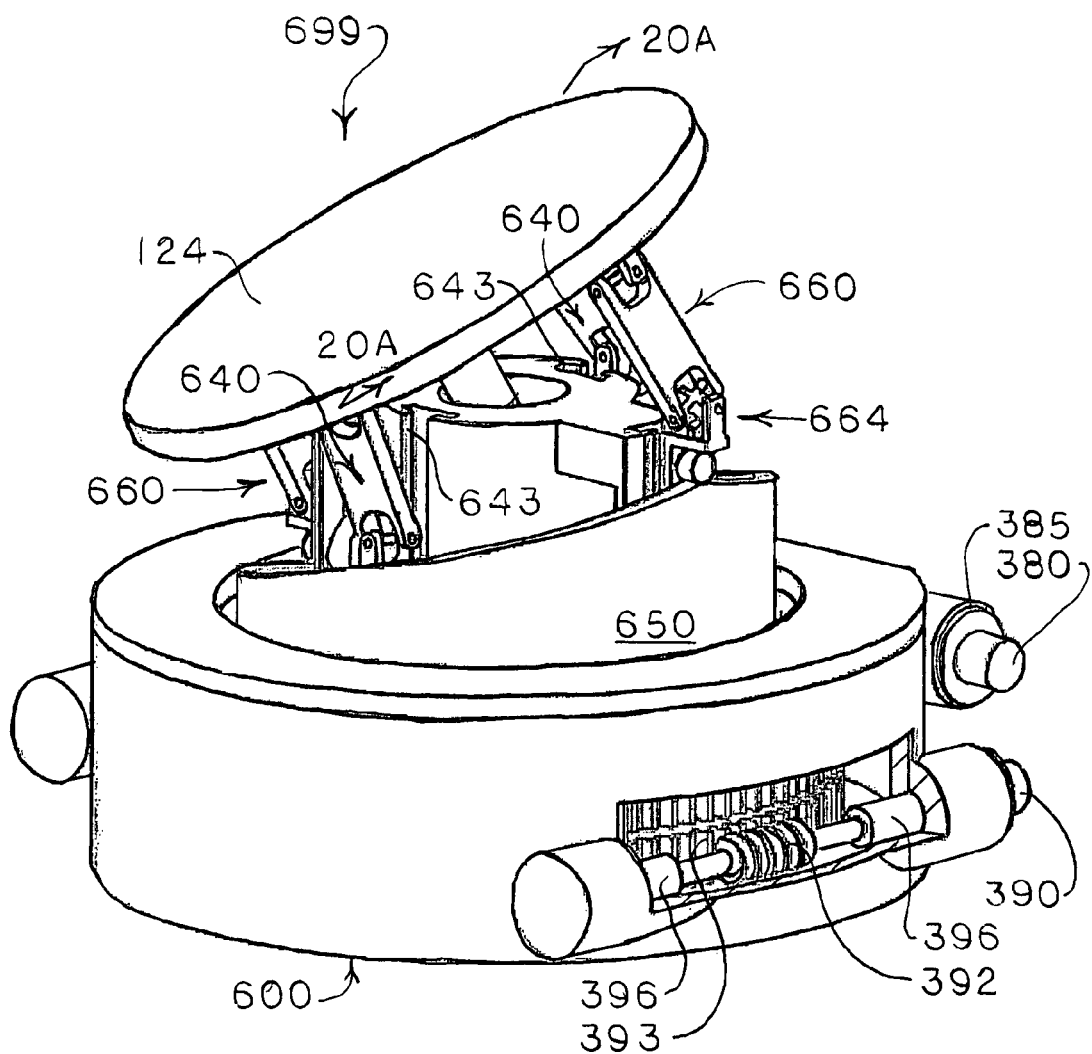
Figure 19:
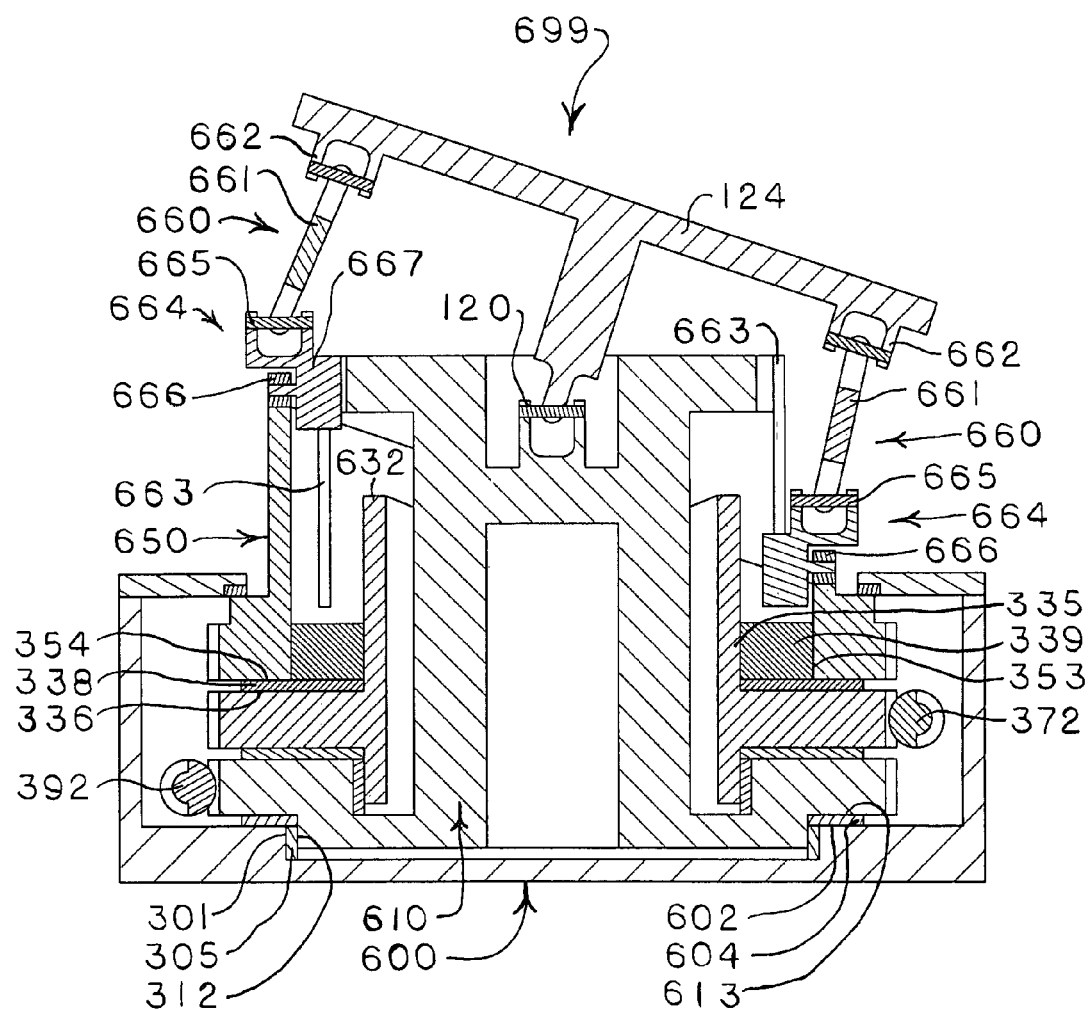
FIG. 19-20 are cross-sectional views of the motion-positioning apparatus at line 19-19 and line 20-20 of FIG. 17.

Detailed Description—Alternate Embodiment: FIG. 14-FIG. 16

FIG. 14-16 shows an alternate embodiment of a motion-positioning apparatus 599 from that shown in FIG. 5-7 and FIG. 11-13. The housing 500 of the motion-positioning apparatus 599 shown in FIG. 14-16 uses the same housing cylindrical centering surface and housing load support surface configuration as described in FIG. 11-13.

The rotational joint base 510 of the motion-positioning apparatus 599 shown in FIG. 14-16 uses the same rotational joint base cylindrical centering surfaces and rotational joint base load support surfaces configuration as described in FIG. 11-13. The cylindrical shaped member of the rotational joint base 510 is extended. The rotational joint 520 is shown in FIG. 14-16 as a ball and socket joint. The work load support 124 is attached to the rotational joint base 510 by the rotational joint 520.

The first axial cam 530 of the motion-positioning apparatus 599 shown in FIG. 14-16 uses the same first axial cam cylindrical centering surfaces and first axial cam load support surfaces as described in FIG. 11-13. The first axial cam surface 532 is shown in FIG. 14-16 as a groove of varying axial displacement about the bore surface of the first axial cam 530.

The second axial cam 550 of the motion-positioning apparatus 599 shown in FIG. 14-16 uses the same second axial cam cylindrical centering surfaces and second axial cam load support surfaces as described in FIG. 11-13. The second axial cam surface 552 is shown in FIG. 14-16 as a groove of varying axial displacement about the outer cylindrical surface of the second axial cam 550.

The single first axial cam follower 540 shown in FIG. 14-16 is similar to the first axial cam follower 340 shown in FIG. 8-10 except for the means for guiding along a path parallel to the axial axis of the first axial cam 530, the first axial cam tracker 544 through the range of the displacement of the first axial cam surface 532. In FIG. 14-16 the first axial cam tracker guide 543 comprises a slot in the outer cylindrical surface of the rotational joint base 510. The slot of the first axial cam tracker guide 543 is aligned along the axial axis of the rotational joint base 510 and perpendicular to the first rotational axis of the rotational joint 520. The slot of the first axial cam tracker guide 543 is of length which allows the first axial cam tracker 544 to transverse through the displacement magnitude of the first axial cam 530. The slot of the first axial cam tracker guide 543 provides at least three surfaces to guide the first axial cam tracker 544. The first axial cam tracker frame 547 has at least three surfaces which align with the slot of the first axial cam tracker guide 543 to allow the first axial cam tracker 544 to transverse along the slot of the first axial cam tracker guide 543. The surfaces of the first axial cam tracker frame 547 aligned with the slot of the first axial cam tracker guide 543 are either sliding surfaces and/or rolling elements.

The single second axial cam follower 560 shown in FIG. 14-16 is similar to the second axial cam follower 360 shown in FIG. 8-10 except for the means for guiding along a path parallel to the axial axis of the second axial cam 550, the second axial cam tracker 564 through the range of the displacement of the second axial cam surface 552. In FIG. 14-16 the second axial cam tracker guide 563 comprises a L-shaped structure extending from the rotational joint base 510 over the axial end of the first axial cam 530 and extending between the first axial cam 530 and the second axial cam 550. The L-shaped structure of the second axial cam tracker guide 563 has a slot in the portion of the L-shaped structure extending between the first axial cam 530 and the second axial cam 550. The slot of the second axial cam tracker guide 563 is aligned along the axial axis of the second axis cam 550 and perpendicular to the second rotational axis of the rotational joint 520. The slot of the second axial cam tracker guide 563 is of length which allows the second axial cam tracker 564 to transverse through the displacement magnitude of the second axial cam

550. The slot of the second axial cam tracker guide 563 provides at least three surfaces to guide the second axial cam tracker 564. The second axial cam tracker frame 567 has at least three surfaces which align with the slot of the second axial cam tracker guide 563 to allow the second axial cam tracker 564 to transverse along the slot of the second axial cam tracker guide 563. The surfaces of the second axial cam tracker frame 567 aligned with the slot of the second axial cam tracker guide 563 are either sliding surfaces and/or rolling elements.

The means for coupling rotational energy from the first rotational axis drive unit 270 to the first axial cam 530 of the motion-positioning apparatus 599 shown in FIG. 14-16 is the same as the 90 degree intersecting drive set described in FIG. 5-7. The means for coupling rotational energy from the second rotational axis drive unit 280 to the second axial cam 550 of the motion-positioning apparatus 599 shown in FIG. 14-16 is the same as the 90 degree intersecting drive set described in FIG. 5-7. The means for coupling rotational energy from the third rotational axis drive unit 290 to the rotational joint base 510 of the motion-positioning apparatus 599 shown in FIG. 14-16 is the same as the 90 degree intersecting drive set described in FIG. 5-7.

Detailed Description—Alternate Embodiment: FIG. 17-FIG. 20

FIG. 17-20 shows an alternate embodiment of a motion-positioning apparatus 699 from that shown in FIG. 8-10. The housing 600 of the motion-positioning apparatus 699 shown in FIG. 17-20 uses the same housing cylindrical centering surface configuration as described in FIG. 8-10. The housing-rotational joint base load support surface 602 is the axial surface of the housing 600 adjacent to the closed end bore of the housing 600.

The rotational joint base 610 of the motion-positioning apparatus 699 shown in FIG. 17-20 uses the same rotational joint base cylindrical centering surfaces configuration as described in FIG. 8-10. The rotational joint base-first axial cam load support surface 615 is the axial surface adjacent the closed end bore of the rotational joint base 610. The rotational joint base-housing load support surface 613 is the axial end surface of the rotational joint base 610 adjacent to the rotational joint base-housing centering surface 312. The rotational joint base 610 resides within the housing 600 where the rotational joint base-housing centering surface 312 is concentrically aligned with the housing-rotational joint base centering surface 301. The rotational joint base-housing load support surface 613 is axially aligned with the housing-rotational joint base load support surface 602 such that the work load force is transferred from the rotational joint base 610 to the housing 600. A cylindrical shaped surface extending from the center of the closed end bore of the rotational joint base 610. The stationary side to the rotational joint 120 is mounted center of the rotational joint base 610 and the rotatable side of the rotational joint 120 is attached to the work load support 124 such that the work load support is rotatable about the first rotational axis and second rotational axis of the rotational joint 120.

The first axial cam 630 of the motion-positioning apparatus 699 shown in FIG. 17-20 uses the same first axial cam cylindrical centering surfaces and first axial cam-second axial cam load support surface 336 as described in FIG. 8-10. The first axial cam-rotational joint base load support surface 634 is the flange axial surface of the first axial cam 630 adjacent to the first axial cam-rotational joint base centering surface 333. The first axial cam-rotational joint base centering surface 333 aligned concentrically with the rotational joint base-first axial cam centering surface 314. The first axial cam-rotational joint base load support surface 634 is axially aligned with the rotational joint base-first axial cam load support surface 615 such that the work load force from the first axial cam 630 is transferred to the rotational joint base 610. The first axial cam surface 632 is the axial end surface of the first axial cam 630 opposite the rotational joint base 610.

The second axial cam 650 of the motion-positioning apparatus 699 shown in FIG. 17-20 uses the same second axial cam cylindrical centering surface and second axial cam load support surface as described in FIG. 8-10. The second axial cam-first axial cam centering surface 353 aligned concentrically with the first axial cam-second axial cam centering surface 335. The second axial cam-first axial cam load support surface 354 is axially aligned with first axial cam-second axial cam load support surface 336 such that the work load force from the second axial cam 650 is transferred to the first axial cam 630.

FIG. 17-20 depicts two first axial cam followers 640. Each first axial cam follower 640 comprises: the first axial cam follower connecting link 641, the first axial cam follower rotational joint 642, the first axial cam tracker 644, and the means for guiding along a path parallel to the axial axis of the first axial cam 630, the first axial cam tracker 644 through the range of the displacement of the first axial cam surface 632. Each first axial cam tracker 644 further comprises: the first axial cam tracker frame 647, the first axial cam tracker rolling element 646, and the first axial cam tracker rotational joint 645. Each of the first axial cam tracker rolling elements 646 contact the first axial cam surface 632 at coordinates 180 degrees apart and perpendicular to the first rotational axis of the rotational joint 120. The first axial cam tracker rolling elements 646 are supported by the first axial cam tracker frames 647 which resides adjacent to the first axial cam surface 632. Each of the first axial cam tracker rotational joints 645 are attached to the first axial cam frames 647 and extends axially from the first axial cam 630. Each of the first axial cam follower rotational joints 642 are attached to the work load support 124 with a spacing of 180 degrees apart and aligned perpendicular to the first rotational axis of the rotational joint 120. Each of the first axial cam follower connecting links 641 are connected between one the first axial cam follower rotational joints 642 and the corresponding first axial cam tracker rotational joint 645. The first axial cam follower rotational joints 642 and the first axial cam tracker rotational joints 645 are shown in FIG. 17-20 as two degree of rotational freedom joints. For each first axial cam tracker 644, the means for guiding along a path parallel to the axial axis of the first axial cam 630, the first axial cam tracker 644 through the range of the displacement of the first axial cam surface 632 comprises a slot in the outer cylindrical surface of the rotational joint base 610. The slot of each first axial cam tracker guide 643 is aligned along the axial axis of the rotational joint base 610 and perpendicular to the first rotational axis of the rotational joint 120. Each slot of the first axial cam tracker guide 643 is of length which allows each first axial cam tracker 644 to transverse through the displacement magnitude of the first axial cam 630. The slot of each first axial cam tracker guide 643 provides at least three surfaces to guide each first axial cam tracker 644. Each first axial cam tracker frame 647 has at least three surfaces which align with the slot of the first axial cam tracker guides 643 to allow each first axial cam tracker 644 to transverse along the slot of the first axial cam tracker guides 643. The surfaces of each first axial cam tracker frame 647 aligned with the slot of the first axial cam tracker guides 643 are either sliding surfaces and/or rolling elements. The magnitude of the rise displacement and the magnitude of the fall displacement are equal at coordinates 180 degrees apart on the first axial cam surface 632. The first axial cam surface 632 is perpendicular to the axial axis of the first axial cam 630 at all points around the circumference of the first axial cam surface 632. Both of the first axial cam tracker rolling elements 646 maintain contact with the first axial cam surface 632 for any first axial cam 630 angular position, thus the first axial cam followers 640 form a form-closed axial cam-followers arrangement with the first axial cam surface 632.

FIG. 17-20 depicts two second axial cam followers 660. Each second axial cam follower 660 comprises: the second axial cam follower connecting link 661, the second axial cam follower rotational joint 662, the second axial cam tracker 664, and the means for guiding along a path parallel to the axial axis of the second axial cam 650, the second axial cam tracker 664 through the range of the displacement of the second axial cam surface 652. Each second axial cam tracker 664 further comprises: the second axial cam tracker frame 667, the second axial cam tracker rolling element 666, and the second axial cam tracker rotational joint 665. Each of the second axial cam tracker rolling elements 666 contact the second axial cam surface 652 at coordinates 180 degrees apart and perpendicular to the second rotational axis of the rotational joint 120. The second axial cam tracker rolling elements 666 are supported by the second axial cam tracker frames 667 which resides adjacent to the second axial cam surface 652. Each of the second axial cam tracker rotational joints 665 are attached to the second axial cam frames 667 and extends axially from the second axial cam 650. Each of the second axial cam follower rotational joints 662 are attached to the work load support 124 with a spacing of 180 degrees apart and aligned perpendicular to the second rotational axis of the rotational joint 120. Each of the second axial cam follower connecting links 661 are connected between one the second axial cam follower rotational joints 662 and the corresponding second axial cam tracker rotational joint 665. The second axial cam follower rotational joints 662 and the second axial cam tracker rotational joints 665 are shown as two degree of rotational freedom joints. For each second axial cam tracker 664, the means for guiding along a path parallel to the axial axis of the second axial cam 650, the second axial cam tracker 664 through the range of the displacement of the second axial cam surface 652 comprises the second axial cam tracker guide 663 having a L-shaped structure extending from the rotational joint base 610 over the axial end of the first axial cam 630 and extending between the first axial cam 630 and the second axial cam 650. The L-shaped structure of each second axial cam tracker guide 663 has a slot in the portion of the L-shaped structure extending between the first axial cam 630 and the second axial cam 650. The slot of each second axial cam tracker guide 663 is aligned along the axial axis of the second axis cam 650 and perpendicular to the second rotational axis of the rotational joint 120. The slot of each second axial cam tracker guide 663 is of length which allows the second axial cam trackers 664 to transverse through the displacement magnitude of the second axial cam 650. The slot of each second axial cam tracker guide 663 provides at least three surfaces to guide the second axial cam trackers 664. Each second axial cam tracker frame 667 has at least three surfaces which align with the slot of the second axial cam tracker guides 663 to allow each second axial cam tracker 664 to transverse along the slot of the second axial cam tracker guides 663. The surfaces of each second axial cam tracker frame 667 aligned with the slot of the second axial cam tracker guides 663 are either sliding surfaces and/or rolling elements. The magnitude of the rise displacement and the magnitude of the fall displacement are equal at coordinates 180 degrees apart on the second axial cam surface 652.

The second axial cam surface 652 is perpendicular to the axial axis of the second axial cam 650 at all points around the circumference of the second axial cam surface 652. Both of the first axial cam tracker rolling elements 666 maintain contact with the second axial cam surface 652 for any second axial cam 650 angular position, thus the second axial cam followers 660 form a form-closed axial cam-followers arrangement with the second axial cam surface 652.

The means for coupling rotational energy from the first rotational axis drive unit 370 to the first axial cam 630 of the motion-positioning apparatus 699 shown in FIG. 17-20 is the same as the 90 degree non-intersecting drive set described in FIG. 8-10. The means for coupling rotational energy from the second rotational axis drive unit 380 to the second axial cam 650 of the motion-positioning apparatus 699 shown in FIG. 17-20 is the same as the 90 degree non-intersecting drive set described in FIG. 8-10. The means for coupling rotational energy from the third rotational axis drive unit 390 to the rotational joint base 610 of the motion-positioning apparatus 699 shown in FIG. 17-20 is the same as the 90 degree non-intersecting drive set described in FIG. 8-10.

FIG. 17-20 further depicts optional thrust bearings. The first rotational axis thrust bearing 618 resides between the rotational joint base-first axial cam load support surface 615 and the first axial cam-rotational joint base load support surface 634. The third rotational axis thrust bearing 604 resides between the housing-rotational joint base load support surface 602 and the rotational joint base-housing load support surface 613. The first rotational axis thrust bearing 618 and/or the third rotational axis thrust bearing 604 are either a rolling element bearings and/or a sliding bearings.

Figure 20:
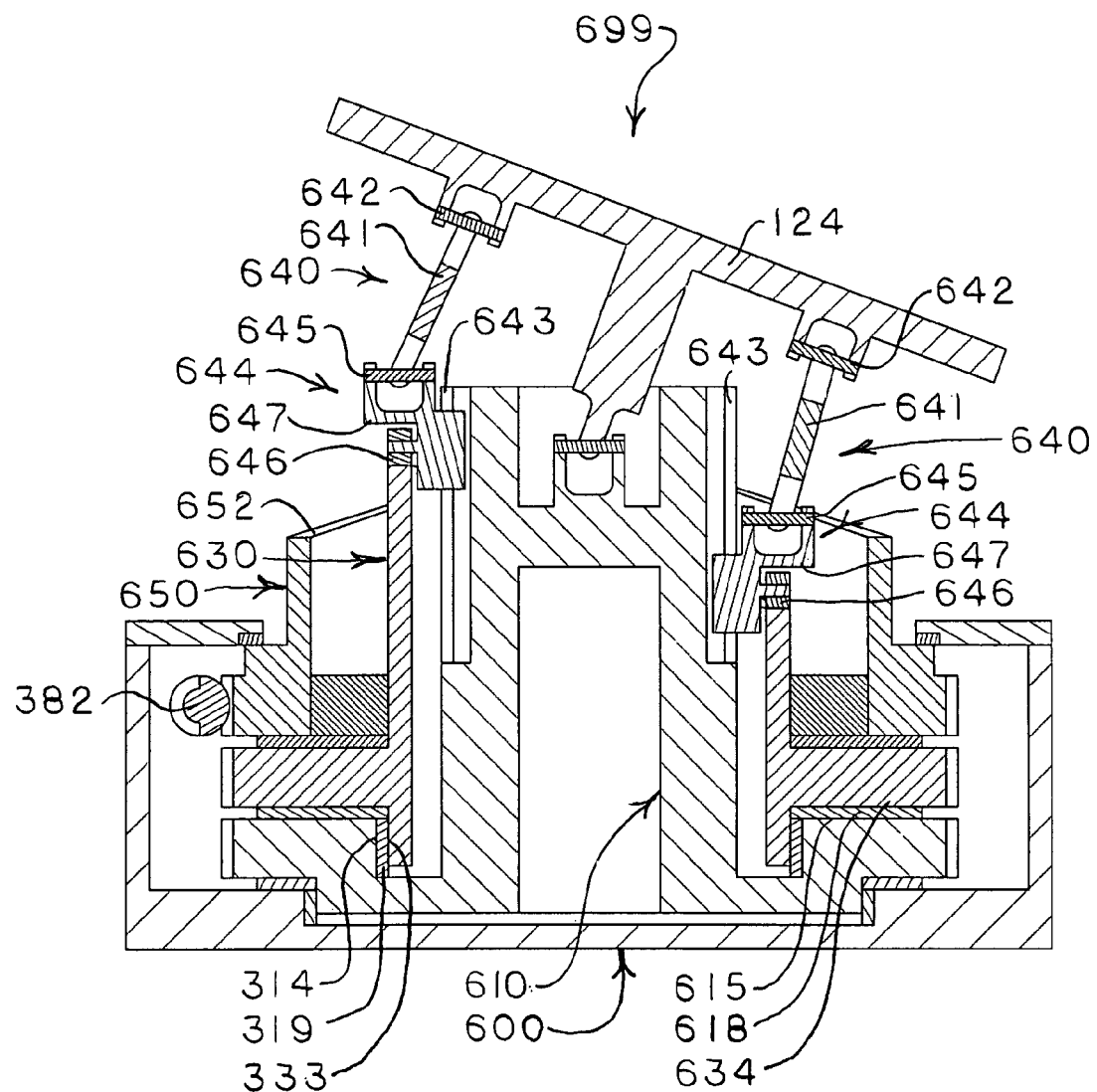
Figure 20A:
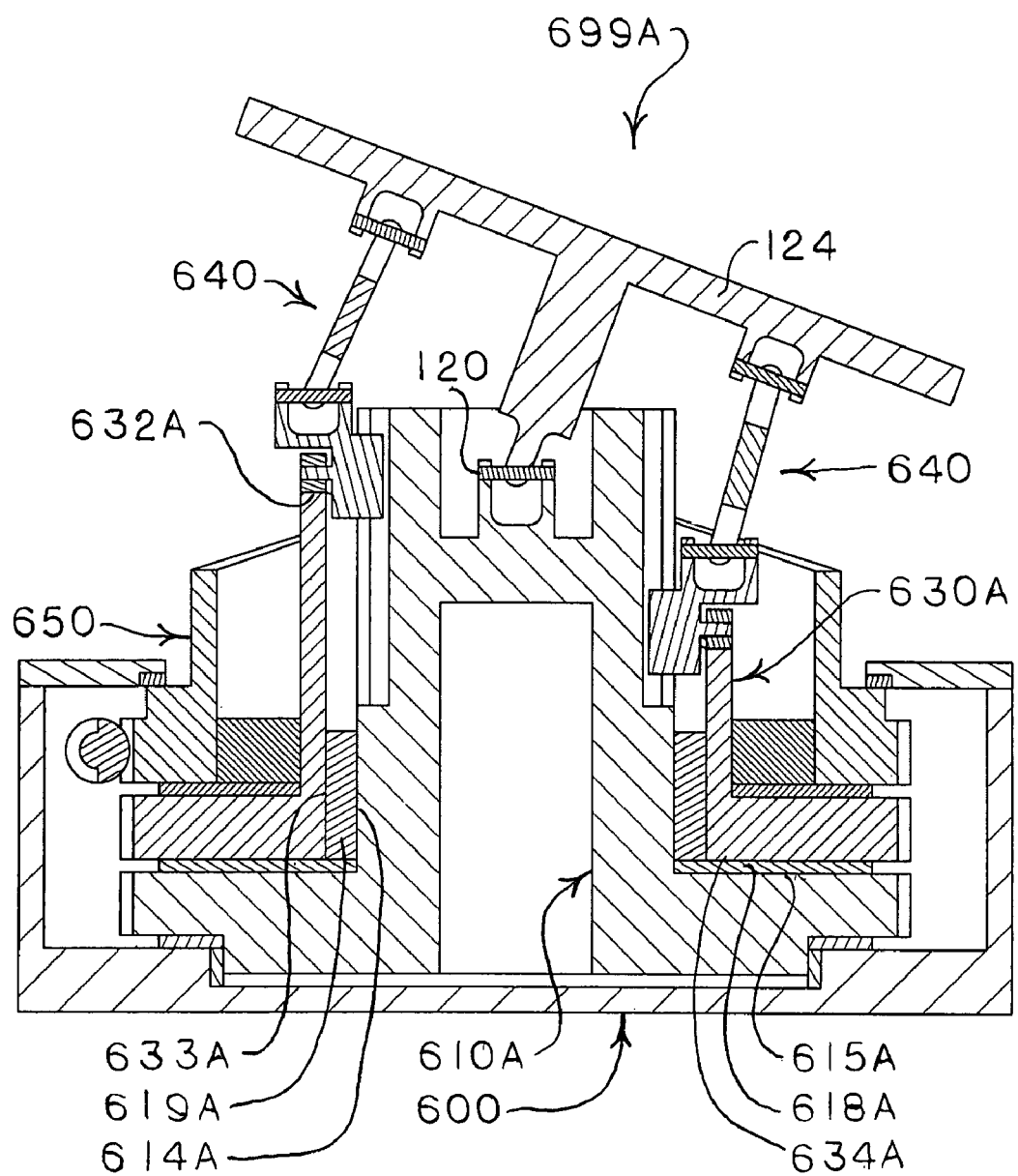
FIG. 20A is a cross-sectional of the motion-positioning apparatus at line 20A-20A of FIG. 18 showing an alternate cylindrical centering surface and load support surface configuration of that shown in FIG. 20.

Detailed Description—Alternate Embodiment: FIG. 20A

FIG. 20A shows an alternate embodiment of a motion-positioning apparatus 699A from that shown in FIG. 17-20 for the motion-positioning apparatus 699. In FIG. 20A the rotational joint base 610A does not have a closed end bore like that shown in FIG. 17-20 for the rotational joint base 610. In FIG. 20A the rotational joint base-first axial cam centering surface 614A is the outer cylindrical surface of the cylinder, shaped surface extending from the center of the rotational joint base 610A, on which the rotational joint 120 is attached. The rotational base joint-first axial cam load support surface 615A is the axial surface of the rotational joint base 610A adjacent to the rotational joint base-first axial cam centering surface 614A. The first axial cam-rotational joint base centering surface 633A is the bore surface of the first axial cam 630A. The first axial cam-rotational joint base load support surface 634A is the axial end surface of the first axial cam 630A opposite the first axial cam surface 632. The first axial cam-rotational joint base centering surface 633A is aligned concentrically with the rotational joint base-first axial cam centering surface 614A. The first axial cam-rotational joint base load support surface 634A is axially aligned with the rotational joint base-first axial cam load support surface 615A such that the work load force is transferred from the first axial cam 630A to the rotational joint base-first axial cam load support surface 615A of the rotational joint base 610A. The optional first rotational axis thrust bearing 618A resides between the rotational joint base-first axial cam load support surface 615A and the first axial cam-rotational joint base load support surface 634A. The optional first rotational axis radial bearing 619A resides between the rotational joint base-first axial cam load centering surface 614A and the first axial cam-rotational joint base centering surface 633A. The first rotational axis thrust bearing 618A and the first rotational axis radial bearing 619A are rolling element bearings and/or sliding bearings.

Detailed Description—Alternate Cam Surfaces: FIG. 21-FIG. 24

FIG. 21-24 show alternate axial cam surface configurations applicable to the first axial cam surfaces and second axial cam surfaces described in FIG. 8-20, FIG. 10A and FIG. 20A. FIG. 21-24 show the contour of the axial cam surface about the axial cam selected from group consisting of at least one groove, at least one rib, or combination of at least one groove and at least one rib.

Figure 21:
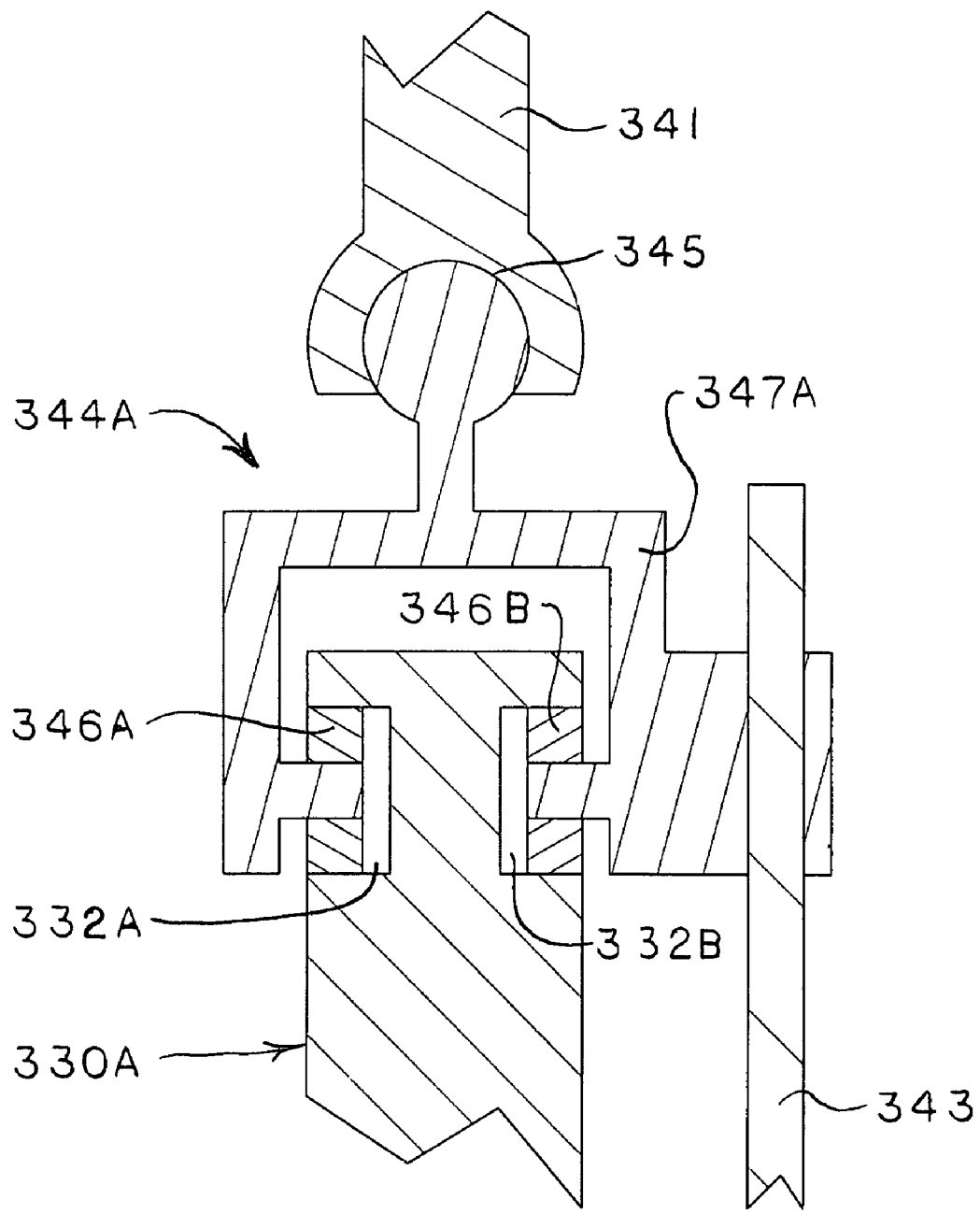
FIG. 21-24 are cross-sectional views of alternate axial cam surface configurations of that shown in FIG. 8-10.

FIG. 21 shows the first axial cam 330A further comprising a first axial cam surface 332A and a first axial cam surface 332B resulting from groove contours on opposite cylindrical surfaces of the first axial cam 330A. FIG. 21 shows the first axial cam tracker 344A further comprising a first axial cam tracker frame 347A, a first axial cam tracker rolling element 346A, and a first axial cam tracker rolling element 346B. The first axial cam tracker frame 347A is an U-shaped member which extends adjacent to the groove contours of the first axial cam surface 332A and the first axial cam surface 332B. The first axial cam tracker rolling element 346A resides in the groove of the first axial cam surface 332A and is supported by the first axial cam tracker frame 347A, thus the first axial cam rolling element 346A tracks the first axial cam surface 332A. The first axial cam tracker rolling element 346B resides in the groove of the first axial cam surface 332B and is supported by the first axial cam tracker frame 347A, thus the first axial cam rolling element 346B tracks the first axial cam surface 332B.

Figure 22:
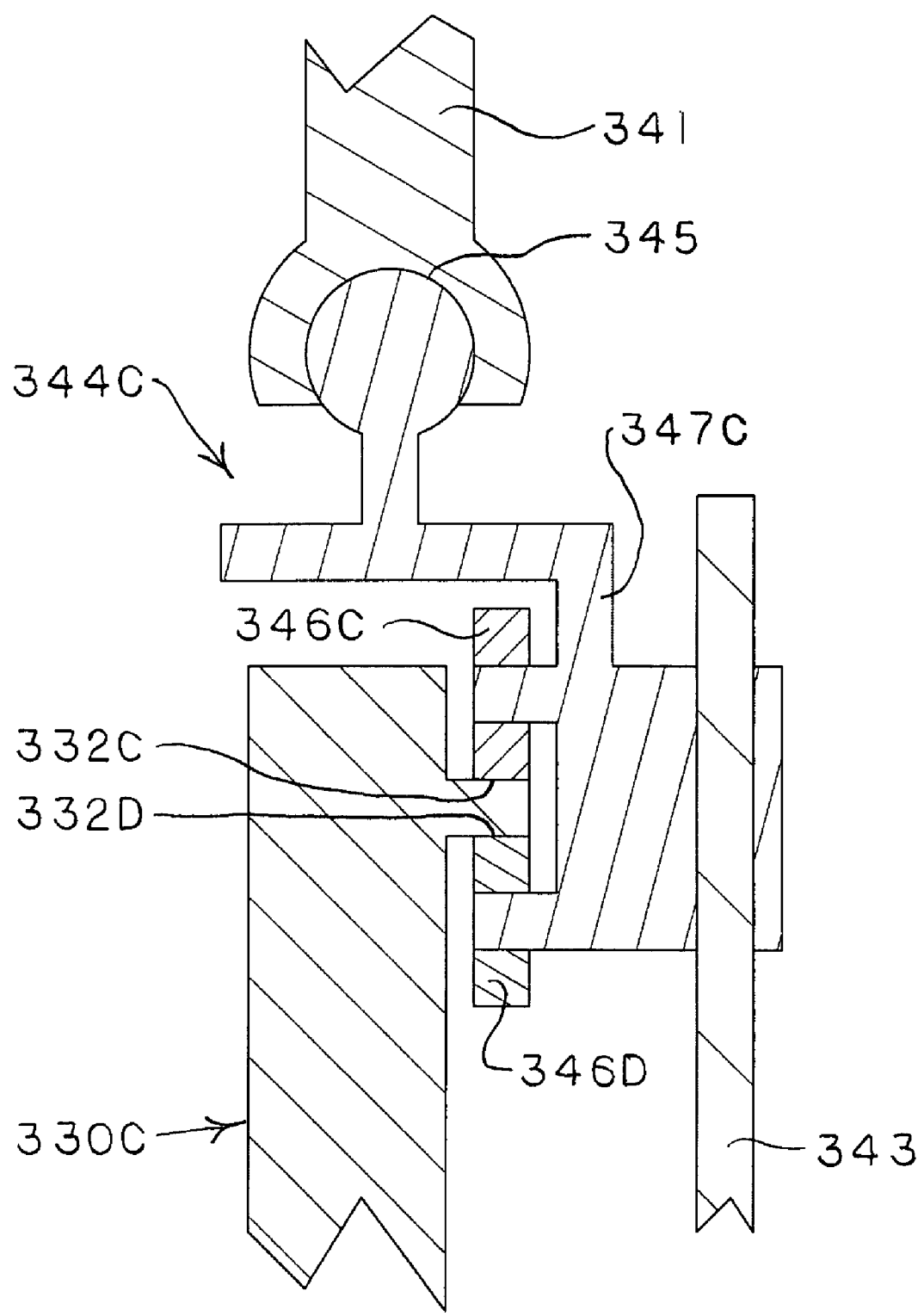

FIG. 22 shows the first axial cam 330C as having a rib contour around the inner cylindrical surface of the first axial cam 330C. The first axial cam 330C further comprising a first axial cam surface 332C which is the upper axial surface of the rib contour and a first axial cam surface 332D which is the lower axial surface of the rib contour when oriented as shown in FIG. 22. FIG. 22 shows the first axial cam tracker 344C further comprising a first axial cam tracker frame 347C, a first axial cam tracker rolling element 346C, and a first axial cam tracker rolling element 346D. The first axial cam tracker frame 347C is a L-shaped member which extends adjacent to the rib contour of the first axial cam surface 332C and the first axial cam surface 332D. The first axial cam tracker rolling element 346C contacts the first axial cam surface 332C and is supported by the first axial cam tracker frame 347C, thus the first axial cam rolling element 346C tracks the first axial cam surface 332C. The first axial cam tracker rolling element 346D contacts the first axial cam surface 332D and is supported by the first axial cam tracker frame 347C, thus the first axial cam rolling element 346D tracks the first axial cam surface 332D.

Figure 23:
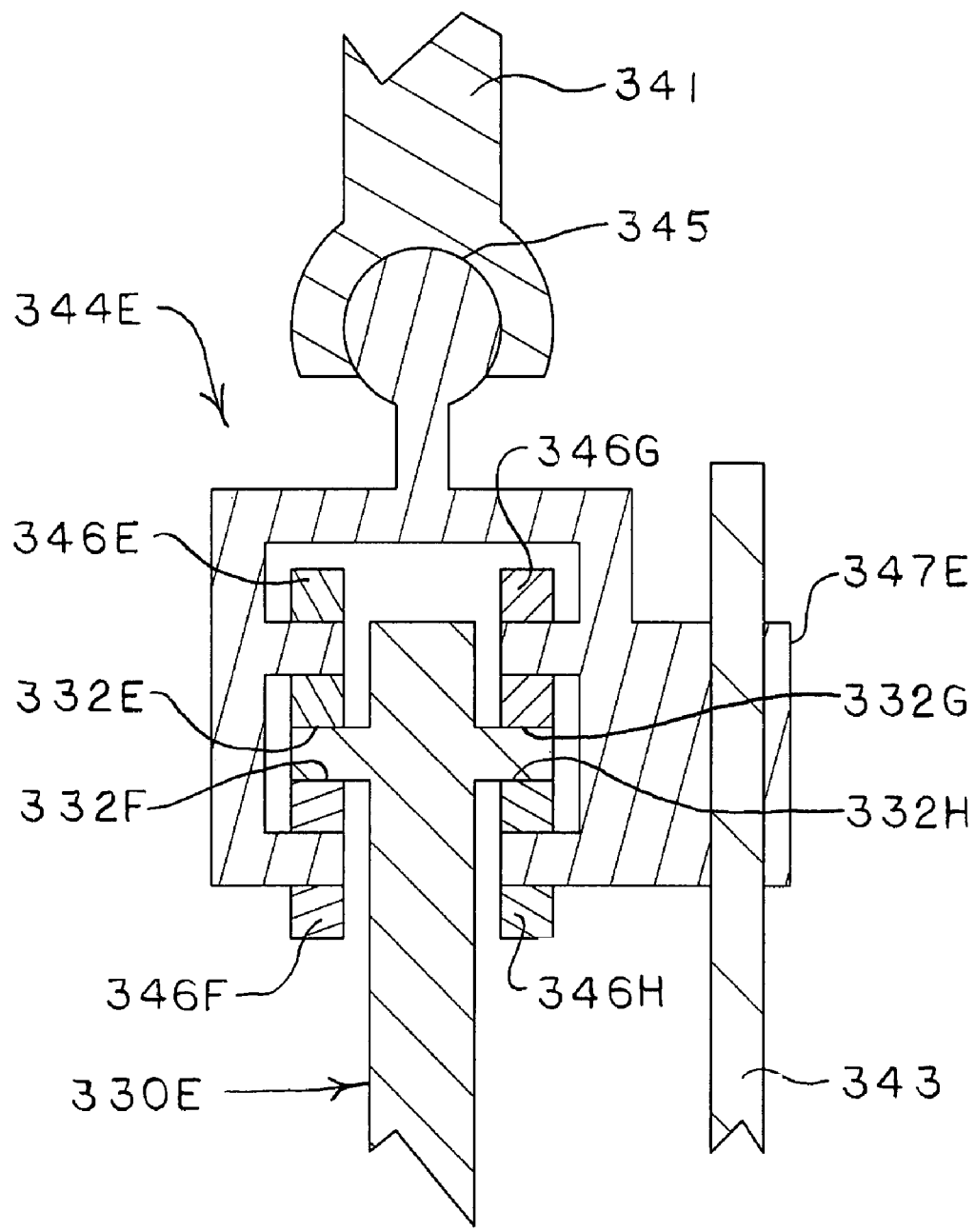

FIG. 23 shows the first axial cam 330E as having a rib contour around the inner and the outer cylindrical surface of the first axial cam 330E. The first axial cam 330E further comprising a first axial cam surface 332E and a first axial cam surface 332F which are the axial surfaces of the rib contour around the outer cylindrical surface of the first axial cam 330E. The first axial cam 330E further comprising a first axial cam surface 332G and a first axial cam surface 332H which are the axial surfaces of the rib contour around the inner cylindrical surface of the first axial cam 330E. FIG. 23 shows the first axial cam tracker 344E further comprising a first axial cam tracker frame 347E, a first axial cam tracker rolling element 346E, a first axial cam tracker rolling element 346F, a first axial cam tracker rolling element 346G, and a first axial cam tracker rolling element 346H. The first axial cam tracker frame 347E is a U-shaped member which extends adjacent to the rib contours of the inner and outer cylindrical surfaces of the first axial cam 330E. The first axial cam tracker rolling element 346E contacts the first axial cam surface 332E and is supported by the first axial cam tracker frame 347E. The first axial cam tracker rolling element 346F contacts the first axial cam surface 332F and is supported by the first axial cam tracker frame 347E. The first axial cam tracker rolling element 346G contacts the first axial cam surface 332G and is supported by the first axial cam tracker frame 347E. The first axial cam tracker rolling element 346H contacts the first axial cam surface 332H and is supported by the first axial cam tracker frame 347E.

Figure 24:
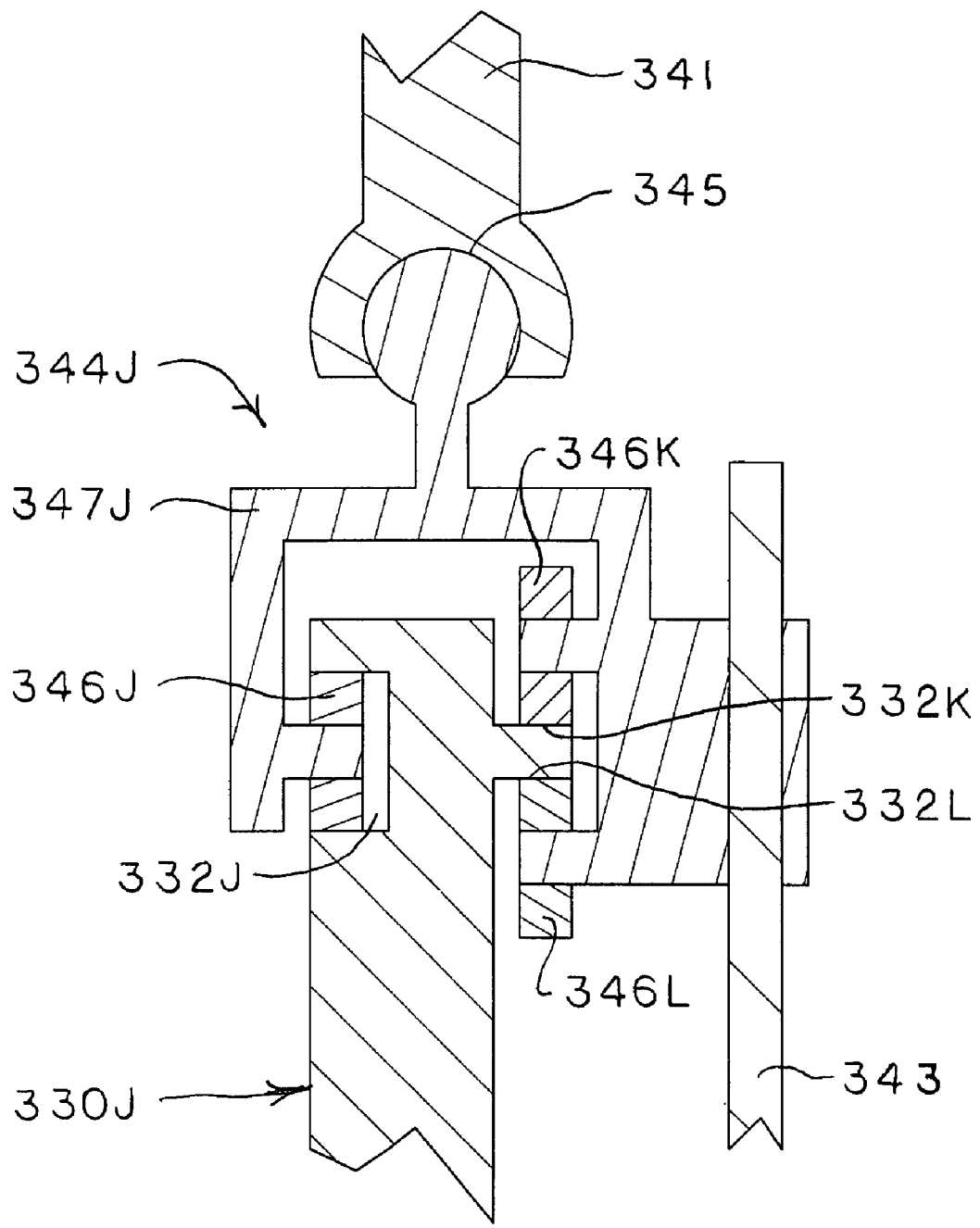

FIG. 24 shows the first axial cam 330J as having a rib contour around the inner cylindrical surface of the first axial cam 330J and a groove contour around the outer cylindrical surface of the first axial cam 330J. The first axial cam 330J further comprising a first axial cam surface 332J which is the groove contour around the outer cylindrical surface of the first axial cam 330J. The first axial cam 330J further comprising a first axial cam surface 332K and a first axial cam surface 332L which are the axial surfaces of the rib contour around the inner cylindrical surface of the first axial cam 330J. FIG. 24 shows the first axial cam tracker 344J further comprising a first axial cam tracker frame 347J, a first axial cam tracker rolling element 346J, a first axial cam tracker rolling element 346K, and a first axial cam tracker rolling element 346L. The first axial cam tracker frame 347J is a U-shaped member which extends adjacent to the groove contour of the outer cylindrical surface of the first axial cam 330J and the rib contour of the inner cylindrical surface of the first axial cam 330J. The first axial cam tracker rolling element 346J resides in the groove contour of the first axial cam surface 332J and is supported by the first axial cam tracker frame 347J. The first axial cam tracker rolling element 346K contacts the first axial cam surface 332K and is supported by the first axial cam tracker frame 347J. The first axial cam tracker rolling element 346L contacts the first axial cam surface 332L and is supported by the first axial cam tracker frame 347J.

Figure 25:
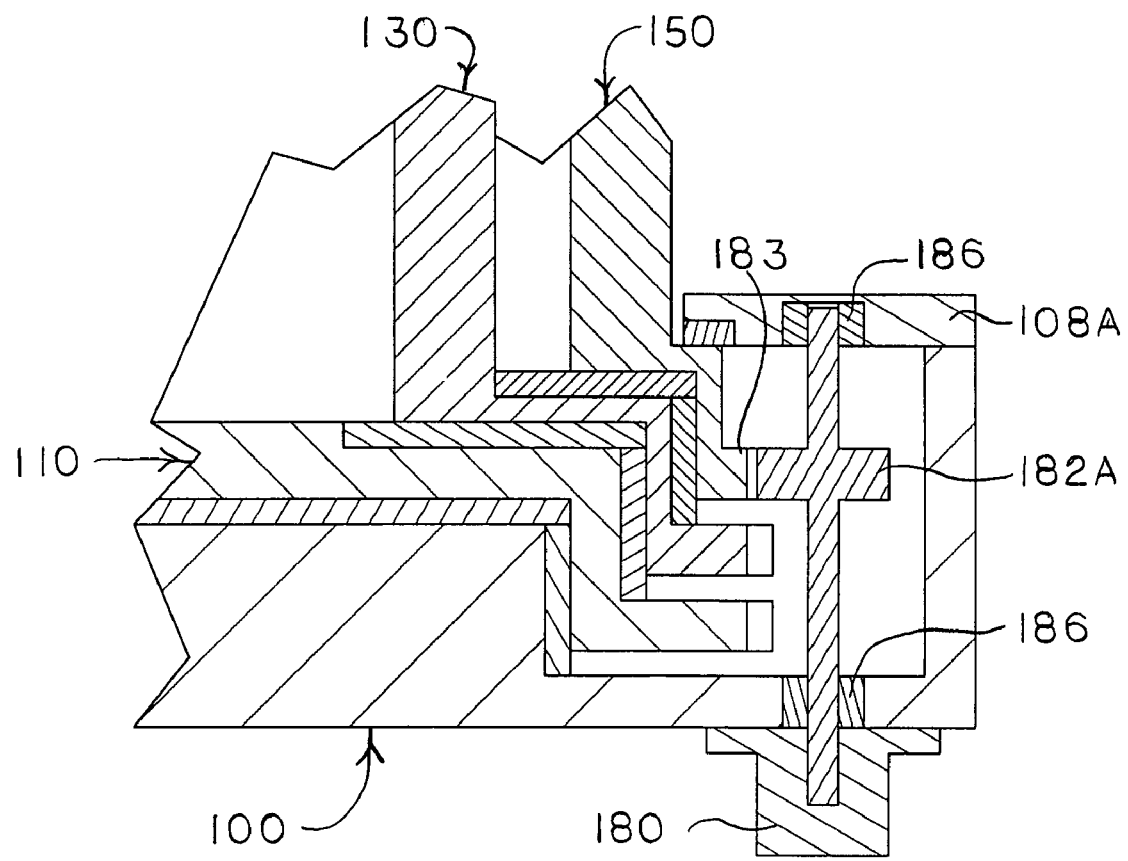
FIG. 25 is a partial cross-sectional view of the motion-positioning apparatus of FIG. 3 showing alternate straddle mounting of the drive component.

Detailed Description—Straddle Mounting: FIG. 25

FIG. 25 shows alternate straddle mounting of the second rotational axis drive component 182A of the parallel shaft drive set shown in FIG. 1-4. A shaft extends axially from both ends of the second rotational axis drive component 182A. Two second rotational axis straddle bearings 186 are supported by the housing 100A and the housing cap 108A. Each end of the shaft of the second rotational axis drive component 182A is supported by the second rotational axis straddle bearings 186. The second rotational axis drive unit 180 couples to the end of the shaft of the second rotational axis drive component 182A which extends through the second rotational axis straddle bearing 186.

Alternate Embodiment Features

Although the present invention has been described in considerable detail with reference to certain preferred versions thereof, other versions are possible. For example:
i) Referring to FIG. 1-20A, the housing outside surface may be of any geometrical shape substantially rigid to support the work load.
ii) Referring to FIG. 1-20A, the work load support may be the work load, a support frame or surface of any surface contour sufficient to support the work load.
iii) Referring to FIG. 1-20A, the rotational joint may be any rotatable joint with two or more degrees of rotational freedom such as a universal joint, ball/socket joint, or gimbal.
iv) The parallel shaft drive set is applicable to any axis or axes of FIG. 1-20A.
v) The 90 degree interesting drive set is applicable to any axis or axes of FIG. 1-20A. For the 90 degree intersecting drive sets, the centerline of the drive component need not always be perpendicular to the centerline of the driven component, for the centerline of the drive component can be an angle less than or greater than 90 degrees to the centerline of the driven component.

vi) The 90 degree non-intersecting drive set is applicable to any axis or axes of FIG. 1-20A. For the 90 degree non-intersecting drive sets, the centerline of the drive component need not always be perpendicular to the centerline of the driven component, for the centerline of the drive component can be an angle less than or greater than 90 degrees to the centerline of the driven component.

vii) Referring to FIG. 8-20A, the axial cam follower rotational joints and axial cam tracker rotational joints may be any rotatable joint with two or more degrees of rotational freedom such as a universal joint, ball/socket joint, or gimbal.

viii) The axial cam-follower configuration shown in FIG. 1-7 is applicable to FIG. 1-20A.

ix) The axial cam-follower configuration shown in FIG. 8-10A is applicable to FIG. 1-20A.

x) The axial cam-follower configuration shown in FIG. 11-13 is applicable to FIG. 1-20A.

xi) The axial cam-follower configuration shown in FIG. 14-16 is applicable to FIG. 1-20A.

xii) The axial cam-follower configuration shown in FIG. 17-20A is applicable to FIG. 1-20A.

Therefore, the spirit and scope of the appended claims should not be limited to the description of the preferred versions contained herein. Any element in a claim that does not explicitly state "means for" performing a specified function, or "step for" performing a specific function, is not to be interpreted as a "means" or "step" clause as specified in 35 U.S.C., Section 112, Paragraph 6. In particular, the use of "step of" in the claims herein is not intended to invoke provisions of 35 U.S.C., Section 112, Paragraph 6.

What is claimed is:

1. A motion-positioning apparatus for generating movement of a work load about a first rotational axis, a second rotational axis, and a third rotational axis of a three orthogonal axes system, said motion-positioning apparatus comprising:
   a) a housing substantially rigid to support the work load; wherein said housing further comprising:
      i) a housing cylindrical centering surface; and
      ii) a housing load support surface;
   b) a rotational joint base; said rotational joint base being substantially rigid to support the work load, said rotational joint base further comprising:
      i) at least two rotational joint base cylindrical centering surfaces being concentric cylindrical surfaces of said rotational joint base, one of said rotational joint base cylindrical centering surfaces concentrically aligned to said housing cylindrical centering surface; and
      ii) at least two rotational joint base load support surfaces being axial surfaces of said rotational joint base, one of said rotational joint base load support surfaces axially aligned to said housing load support surface, wherein said rotational joint base is rotatable;
   c) a work load support being substantially rigid to support the work load;
   d) a rotational joint having at least two axes of rotation, said rotational joint axes of rotation being the first rotational axis and the second rotational axis of said motion-positioning apparatus; wherein said rotational joint being attached between said work load support and said rotational joint base such that said rotational joint is centered about said rotational joint base cylindrical centering surfaces and said work load support is rotatable about the first rotational axis and the second rotational axis of said rotational joint;
   e) a first axial cam, wherein said first axial cam being of cylindrical shape and having a hollow center to provide clearance about said rotational joint; said first axial cam being substantially rigid to support the work load; said first axial cam further comprising:
      i) a first axial cam surface;
      ii) at least two first axial cam cylindrical centering surfaces being concentric cylindrical surfaces of said first axial cam; one of said first axial cam cylindrical centering surfaces concentrically aligned to one of said rotational joint base cylindrical centering surfaces; and
      iii) at least two first axial cam load support surfaces being axial surfaces of said first axial cam; one of said first axial cam load support surfaces axially aligned to one of said rotational joint base load support surfaces, wherein said first axial cam is rotatable;
   f) at least one first axial cam follower attached to said work load support; said first axial cam follower contacts said first axial cam surface, wherein rotation of said first axial cam rotates said work load support about the first rotational axis of said rotational joint;
   g) a second axial cam, said second axial cam being of cylindrical shape and having a hollow center to provide clearance about said first axial cam; said second axial cam being substantially rigid to support the work load; said second axial cam further comprising:
      i) a second axial cam surface;
      ii) a second axial cam cylindrical centering surface being a cylindrical surface of said second axial cam; said second axial cam cylindrical centering surface concentrically aligned to one of said first axial cam cylindrical centering surfaces; and
      iii) a second axial cam load support surface being an axial surface of said second axial cam; said second axial cam load support surface axially aligned to said first axial cam load support surfaces, wherein one of said second axial came is rotatable;
   h) at least one second axial cam follower attached to said work load support; said second axial cam follower contacts said second axial cam surface, wherein rotation of said second axial cam rotates said work load support about the second rotational axis of said rotational joint;
   i) a first rotational axis drive unit mounted to said housing; means for coupling rotational energy from said first rotational axis drive unit to said first axial cam, wherein said first rotational axis drive unit rotates said first axial cam;
   j) a second rotational axis drive unit mounted to said housing; means for coupling rotational energy from said second rotational axis drive unit to said second axial cam, wherein said second rotational axis drive unit rotates said second axial cam; and
   k) a third rotational axis drive unit mounted to said housing; means for coupling rotational energy from said third rotational axis drive unit to said rotational joint base, wherein said third rotational axis drive unit rotates said rotational joint base.

2. The motion-positioning apparatus according to claim 1, wherein said first rotational axis drive unit is selected from the group consisting of electric motors, pneumatic motors, or hydraulic motors.

3. The motion-positioning apparatus according to claim 1, wherein said means for coupling rotational energy from said first rotational axis drive unit to said first axial cam comprises a first rotational axis drive set; said first rotational axis drive set comprises at least a first rotational axis drive component and a first axial cam driven component; said first rotational axis drive set is selected from the group consisting of parallel shaft drive sets, 90 degree intersecting drive sets, or 90 degree non-intersecting drive sets; said first axial cam driven component is attached to said first axial cam; said first rotational axis drive unit is coupled to said first rotational axis drive component; said first rotational axis drive component having a mounting selected from the group consisting of support by an output of said first rotational axis drive unit, overhung mounting support by said housing, or straddle mounting support by said housing; said first rotational axis drive component is engaged with said first axial cam driven component directly, or through at least one intermediate drive component of said first rotational axis drive set.

4. The motion-positioning apparatus according to claim 1, wherein said second rotational axis drive unit is selected from the group consisting of electric motors, pneumatic motors, or hydraulic motors.

5. The motion-positioning apparatus according to claim 1, wherein said means for coupling rotational energy from said second rotational axis drive unit to said second axial cam comprises a second rotational axis drive set; said second rotational axis drive set comprises at least a second rotational axis drive component and a second axial cam driven component; said second rotational axis drive set is selected from the group consisting of parallel shaft drive sets, 90 degree intersecting drive sets, or 90 degree non-intersecting drive sets; said second axial cam driven component is attached to said second axial cam; said second rotational axis drive unit is coupled to said second rotational axis drive component; said second rotational axis drive component having a mounting selected from the group consisting of support by an output of said second rotational axis drive unit, overhung mounting support by said housing, or straddle mounting support by said housing; said second rotational axis drive component is engaged with said second axial cam driven component directly, or through at least one intermediate drive component of said second rotational axis drive set.

6. The motion-positioning apparatus according to claim 1, wherein said third rotational axis drive unit is selected from the group consisting of electric motors, pneumatic motors, or hydraulic motors.

7. The motion-positioning apparatus according to claim 1, wherein said means for coupling rotational energy from said third rotational axis drive unit to said rotational joint base comprises a third rotational axis drive set; said third rotational axis drive set comprises at least a third rotational axis drive component and a rotational joint base driven component; said third rotational axis drive set is selected from the group consisting of parallel shaft drive sets, 90 degree intersecting drive sets, or 90 degree non-intersecting drive sets; said rotational joint base driven component being attached to said rotational joint base; said third rotational axis drive unit is coupled to said third rotational axis drive component; said third rotational axis drive component having a mounting selected from the group consisting of support by an output of said third rotational axis drive unit, overhung mounting support by said housing, or straddle mounting support by said housing; said third rotational axis drive component is engaged with said rotational joint base driven component directly, or through at least one intermediate drive component of said third rotational axis drive set.

8. The motion-positioning apparatus according to claim 1, further comprising:

a) a first rotational axis thrust bearing located between said first axial cam load support surface and said rotational joint base load support surface; said first rotational axis thrust bearing is selected from the group consisting of sliding or rolling element bearings;

b) a second rotational axis thrust bearing located between said second axial cam load support surface and said first axial cam load support surface; said second rotational axis thrust bearing is selected from the group consisting of sliding or rolling element bearings; and/or c) a third rotational axis thrust bearing located between said rotational joint base load support surface and said housing load support surface; said third rotational axis thrust bearing is selected from the group consisting of sliding or rolling element bearings.

9. The motion-positioning apparatus according to claim 1, further comprising:

a) a first rotational axis radial bearing located between said first axial cam cylindrical centering surface and said rotational joint base cylindrical centering surface; said first rotational axis radial bearing is selected from the group consisting of sliding or rolling element bearings;

b) a second rotational axis radial bearing located between said second axial cam cylindrical centering surface and said first axial cam cylindrical centering surface; said second rotational axis radial bearing is selected from the group consisting of sliding or rolling element bearings; and/or c) a third rotational axis radial bearing located between said rotational joint base cylindrical centering surface and said housing cylindrical centering surface; said third rotational axis radial bearing is selected from the group consisting of sliding or rolling element bearings.

10. The motion-positioning apparatus according to claim 1, wherein said first axial cam surface and said first axial cam follower create a force closure cam joint; said first axial cam surface having a magnitude of rise displacement equal to a magnitude of fall displacement at any two coordinates along said first axial cam surface which are 180 degrees apart; said first axial cam follower further comprising of two first axial cam followers 180 degrees apart and aligned perpendicular to the first rotational axis of said rotational joint, such that said first axial cam followers rise and fall equal magnitude when said first axial cam is rotated; each said first axial cam follower further comprising:

i) a first axial cam follower link substantially rigid to support the work load; said first axial cam follower link being rigidly attached to said work load support and having an end of said first axial cam follower link opposite said work load support extending towards said first axial cam surface; and ii) a first axial cam follower rolling element; said first axial cam follower link supporting said first axial cam follower rolling element, such that said first axial cam follower rolling element contacts said first axial cam surface.

11. The motion-positioning apparatus according to claim 1, wherein said first axial cam surface and said first axial cam follower create a force closure cam joint; said first axial cam surface having a magnitude of rise displacement equal to a magnitude of fall displacement at any two coordinates along said first axial cam surface which are 180 degrees apart; said first axial cam surface being perpendicular to an axial axis of said first axial cam; said first axial cam follower further comprising of two first axial cam followers 180 degrees apart and aligned perpendicular to the first rotational axis of said rotational joint, so that said first axial cam followers rise and fall equal magnitude when said first axial cam is rotated; each said first axial cam follower further comprising:
- a) a first axial cam tracker, said first axial cam tracker further comprising:
  - i) a first axial cam tracker frame being adjacent to said first axial cam surface;
  - ii) a first axial cam tracker rotational joint having at least two degrees of rotational freedom; said first axial cam tracker rotational joint being attached to said first axial cam tracker frame; and
  - iii) at least one first axial cam tracker rolling element being supported by said first axial cam tracker frame, such that said first axial cam tracker rolling element contacts said first axial cam surface;
- b) means for guiding along a path parallel to the axial axis of said first axial cam, said first axial cam tracker through the range of the displacement of said first axial cam surface;
- c) a first axial cam follower rotational joint having at least two degrees of rotational freedom; said first axial cam follower rotational joint being attached to said work load support; and
- d) a first axial cam follower connecting link being attached between said first axial cam follower rotational joint and said first axial cam tracker rotational joint.

12. The motion-positioning apparatus according to claim 1, wherein said first axial cam surface and said first axial cam follower create a form closure cam joint; said first axial cam surface is selected from the group consisting of at least one groove, at least one rib, or combination of at least one groove and at least one rib; said first axial cam follower aligned perpendicular to the first rotational axis of said rotational joint, said first axial cam follower further comprising:
- a) a first axial cam tracker, said first axial cam tracker further comprising:
  - i) a first axial cam tracker frame being adjacent to said first axial cam surface;
  - ii) a first axial cam tracker rotational joint having at least two degrees of rotational freedom; said first axial cam tracker rotational joint being attached to said first axial cam tracker frame; and
  - iii) at least one first axial cam tracker rolling element being supported by said first axial cam tracker frame, such that said first axial cam tracker rolling element contacts said first axial cam surface;
- b) means for guiding along a path parallel to an axial axis of said first axial cam, said first axial cam tracker through the range of the displacement of said first axial cam surface;
- c) a first axial cam follower rotational joint having at least two degrees of rotational freedom; said first axial cam follower rotational joint being attached to said work load support; and
- d) a first axial cam follower connecting link being attached between said first axial cam follower rotational joint and said first axial cam tracker rotational joint.

13. The motion-positioning apparatus according to claim 1, wherein said second axial cam surface and said second axial cam follower create a force closure cam joint; said second axial cam surface having a magnitude of rise displacement equal to a magnitude of fall displacement at any two coordinates along said second axial cam surface which are 180 degrees apart; said second axial cam follower further comprising of two second axial cam followers 180 degrees apart and aligned perpendicular to the second rotational axis of said rotational joint, such that said second axial cam followers rise and fall equal magnitude when said second axial cam is rotated; each said second axial cam follower further comprising:
- i) a second axial cam follower link substantially rigid to support the work load; said second axial cam follower link being rigidly attached to said work load support and having an end of said second axial cam follower link opposite said work load support extending towards said second axial cam surface; and
- ii) a second axial cam follower rolling element; said second axial cam follower link supporting said second axial cam follower rolling element and said second axial cam follower rolling element contacts said second axial cam surface.

14. The motion-positioning apparatus according to claim 1, wherein said second axial cam surface and said second axial cam follower create a force closure cam joint; said second axial cam surface having a magnitude of rise displacement equal to a magnitude of fall displacement at any two coordinates along said second axial cam surface which are 180 degrees apart; said second axial cam surface being perpendicular to an axial axis of said second axial cam; said second axial cam follower further comprising of two second axial cam followers 180 degrees apart and aligned perpendicular to the second rotational axis of said rotational joint, such that said second axial cam followers rise and fall equal magnitude when said second axial cam is rotated; each said second axial cam follower further comprising:
- a) a second axial cam tracker, said second axial cam tracker further comprising:
  - i) a second axial cam tracker frame being adjacent to said second axial cam surface;
  - ii) a second axial cam tracker rotational joint having at least two degrees of rotational freedom; said second axial cam tracker rotational joint being attached to said second axial cam tracker frame; and
  - iii) at least one second axial cam tracker rolling element being supported by said second axial cam tracker frame, such that said second axial cam tracker rolling element contacts said second axial cam surface;
- b) means for guiding along a path parallel to the axial axis of said second axial cam, said second axial cam tracker through the range of the displacement of said second axial cam surface;
- c) a second axial cam follower rotational joint having at least two degrees of rotational freedom; said second axial cam follower rotational joint being attached to said work load support; and
- d) a second axial cam follower connecting link being attached between said second axial cam follower rotational joint and said second axial cam tracker rotational joint.

15. The motion-positioning apparatus according to claim 1, wherein said second axial cam surface and said second axial cam follower create a form closure cam joint; said second axial cam surface is selected from the group consisting of at least one groove, at least one rib, or combination of at least one groove and at least one rib; said second axial cam follower aligned perpendicular to the second rotational axis of said rotational joint, said second axial cam follower further comprising:
- a) a second axial cam tracker, said second axial cam tracker further comprising:
  - i) a second axial cam tracker frame being adjacent to said second axial cam surface;
  - ii) a second axial cam tracker rotational joint having at least two degrees of rotational freedom; said second axial cam tracker rotational joint being attached to said second axial cam tracker frame; and iii) at least one second axial cam tracker rolling element being supported by said second axial cam tracker frame, such that said second axial cam tracker rolling element contacts said second axial cam surface;

b) means for guiding along a path parallel to an axial axis of said second axial cam, said second axial cam tracker through the range of the displacement of said second axial cam surface;

c) a second axial cam follower rotational joint having at least two degrees of rotational freedom; said second axial cam follower rotational joint being attached to said work load support; and d) a second axial cam follower connecting link being attached between said second axial cam follower rotational joint and said second axial cam tracker rotational joint.

16. The motion-positioning apparatus according to claim 1, wherein said work load support being the work load, such that the work load is attached to said rotational joint, said first axial cam follower, and said second axial cam follower.

17. The motion-positioning apparatus according to claim 1, further comprising:

a) said second axial cam having a shoulder surface protruding from the outer cylindrical surface of said second axial cam; the shoulder surface of said second axial cam being perpendicular to an axial axis of said second axial cam;

b) a housing cap encircling the shoulder surface of said second axial cam; said housing cap being attached to said housing; and c) a housing thrust bearing residing between the shoulder surface of said second axial cam and said said housing cap; wherein said housing thrust bearing is selected from the group consisting of sliding or rolling element bearings.

18. A motion-positioning apparatus for generating movement of a work load about a first rotational axis, a second rotational axis, and a third rotational axis of a three orthogonal axes system, said motion-positioning apparatus comprising:

a) a housing; said housing being substantially rigid to support the work load, wherein said housing further comprising:

i) a housing-rotational joint base centering surface being a cylindrical surface of said housing; and ii) a housing-rotational joint base load support surface being an axial surface of said housing;

b) a rotational joint base; said rotational joint base being substantially rigid to support the work load, said rotational joint base further comprising:

i) a rotational joint base-first axial cam centering surface being a cylindrical surface of said rotational joint base;

ii) a rotational joint base-first axial cam load support surface being an axial surface of said rotational joint base;

iii) a rotational joint base-housing centering surface being a cylindrical surface of said rotational joint base; wherein said rotational joint base-housing centering surface is concentrically aligned with said housing-rotational joint base centering surface; and iv) a rotational joint base-housing load support surface being an axial surface of said rotational joint base; said rotational joint base-housing load support surface being axially aligned to said housing-rotational joint base load support surface, such that a rotational joint base axial force is transferred from said rotational joint base-housing load support surface to said housing-rotational joint base load support surface and said rotational joint base is rotatable;

c) a work load support being substantially rigid to support the work load;

d) a rotational joint having at least two axes of rotation, said rotational joint axes of rotation being the first rotational axis and the second rotational axis of said motion-positioning apparatus; said rotational joint being attached between said work load support and said rotational joint base such that said rotational joint is centered about said rotational joint base-housing centering surface, wherein said work load support is rotatable about the first rotational axis and the second rotational axis of said rotational joint;

e) a first axial cam having a bore to provide clearance about said rotational joint; said first axial cam being substantially rigid to support the work load; said first axial cam further comprising:

i) a first axial cam surface being circular and of varying displacement along an axial axis of said first axial cam;

ii) a first axial cam-second axial cam centering surface being a cylindrical surface of said first axial cam;

iii) a first axial cam-second axial cam load support surface being an axial surface of said first axial cam;

iv) a first axial cam-rotational joint base centering surface being a cylindrical surface of said first axial cam; wherein said first axial cam-rotational joint base centering surface is concentrically aligned to said rotational joint base-first axial cam centering surface; and v) a first axial cam-rotational joint base load support surface being an axial surface of said first axial cam; said first axial cam-rotational joint base load support surface being axially aligned to said rotational joint base-first axial cam load support surface, such that a first axial cam axial force is transferred from said first axial cam-rotational joint base load support surface to said rotational joint base-first axial cam load support surface and said first axial cam is rotatable;

f) at least one first axial cam follower attached to said work load support; said first axial cam follower contacts said first axial cam surface, wherein rotation of said first axial cam rotates said work load support about the first rotational axis of said rotational joint;

g) a second axial cam, wherein said second axial cam having a bore to provide clearance about said first axial cam; said second axial cam being substantially rigid to support the work load; said second axial cam further comprising:

i) a second axial cam surface being circular and of varying displacement along an axial axis of said second axial cam;

ii) a second axial cam-first axial cam centering surface being the bore of said second axial cam; said second axial cam-first axial cam centering surface is concentrically aligned to said first axial cam-second axial cam centering surface; and iii) a second axial cam-first axial cam load support surface being an axial surface of said second axial cam; said second axial cam-first axial cam load support surface being axially aligned to said first axial cam-second axial cam load support surface, such that a second axial cam axial force is transferred from said second axial cam-first axial cam load support surface to said first axial cam-second axial cam load support surface and said second axial cam is rotatable;

h) at least one second axial cam follower attached to said work load support; said second axial cam follower contacts said second axial cam surface, wherein rotation of said second axial cam rotates said work load support about the second rotational axis of said rotational joint;

i) a first rotational axis drive unit mounted to said housing; wherein said first rotational axis drive unit is selected from the group consisting of electric motors, pneumatic motors, or hydraulic motors;

j) a first rotational axis drive set; said first rotational axis drive set comprising at least a first rotational axis drive component and a first axial cam driven component; said first rotational axis drive set is selected from the group consisting of parallel shaft drive sets, 90 degree intersecting drive sets, or 90 degree non-intersecting drive sets; said first axial cam driven component attached to said first axial cam; said first rotational axis drive unit is coupled to said first rotational axis drive component; said first rotational axis drive component having a mounting selected from the group consisting of support by an output of said first rotational axis drive unit, overhung mounting support by said housing, or straddle mounting support by said housing; said first rotational axis drive component is engaged with said first axial cam driven component directly, or through at least one intermediate drive components of said first rotational axis drive set, wherein said first axial cam is by the coupling of rotational energy from said first rotational axis drive unit to said first axial cam;

k) a second rotational axis drive unit mounted to said housing; wherein said second rotational axis drive unit is selected from the group consisting of electric motors, pneumatic motors, or hydraulic motors;

l) a second rotational axis drive set; said second rotational axis drive set comprising at least a second rotational axis drive component and a second axial cam driven component; said second rotational axis drive set is selected from the group consisting of parallel shaft drive sets, 90 degree intersecting drive sets, or 90 degree non-intersecting drive sets; said second axial cam driven component attached to said second axial cam; said second rotational axis drive unit is coupled to said second rotational axis drive component; said second rotational axis drive component having a mounting selected from the group consisting of support by an output of said second rotational axis drive unit, overhung mounting support by said housing, or straddle mounting support by said housing; said second rotational axis drive component is engaged with said second axial cam driven component directly, or through at least one intermediate drive components of said second rotational axis drive set, wherein said second axial cam is rotated by the coupling of rotational energy from said second rotational axis drive unit to said second axial cam;

m) a third rotational axis drive unit mounted to said housing; wherein said third rotational axis drive unit is selected from the group consisting of electric motors, pneumatic motors, or hydraulic motors; and n) a third rotational axis drive set; said third rotational axis drive set comprising at least a third rotational axis drive component and a rotational joint base driven component; said third rotational axis drive set is selected from the group consisting of parallel shaft drive sets, 90 degree intersecting drive sets, or 90 degree non-intersecting drive sets; said rotational joint base driven component attached to said rotational joint base; said third rotational axis drive unit is coupled to said third rotational axis drive component; said third rotational axis drive component having a mounting selected from the group consisting of support by an output of said third rotational axis drive unit, overhung mounting support by said housing, or straddle mounting support by said housing; said third rotational axis drive component is engaged with said rotational joint base driven component directly, or through at least one intermediate drive components of said third rotational axis drive set, wherein said rotational joint base is rotated by the coupling of rotational energy from said third rotational axis drive unit to said rotational joint base.

19. The motion-positioning apparatus according to claim 18, wherein:
   i) said housing having a housing cylindrical contour shaped as a cylinder;
   ii) said housing-rotational joint base load support surface being an axial end surface of said housing cylindrical contour;
   iii) said rotational joint base-first axial cam centering surface being the cylindrical surface of said rotational joint base having an outer radial surface;
   iv) said rotational joint base-first axial cam load support surface being the axial surface of said rotational joint base adjacent to said rotational joint base-first axial cam centering surface;
   v) said rotational joint base having a closed end bore opposite said rotational joint;
   vi) said rotational joint base-housing centering surface being the cylindrical surface of closed end bore of said rotational joint base;
   vii) said rotational joint base-housing load support surface being the axial surface of the closed end bore of said rotational joint base;
   viii) said first axial cam having a flange at the end opposite said first axial cam surface; the bore of said first axial cam being larger at said first axial cam flange;
   ix) said first axial cam-second axial cam centering surface being the cylindrical surface of said first axial cam flange having an outer radial surface;
   x) said first axial cam-second axial cam load support surface being the axial surface of said first axial cam flange closest to said first axial cam surface;
   xi) said first axial cam-rotational joint base centering surface being the cylindrical surface of the larger bore of said first axial cam flange;
   xii) said first axial cam-rotational joint base load support surface being the axial surface between the bore of said first axial cam and the larger bore of said first axial cam;
   xiii) said second axial cam having a larger bore at the end opposite said second axial cam surface;
   xiv) said second axial cam-first axial cam centering surface being the cylindrical surface of the larger bore of said second axial cam; and
   xv) said second axial cam-first axial cam load support surface being the axial surface between the larger bore and the clearance bore of said second axial cam.

20. The motion-positioning apparatus according to claim 18, wherein:
   i) said housing having a closed end bore;
   ii) said housing-rotational joint base load support surface being the axial surface of said housing closed end bore;
   iii) said rotational joint base having a closed end bore opposite said housing closed end bore;

iv) said rotational joint base-first axial cam centering surface being the cylindrical surface of the closed end bore of said rotational joint base;

v) said rotational joint base-first axial cam load support surface being the axial surface of the closed end bore of said rotational joint base;

vi) said rotational joint base-housing load support surface being the axial surface of said rotational joint base opposite said rotational joint;

vii) said rotational joint base-housing centering surface being the cylindrical surface of said rotational joint base having an outer radial surface adjacent to said rotational joint base-housing load support surface;

viii) said first axial cam having a flange located between said first axial cam surface and the end opposite said first axial cam surface;

ix) said first axial cam-second axial cam centering surface being the cylindrical surface of said first axial cam having an outer radial surface between the flange of said first axial cam and said first axial cam surface;

x) said first axial cam-second axial cam load support surface being the axial surface of said first axial cam flange adjacent to said first axial cam-second axial cam centering surface;

xi) said first axial cam-rotational joint base centering surface being the cylindrical surface of said first axial cam having an outer radial surface between said first axial cam flange and the end opposite said first axial cam surface;

xii) said first axial cam-rotational joint base load support surface being the axial surface of said first axial cam opposite said first axial cam surface; and xiii) said second axial cam-first axial cam load support surface being the axial surface of said second axial cam opposite said second axial cam surface.

21. The motion-positioning apparatus according to claim 18, wherein:

i) said housing having a housing cylindrical contour shaped as a cylinder;

ii) said housing-rotational joint base load support surface being the axial surface of said housing adjacent to said housing cylindrical contour;

iii) said rotational joint base having a flange and a closed end bore at the end of said rotational joint base opposite said rotational joint;

iv) said rotational joint base-housing centering surface being the cylindrical surface of the closed end bore of said rotational joint base;

v) said rotational joint base-housing load support surface being the axial surface of the flange opposite said rotational joint;

vi) said rotational joint base-first axial cam centering surface being the cylindrical surface of said rotational joint base having an outer radial surface;

vii) said rotational joint base-first axial cam load support surface being the axial surface of said rotational joint base flange adjacent to said rotational joint base-first axial cam centering surface;

viii) said first axial cam having a flange about the end of said first axial cam opposite said first axial cam surface;

ix) said first axial cam-second axial cam centering surface being the cylindrical surface of said first axial cam having an outer radial surface;

x) said first axial cam-second axial cam load support surface being the axial surface of said first axial cam flange adjacent to said first axial cam-second axial cam centering surface;

xi) said first axial cam-rotational joint base centering surface being the cylindrical surface of said first axial cam bore;

xii) said first axial cam-rotational joint base load support surface being the axial surface of said first axial cam opposite said first axial cam surface; and xiii) said second axial cam-first axial cam load support surface being the axial surface of said second axial cam opposite said second axial cam surface.

22. The motion-positioning apparatus according to claim 18, wherein:

i) said housing having a closed end bore;

ii) said housing-rotational joint base load support surface being the axial surface of said housing adjacent to said housing closed end bore;

iii) said rotational joint base having a flange with a closed end bore;

iv) said rotational joint base-first axial cam centering surface being the cylindrical surface of the closed end bore of said rotational joint base;

v) said rotational joint base-first axial cam load support surface being the axial surface of said rotational joint base flange adjacent the closed end bore of said rotational joint base;

vi) said rotational joint base-housing centering surface being the cylindrical surface of said rotational joint base having an outer radial surface between said rotational joint base flange and said rotational joint base having an axial end;

vii) said rotational joint base-housing load support surface being the axial surface of said rotational joint base flange opposite said rotational joint base-first axial cam load support surface;

viii) said first axial cam having a flange;

ix) said first axial cam-second axial cam centering surface being the cylindrical surface of said first axial cam having a radial surface between said first axial cam flange and said first axial cam surface;

x) said first axial cam-second axial cam load support surface being the axial surface of said first axial cam flange adjacent to said first axial cam-second axial cam centering surface;

xi) said first axial cam-rotational joint base centering surface being the cylindrical surface of said first axial cam having a radial surface between said first axial cam flange and the axial surface opposite said first axial cam surface;

xii) said first axial cam-rotational joint base load support surface being the axial surface of said first axial cam flange adjacent to said first axial cam-rotational joint base centering surface; and xiii) said second axial cam-first axial cam load support surface being the axial surface of said second axial cam opposite said second axial cam surface.

23. The motion-positioning apparatus according to claim 18, wherein:

i) said housing having a closed end bore;

ii) said housing-rotational joint base load support surface being the axial surface of the housing closed end bore;

iii) ;

iv) said rotational joint base-first axial cam centering surface being the cylindrical surface of said rotational joint base having an outer radial surface;

v) said rotational joint base-first axial cam load support surface being the axial surface of said rotational joint base adjacent to said rotational joint base-first axial cam centering surface;

vi) said rotational joint base-housing load support surface being the axial surface of said rotational joint base opposite said rotational joint;
vii) said rotational joint base-housing centering surface being the cylindrical surface of said rotational joint base having an outer radial surface adjacent said rotational joint base-housing load support surface;
viii) said first axial cam having a flange about the axial surface of said first axial cam opposite said first axial cam surface;
ix) said first axial cam-second axial cam centering surface being the cylindrical surface of said first axial cam having an outer radial surface between said first axial cam flange and said first axial cam surface;
x) said first axial cam-second axial cam load support surface being the axial surface of said first axial cam flange adjacent to said first axial cam-second axial cam centering surface;
xi) said first axial cam-rotational joint base centering surface being the bore surface of said first axial cam;
xii) said first axial cam-rotational joint base load support surface being the axial surface of said first axial cam opposite first axial cam surface; and
xiii) said second axial cam-first axial cam load support surface being the axial surface of said second axial cam opposite said second axial cam surface.

24. The motion-positioning apparatus according to claim 18, wherein:
i) said housing having a closed end bore;
ii) said housing-rotational joint base load support surface being the axial surface of said housing adjacent to said housing closed end bore;
iii)
iv) said rotational joint base-first axial cam centering surface being the cylindrical surface of said rotational joint base having an outer radial surface;
v) said rotational joint base-first axial cam load support surface being the axial surface of said rotational joint base adjacent to said rotational joint base-first axial cam centering surface;
vi) said rotational joint base-housing centering surface being the cylindrical surface of said rotational joint base having an outer radial surface;
vii) said rotational joint base-housing load support surface being the axial surface of said rotational joint base adjacent to said rotational joint base-housing centering surface;
viii) said first axial cam having a flange about the axial surface of said first axial cam opposite said first axial cam surface;
ix) said first axial cam-second axial cam centering surface being the cylindrical surface of said first axial cam between said first axial cam flange and said first axial cam surface;
x) said first axial cam-second axial cam load support surface being the axial surface of said first axial cam flange adjacent to said first axial cam-second axial cam centering surface;
xi) said first axial cam-rotational joint base centering surface being the cylindrical surface of said first axial cam bore;
xii) said first axial cam-rotational joint base load support surface being the axial surface of said first axial cam opposite said first axial cam surface; and
xiii) said second axial cam-first axial cam load support surface being the axial surface of said second axial cam opposite said second axial cam surface.

25. The motion-positioning apparatus according to claim 18, further comprising:
a) a first rotational axis thrust bearing located between said rotational joint base-first axial cam load support surface and said first axial cam-rotational joint base load support surface; wherein said first rotational axis thrust bearing is selected from the group consisting of sliding or rolling element bearings;
b) a second rotational axis thrust bearing located between said first axial cam-second axial cam load support surface and said second axial cam-first axial cam load support surface; wherein said second rotational axis thrust bearing is selected from the group consisting of sliding or rolling element bearings; and/or
c) a third rotational axis thrust bearing located between said housing-rotational joint base load support surface and said rotational joint base-housing load support surface; wherein said third rotational axis thrust bearing is selected from the group consisting of sliding or rolling element bearings.

26. The motion-positioning apparatus according to claim 18, further comprising:
a) a first rotational axis radial bearing located between said rotational joint base-first axial cam centering surface and said first axial cam-rotational joint base centering surface; wherein said first rotational axis radial bearing is selected from the group consisting of sliding or rolling element bearings;
b) a second rotational axis radial bearing located between said first axial cam-second axial cam centering surface and said second axial cam-first axial cam centering surface; wherein said second rotational axis radial bearing is selected from the group consisting of sliding or rolling element bearings; and/or
c) a third rotational axis radial bearing located between said housing-rotational joint base centering surface and said rotational joint base-housing centering surface; wherein said third rotational axis radial bearing is selected from the group consisting of sliding or rolling element bearings.

27. The motion-positioning apparatus according to claim 18, wherein said first axial cam surface and said first axial cam follower create a force closure cam joint; said first axial cam surface having a magnitude of rise displacement equal to a magnitude of fall displacement at any two coordinates along said first axial cam surface which are 180 degrees apart; said first axial cam follower further comprising of two first axial cam followers 180 degrees apart and aligned perpendicular to the first rotational axis of said rotational joint, such that said first axial cam followers rise and fall equal magnitude when said first axial cam is rotated; each said first axial cam follower further comprising:
i) a first axial cam follower link substantially rigid to support the work load; said first axial cam follower link being rigidly attached to said work load support and having an end of said first axial cam follower link opposite said work load support extending towards said first axial cam surface; and
ii) a first axial cam follower rolling element; said first axial cam follower link supporting said first axial cam follower rolling element and said first axial cam follower rolling element contacts said first axial cam surface.

28. The motion-positioning apparatus according to claim 18, wherein said first axial cam surface and said first axial cam follower create a force closure cam joint; said first axial cam surface having a magnitude of rise displacement equal to a magnitude of fall displacement at any two coordinates along said first axial cam surface which are 180 degrees apart; said first axial cam surface being perpendicular to an axial axis of said first axial cam; said first axial cam follower further comprising of two first axial cam followers 180 degrees apart and aligned perpendicular to the first rotational axis of said rotational joint, so that said first axial cam followers rise and fall equal magnitude when said first axial cam is rotated; each said first axial cam follower further comprising:
   a) a first axial cam tracker, said first axial cam tracker further comprising:
      i) a first axial cam tracker frame being adjacent to said first axial cam surface;
      ii) a first axial cam tracker rotational joint having at least two degrees of rotational freedom; said first axial cam tracker rotational joint being attached to said first axial cam tracker frame; and
      iii) at least one first axial cam tracker rolling element being supported by said first axial cam tracker frame, such that said first axial cam tracker rolling element contacts said first axial cam surface;
   b) means for guiding along a path parallel to the axial axis of said first axial cam, said first axial cam tracker through the range of the displacement of said first axial cam surface;
   c) a first axial cam follower rotational joint having at least two degrees of rotational freedom; said first axial cam follower rotational joint being attached to said work load support; and
   d) a first axial cam follower connecting link being attached between said first axial cam follower rotational joint and said first axial cam tracker rotational joint.

29. The motion-positioning apparatus according to claim 18, wherein said first axial cam surface and said first axial cam follower create a form closure cam joint; said first axial cam surface is selected from the group consisting of at least one groove, at least one rib, or combination of at least one groove and at least one rib; said first axial cam follower aligned perpendicular to the first rotational axis of said rotational joint, said first axial cam follower further comprising:
   a) a first axial cam tracker, said first axial cam tracker further comprising:
      i) a first axial cam tracker frame being adjacent to said first axial cam surface;
      ii) a first axial cam tracker rotational joint having at least two degrees of rotational freedom; said first axial cam tracker rotational joint being attached to said first axial cam tracker frame; and
      iii) at least one first axial cam tracker rolling element being supported by said first axial cam tracker frame, such that said first axial cam tracker rolling element contacts said first axial cam surface;
   b) means for guiding along a path parallel to the axial axis of said first axial cam, said first axial cam tracker through the range of the displacement of said first axial cam surface;
   c) a first axial cam follower rotational joint having at least two degrees of rotational freedom; said first axial cam follower rotational joint being attached to said work load support; and
   d) a first axial cam follower connecting link being attached between said first axial cam follower rotational joint and said first axial cam tracker rotational joint.

30. The motion-positioning apparatus according to claim 18, wherein said second axial cam surface and said second axial cam follower create a force closure cam joint; said second axial cam surface having a magnitude of rise displacement equal to a magnitude of fall displacement at any two coordinates along said second axial cam surface which are 180 degrees apart; said second axial cam follower further comprising of two second axial cam followers 180 degrees apart and aligned perpendicular to the second rotational axis of said rotational joint, such that said second axial cam followers rise and fall equal magnitude when said second axial cam is rotated; each said second axial cam follower further comprising:
   i) a second axial cam follower link substantially rigid to support the work load; said second axial cam follower link being rigidly attached to said work load support and having an end of said second axial cam follower link opposite said work load support extending towards said second axial cam surface; and
   ii) a second axial cam follower rolling element; said second axial cam follower link supporting said second axial cam follower rolling element and said second axial cam follower rolling element contacts said second axial cam surface.

31. The motion-positioning apparatus according to claim 18, wherein said second axial cam surface and second axial cam follower create a force closure cam joint; said second axial cam surface having a magnitude of rise displacement equal to a magnitude of fall displacement at any two coordinates along said second axial cam surface which are 180 degrees apart; said second axial cam surface being perpendicular to an axial axis of said second axial cam; said second axial cam follower further comprising of two second axial cam followers 180 degrees apart and aligned perpendicular to the second rotational axis of said rotational joint, such that said second axial cam followers rise and fall equal magnitude when said second axial cam is rotated; each said second axial cam follower further comprising:
   a) a second axial cam tracker, said second axial cam tracker further comprising:
      i) a second axial cam tracker frame being adjacent to said second axial cam surface;
      ii) a second axial cam tracker rotational joint having at least two degrees of rotational freedom; said second axial cam tracker rotational joint being attached to said second axial cam tracker frame; and
      iii) at least one second axial cam tracker rolling element being supported by said second axial cam tracker frame, such that said second axial cam tracker rolling element contacts said second axial cam surface;
   b) means for guiding along a path parallel to the axial axis of said second axial cam, said second axial cam tracker through the range of the displacement of said second axial cam surface;
   c) a second axial cam follower rotational joint having at least two degrees of rotational freedom; said second axial cam follower rotational joint being attached to said work load support; and
   d) a second axial cam follower connecting link being attached between said second axial cam follower rotational joint and said second axial cam tracker rotational joint.

32. The motion-positioning apparatus according to claim 18, wherein said second axial cam surface and said second axial cam follower create a form closure cam joint; said second axial cam surface is selected from the group consisting of at least one groove, at least one rib, or combination of at least one groove and at least one rib; said second axial cam follower aligned perpendicular to the second rotational axis of said rotational joint, said second axial cam follower further comprising:

a) a second axial cam tracker, said second axial cam tracker further comprising:
   i) a second axial cam tracker frame being adjacent to said second axial cam surface;
   ii) a second axial cam tracker rotational joint having at least two degrees of rotational freedom; said second axial cam tracker rotational joint being attached to said second axial cam tracker frame; and
   iii) at least one second axial cam tracker rolling element being supported by said second axial cam tracker frame, such that said second axial cam tracker rolling element contacts said second axial cam surface;
b) means for guiding along a path parallel to an axial axis of said second axial cam, said second axial cam tracker through the range of the displacement of said second axial cam surface;
c) a second axial cam follower rotational joint having at least two degrees of rotational freedom; said second axial cam follower rotational joint being attached to said work load support; and
d) a second axial cam follower connecting link being attached between said second axial cam follower rotational joint and said second axial cam tracker rotational joint.

33. The motion-positioning apparatus according to claim 18, wherein said work load support being the work load, such that the work load is attached to said rotational joint, said first axial cam follower, and said second axial cam follower.

34. The motion-positioning apparatus according to claim 18, further comprising:
   a) said second axial cam having a shoulder surface protruding from the outer cylindrical surface of said second axial cam; the shoulder surface of said second axial cam being perpendicular to an axial axis of said second axial cam;
   b) a housing cap encircling the shoulder surface of said second axial cam; said housing cap being attached to said housing; and
   c) a housing thrust bearing residing between the shoulder surface of said second axial cam and said said housing cap; wherein said housing thrust bearing is selected from the group consisting of sliding or rolling element bearings.

* * * * *